United States Patent
Chen et al.

(10) Patent No.: US 12,544,379 B2
(45) Date of Patent: Feb. 10, 2026

(54) COMBINATION THERAPY USING RIBOCICLIB AND FULVESTRANT FOR THE TREATMENT OF HR+ BREAST CANCER

(71) Applicant: Novartis AG, Basel (CH)

(72) Inventors: Yan Chen, Lexington, MA (US); Xizhong Huang, Southborough, MA (US); Sunkyu Kim, Arlington, MA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 18/469,975

(22) Filed: Sep. 19, 2023

(65) Prior Publication Data

US 2024/0016808 A1 Jan. 18, 2024

Related U.S. Application Data

(63) Continuation of application No. 17/504,177, filed on Oct. 18, 2021, now abandoned, which is a continuation of application No. 15/998,710, filed on Aug. 16, 2018, now abandoned, which is a continuation of application No. 14/911,160, filed as application No. PCT/IB2014/063782 on Aug. 7, 2014, now abandoned.

(60) Provisional application No. 61/894,029, filed on Oct. 22, 2013, provisional application No. 61/865,804, filed on Aug. 14, 2013.

(51) Int. Cl.
| | | |
|---|---|---|
| *A61K 31/4196* | (2006.01) | |
| *A61K 31/138* | (2006.01) | |
| *A61K 31/427* | (2006.01) | |
| *A61K 31/436* | (2006.01) | |
| *A61K 31/4439* | (2006.01) | |
| *A61K 31/495* | (2006.01) | |
| *A61K 31/506* | (2006.01) | |
| *A61K 31/519* | (2006.01) | |
| *A61K 31/5377* | (2006.01) | |
| *A61K 31/551* | (2006.01) | |
| *A61K 31/5513* | (2006.01) | |
| *A61K 31/56* | (2006.01) | |
| *A61K 31/565* | (2006.01) | |
| *A61K 31/5685* | (2006.01) | |
| *A61K 45/06* | (2006.01) | |
| *A61P 5/00* | (2006.01) | |
| *A61P 5/32* | (2006.01) | |
| *A61P 35/00* | (2006.01) | |
| *A61P 35/02* | (2006.01) | |
| *A61P 43/00* | (2006.01) | |

(52) U.S. Cl.
CPC .......... *A61K 31/519* (2013.01); *A61K 31/138* (2013.01); *A61K 31/436* (2013.01); *A61K 31/4439* (2013.01); *A61K 31/5377* (2013.01); *A61K 31/551* (2013.01); *A61K 31/5513* (2013.01); *A61K 31/565* (2013.01); *A61K 31/5685* (2013.01); *A61K 45/06* (2013.01)

(58) Field of Classification Search
CPC .............. A61K 31/4439; A61K 31/519; A61K 31/5513; A61K 31/5377; A61K 31/565; A61K 2300/00
See application file for complete search history.

(56) References Cited

U.S. PATENT DOCUMENTS

| | | |
|---|---|---|
| 5,885,617 A | 3/1999 | Jordan |
| 7,319,102 B1 | 1/2008 | Clark et al. |
| 7,713,994 B2 | 5/2010 | Tsou et al. |
| 8,324,225 B2 | 12/2012 | Brain et al. |
| 8,415,355 B2 | 4/2013 | Brain et al. |
| 8,685,980 B2 | 4/2014 | Besong et al. |
| 8,962,630 B2 | 2/2015 | Brain et al. |
| 9,193,732 B2 | 11/2015 | Calienni et al. |
| 9,259,399 B2 | 2/2016 | Chen-kiang et al. |
| 9,271,988 B2 * | 3/2016 | Kim ..................... A61K 31/519 |
| 9,416,136 B2 | 8/2016 | Besong et al. |
| 9,616,062 B2 | 4/2017 | Sharpless et al. |
| 9,868,739 B2 | 1/2018 | Calienni et al. |
| 10,010,552 B2 * | 7/2018 | Kim ................... A61K 31/4439 |
| 10,799,506 B2 | 10/2020 | Gururajan et al. |

(Continued)

FOREIGN PATENT DOCUMENTS

| | | |
|---|---|---|
| EP | 2742940 A1 | 6/2014 |
| JP | 2006241089 A | 9/2006 |

(Continued)

OTHER PUBLICATIONS

American Cancer Society, "Breast Cancer Risk and Prevention", (Year: 2021).*

(Continued)

*Primary Examiner* — Kortney L. Klinkel
*Assistant Examiner* — Alison Azar Salamatian
(74) *Attorney, Agent, or Firm* — Michael Gottselig

(57) ABSTRACT

The present disclosure relates to a pharmaceutical combination comprising (1) a first agent which is a CDK inhibitor or a pharmaceutically acceptable salt thereof and (2) a second agent which is an anti-hormonal agent or a pharmaceutically acceptable salt thereof. The present disclosure also relates to a pharmaceutical combination comprising (1) a first agent which is a CDK inhibitor or a pharmaceutically acceptable salt thereof, (2) a second agent which is an anti-hormonal agent or a pharmaceutically acceptable salt thereof, and (3) a third agent which is an agent that regulates the PI3K/Akt/mTOR pathway or a pharmaceutically acceptable salt thereof.

10 Claims, 31 Drawing Sheets

(56) References Cited

U.S. PATENT DOCUMENTS

| | | | |
|---|---|---|---|
| 11,179,365 B2* | 11/2021 | Abrams | A61K 31/519 |
| 2003/0187261 A1 | 10/2003 | Havlicek et al. | |
| 2003/0207900 A1 | 11/2003 | Chen et al. | |
| 2004/0236084 A1 | 11/2004 | Biwersi et al. | |
| 2006/0106227 A1 | 5/2006 | Reddy et al. | |
| 2008/0139588 A1 | 6/2008 | Clark et al. | |
| 2008/0167309 A1 | 7/2008 | Berdini et al. | |
| 2009/0318441 A1 | 12/2009 | Brain et al. | |
| 2010/0105653 A1 | 4/2010 | Besong et al. | |
| 2010/0272717 A1 | 10/2010 | Evans et al. | |
| 2011/0152244 A1 | 6/2011 | Besong et al. | |
| 2012/0100100 A1 | 4/2012 | Sharpless et al. | |
| 2012/0115878 A1 | 5/2012 | Calienni et al. | |
| 2012/0177737 A1 | 7/2012 | Luftensteiner et al. | |
| 2012/0207763 A1 | 8/2012 | Brain et al. | |
| 2013/0157980 A1 | 6/2013 | Cooke et al. | |
| 2013/0184285 A1 | 7/2013 | Brain et al. | |
| 2013/0203765 A1 | 8/2013 | Brain et al. | |
| 2013/0217698 A1 | 8/2013 | Calienni et al. | |
| 2014/0135312 A1 | 5/2014 | Besong et al. | |
| 2015/0099760 A1 | 4/2015 | Calienni et al. | |
| 2016/0318905 A1 | 11/2016 | Peters et al. | |
| 2018/0155351 A1 | 6/2018 | Besong et al. | |
| 2019/0046533 A1 | 2/2019 | Chen et al. | |
| 2021/0228529 A1* | 7/2021 | Steiner | A61K 31/167 |
| 2022/0193079 A1 | 6/2022 | Chen et al. | |

FOREIGN PATENT DOCUMENTS

| | | | | |
|---|---|---|---|---|
| WO | 9907705 | A1 | 2/1999 | |
| WO | 0147507 | A2 | 7/2001 | |
| WO | 03074530 | A1 | 9/2003 | |
| WO | 2004022561 | A1 | 3/2004 | |
| WO | 2005017760 | A2 | 2/2005 | |
| WO | 2005023761 | A2 | 3/2005 | |
| WO | 2005023806 | A2 | 3/2005 | |
| WO | 2005080393 | A1 | 9/2005 | |
| WO | 2005085253 | A1 | 9/2005 | |
| WO | 2005107760 | A1 | 11/2005 | |
| WO | 2006008545 | A2 | 1/2006 | |
| WO | 2006042102 | A2 | 4/2006 | |
| WO | 2006045828 | A1 | 5/2006 | |
| WO | 2006074985 | A1 | 7/2006 | |
| WO | 2006076595 | A1 | 7/2006 | |
| WO | 2006091373 | A2 | 8/2006 | |
| WO | 2006091737 | A1 | 8/2006 | |
| WO | 2007030438 | A2 | 3/2007 | |
| WO | 2007039285 | A1 | 4/2007 | |
| WO | 2007/056118 | A1 | 5/2007 | |
| WO | 2007058990 | A2 | 5/2007 | |
| WO | 2007059041 | A2 | 5/2007 | |
| WO | 2007071393 | A2 | 6/2007 | |
| WO | 2007075783 | A2 | 7/2007 | |
| WO | 2007104053 | A2 | 9/2007 | |
| WO | 2007104222 | A1 | 9/2007 | |
| WO | 2007125405 | A2 | 11/2007 | |
| WO | 2007127382 | A1 | 11/2007 | |
| WO | 2008009927 | A1 | 1/2008 | |
| WO | 2007140222 | A3 | 8/2008 | |
| WO | 2009085185 | A1 | 7/2009 | |
| WO | 2009098236 | A1 | 8/2009 | |
| WO | 2010020675 | A1 | 2/2010 | |
| WO | 2010043865 | A1 | 4/2010 | |
| WO | 2011/101409 | A1 | 8/2011 | |
| WO | 2011101417 | A1 | 8/2011 | |
| WO | 2011130232 | A1 | 10/2011 | |
| WO | 2011133888 | A1 | 10/2011 | |
| WO | 2012064805 | A1 | 5/2012 | |
| WO | 2013/006532 | A1 | 1/2013 | |
| WO | 2014097125 | A1 | 6/2014 | |
| WO | WO-2014203129 | A1* | 12/2014 | A61P 5/30 |
| WO | 2015069266 | A1 | 5/2015 | |
| WO | 2016166703 | A1 | 10/2016 | |

OTHER PUBLICATIONS

CAS Scifinder (CAS Registry No. 129453-61-8, Mar. 24, 2025 (Year: 2025).*

Cohen, et al., Approval Summary_ Letrozole in the treatment of Postmenopausal Women with Advanced Breast Cancer, Clinical Cancer Research, Mar. 2002, 665-669, 8.

European Medicines Agency, Questions and answers on Femara and associated names (letrozole, 2.5 mg Tablets), May 22, 2012.

Finn, et al., Overall survival (OS) with first-line palbociclib plus letrozole (PAL+LET) versus placebo plus letrozole (PBO+LET) in women with estrogen receptor-positive/human epidermal growth factor receptor 2-negative advanced breast cancer (ER+/HER2-ABC), American Society of Clinical Oncology, 2022, LBA1003.

Graf, et al., Cyclin-Dependent Kinase 4/6 (Cdk4/6) Inhibitors: Perspectives in Cancer Therapy and Imaging, Mini-Reviews in Medicinal Chemistry, 2010, 527-539, 10.

Hortobagyi, et al., Overall Survival with Ribociclib plus Letrozole in Advances Breast Cancer, The New England Journal of Medicine, Mar. 10, 2022, 942-950, 386(10).

Jhaveri, et al., Pratical Management of endocrine therapy-related toxicities, European Journal of Cancer, Nov. 18, 2022, S2-S3, 175(suppl. 1).

Aarts, et al., Tumour selective targeting of cell cycle kinases for cancer treatment, Current Opinion in Pharmacology, Apr. 15, 2013, 529-535, 13(4).

Ashizawa, Investigation of salt/crystal form, preparation of bulk drug and up to formulation of a pharmaceutical product, Science of Polymorphism Phenomena and Crystallization of Pharmaceutical Products, Sep. 20, 2002, 305-311, chapter 9.

Baker, et al., CDK4: A Key Player in the Cell Cycle, Development, and Cancer., Genes & Cancer, 2013, 658-669, 3 (11-12).

Barvian, et al., Pyrido[2,3-d]pyrimidin-7-one inhibitors of cyclin-dependent kinases, Journal of Medicinal Chemistry, Nov. 11, 2000, 4606-4616, 43(24).

Baselga, et al., Everolimus in Postmenopausal Hormone-Receptor-Positive Advanced Breast Cancer, The New England Journal Medicine, Feb. 9, 2012, 520-529, 366(6).

Bastin, et al., Salt Selection and Optimisation Procedures for Pharmaceutical New Chemical Entities, Organic Process Research & Development, 2000, 427-435, 4(5).

Berge, et al., Pharmaceutical Salts, Journal of Pharmaceutical Sciences, Jan. 1977, 1-19, 66(1).

Byrn, et al., Pharmaceutical Solids: A Strategic Approach to Regulatory Considerations, Pharmaceutical Research, 1995, 945-954, 12(7).

Calienni et al., "Salt(s) of 7-Cyclopentyl-2-(5-Piperazin-1-YL-Pyridin-2-Ylamino)-7H-Pyrrolo[2,3-D]Pyrimidine-6-Carboxylic Acid Dimthylamide and Processes of Making Thereof", U.S. Appl. No. 13/291,187, filed Nov. 8, 2011 (stored in the Image File Wrapper System).

Carlson, Metastatic Breast Cancer PD 0332991 + Letrozole Triples PFS, Oncology Times, Feb. 10, 2013, 24-25, 35.

Chiron, et al., Induction of prolonged early G1 arrest by CDK4/CDK6 inhibition reprograms lymphoma cells for durable PI3Kδ inhibition through PIK3IP1, Cell Cycle, Jun. 15, 2013, 1892-900, 12(12).

Choi, et al., Design and synthesis of 7H-pyrrolo[2,3-d]pyrimidines as focal adhesion kinase inhibitors. Part 1, Bioorganic & Medicinal Chemistry Letters, Feb. 3, 2006, 2173-2176, 16.

Choi, et al., Design and synthesis of 7H-pyrrolo[2,3-d]pyrimidines as focal adhesion kinase inhibitors. Part 2, Bioorganic & Medicinal Chemistry Letters, Mar. 9, 2006, 2689-2692, 16.

Choi, et al., Signaling through cyclin D-dependent kinases, Oncogene, 2014, 1890-1903, 33.

Chou, et al., Quantitative analysis of dose-effect relationships: the combined effects of multiple drugs or enzyme inhibitors, Advances in Enzyme Regulation, 1984, 27-55, 22.

Cicatiello, et al., The antiestrogen ICI 182,780 inhibits proliferation of human breast cancer cells by interfering with multiple, sequential estrogen-regulated processes required for cell cycle completion, Molecular and Cellular Endocrinology, 2000, 199-209, 165.

(56) References Cited

OTHER PUBLICATIONS

Cottu, et al., Modeling of response to endocrine therapy in a panel of human luminal breast cancer xenografts, Breast Cancer Research Treatment, 2012, 595-606, 133.
Dai, et al., Breast Cancer Cell Line Classification and Its Relevance with Breast Tumor Subtyping, Journal of Cancer, Sep. 12, 2017, 3131-3141, 8(16).
Davies, et al., Structure-based design of cyclin-dependent kinase inhibitors, Pharmacology & Therapeutics, 2002, 125-133, 93.
Dorward, Side Reactions in Organic Synthesis, 2005.
Eggersmann, et al., CDK4/6 Inhibitors Expand the Therapeutic Options in Breast Cancer: Palbociclib, Ribociclib and Abemaciclib, BioDrugs, Mar. 7, 2019, 125-135, 33.
Ellis, et al., The genomic landscape of breast cancer as a therapeutic roadmap, Cancer Discovery, Jan. 2013, 27-34, 3(1).
European Medicines Agency, Assessment Report: Kisqali, Jun. 22, 2017, 121 pages.
European Medicines Agency, Kisqali: an overview of Kisqali and why it is authorized in the EU, Jun. 2020, 3 pages.
Fasching et al, Matching-Adjusted Indirect Comparison of Ribociclib Plus Fulvestrant versus Palbociclib Plus Letrozole as First-Line Treatment of HR+/HER2− Advanced Breast Cancer, Cancer Manag Res, 2021, 8179-8189, vol. 13.
Fesser, After palbociclib comes ribociclib: New CDK4/6 inhibitor likewise slows progression in metastatic breast cancer, Deustsche Apotheker Zeitung, Sep. 13, 2017.
Finn et al., Abstract S1-6: Results of a randomized phase 2 study of PD 0332991, a cyclin-dependent kinase (CDK) 4/6 inhibitor, in combination with letrozole vs letrozole alone for first-line treatment of ER+/HER2− advanced breast cancer (BC), Cancer Research. Issue 72 (Supplement 24):S1-6 (1 page), 2012.
Finn et al., Results of a Randomized Phase 2 Study of PD0332991, a Cyclin-Dependent Kinase (CDK) 4/6 Inhibitor, in Combination with Letrozole vs Letrozole alone for first-line treatment or ER+/HER2− Advanced Breast Cancer (BC), Proc SABCS, 2012, (5 pages), Abstract S1-6 Powerpoint Presentation.
Finn et al. "A randomized, multicenter, double-blind phase III study of palbociclib (PD-0332991), an oral CDK 4/6 inhibitor, plus letrozole versus placebo plus letrozole for the treatment of post-menopausal women with ER (+), HER2 (−) breast cancer who have not received any prior systemic anticancer treatment for advanced disease", Journal of Clinical Oncology, vol. 31, No. 15, Abstract TSP652, 2013.
Finn, et al., PD 0332991, a selective cyclin D kinase 4/6 inhibitor, preferentially inhibits proliferation of luminal estrogen receptor-positive human breast cancer cell lines in vitro, Breast Cancer Research, Oct. 29, 2009, R77, 11.
Finn, et al., Phase I study of PD 0332991, a novel, oral, cyclin-D kinase (DCK) 4/6 inhibitor in combination with Letrozole, for first-line treatment of metastatic post-menopausal, estrogen receptor-positive (ER+), Human epidermal growth factor receptor 2 (HER2)-Negative breast cancer, Cancer Research, vol. 69, Suppl. 24, Abstract 5069, Dec. 2009.
Finn, et al., Results of a Randomized Phase 2 Study of PD0332991, a Cyclin-Dependent Kinase (CDK) 4/6 Inhibitor, in Combination with Letrozole vs Letrozole alone for first-line treatment or ER+/HER2− Advanced Breast Cancer (BC), Annals of Oncology, 2012, ii43-ii45, Abstract 1000, 23(Supplement 2).
Fry, et al., Specific inhibition of cyclin-dependent kinase 4/6 by PD 0332991 and associated antitumor activity in human tumor xenografts, Molecular Cancer Therapeutics, Nov. 2004, 427-1438, 3(11).
Gaulon, et al., A General and Facile Route to New Trisubstituted Purin-8-ones, Synthesis, Jul. 7, 2005, 2227-2233, 13.
Gaur, et al., Film Coating Technology: Past, Present and Future, Journal of Pharmaceutical Sciences and Pharmacology, 2014, 57-67, 1(1).
Grinde, et al, Interplay of choline metabolites and genes in patient-derived breast cancer xenografts, Breast Cancer Research, 2014, 16:R5.
Guha, Blockbuster dreams for Pfizer's CDK inhibitor, Nature Biotechnology, Mar. 2013, 187, 31(3).
Guha, Cyclin-dependent kinase inhibitors move into Phase III, Nature Reviews Drug Discovery, Dec. 2012, 892-894, 11.
Hirohashi, PD-0332991, a selective CDK4/6 inhibitor, BIO Clinica, 2013, 28(1).
History of changes for Study NCT01919229, submitted on Aug. 6, 2013, available at https://classic.clinicaltrials.gov/ct2/history/NCT01919229.
Holliday, et al., Choosing the right cell line for breast cancer research, Breast Cancer Research, 2011, 13:215.
Hong, et al., Identification and characterization of small-molecule inducers of epidermal keratinocyte differentiation, ACS Chemical Biology, 2007, 171-175, 2(3).
Honma, et al., A novel approach for the development of selective Cdk4 inhibitors: library design based on locations of Cdk4 specific amino acid residues, Journal of Medicinal Chemistry, Dec. 13, 2001, 4628-4640, 44(26).
Hortobagyi, et al., Ribociclib as First-Line Therapy for HR-Positive, Advanced Breast Cancer, The New England Journal Medicine, Nov. 3, 2016, 1738-1748, 375(18).
Ignatiadis, et al., Luminal breast cancer: from biology to treatment, Nature Reviews Clinical Oncology, Sep. 2013, 494-506, 10.
Jerusalem, et al., A new era of improving progression-free survival in HR+, HER2− advanced breast cancer with dual blockade, European Journal of Cancer, Mar. 21, 2014, S185, abstract 464.
Jhaveri, et al., Matching Adjusted indirect comparison of PFS & OS Comparing Robociclib + Letrozole vs Palbociclib + Letrozole as first-in-line treatment of HR+/HER2− ABC: Analysis Based on Upfdated PFS & Final OS results of Monaleesa-2 & Paloma-2 +, EBCC, 2022.
Johnston, et al., Treatment algorithms for hormone receptor-positive advanced breast cancer: going forward in endocrine therapy—overcoming resistance and introducing new agents, ASCO Educational Book, 2013, e28-e36.
Kaufman, Highlights in Metastatic Breast Cancer From the 2012 San Antonio Breast Cancer Symposium (SABCS): A Review of Selected Presentations From the 2012 CTRC-AACR San Antonio Breast Cancer Symposium (SABCS), Clinical Advances in Hematology and Oncology, Mar. 2013, 24 pages, 11(3, suppl. 4).
Kelly, et al., Using multiple targeted therapies in oncology: considerations for use, and progress to date in breast cancer, Drugs, Apr. 20, 2013, 505-515, 73.
Khankari, et al., Pharmaceutical hydrates, Thermochimica Acta, 1995, 61-79, 248.
Koehler, et al., Mechanism of Action for Combined CDK4/6 and Er Inhibition in ER Positive Breast Cancer, Annals of Oncology, 2014, i21-i22, 25(supplement 1).
Koretskaya, et al., 5-substituted pyramidine derivatives, Khimiko-Farmalsevticheskil Zhurnal, 1968, 5-12, 6.
Lehar, et al., Synergistic drug combinations tend to improve therapeutically relevant selectivity, Nature Biotechnology, Jul. 2009, 659-666, 27(7).
Lonning, et al., Aromatase inhibition 2013: clinical state of the art and questions that remain to be solved, Endocrine-Related Cancer, 2013, R183-R201, 20(4).
Love, SABCS highlights: should adjuvant tamoxifen now be administered for 10 years?, Post-SABCS, 2013, 1.
Lu, et al., Toward understanding the structural basis of cyclin-dependent kinase 6 specific inhibition, Journal of Medicinal Chemistry, May 28, 2006, 3826-3831, 49(13).
Lund, Pharmaceutical Aspects of Clinical Trials, Pharmaceutical Codex, 1994.
Malumbres, et al., CDK inhibitors in cancer therapy: what is next?, Trends in Pharmacological Sciences, Dec. 4, 2007, 16-21, 29(1).
Marra, et al., Are all cyclin-dependent kinases 4/6 inhibitors created equal?, NPJ Breast Cancer, Aug. 29, 2019, 5:27.
Mcclue, et al., In vitro and in vivo antitumor properties of the cyclin dependent kinase inhibitor CYC202 (R-roscovitine), International Journal of Cancer, 2002, 463-468, 102.
Mcinnes, et al., Structural determinants of CDK4 inhibition and design of selective ATP competitive inhibitors, Chemistry & Biology, Apr. 2004, 525-534, 11.

(56) References Cited

OTHER PUBLICATIONS

Miller, Endocrine resistance: what do we know?, ASCO Educational Book, 2013, e37-e42.

Miller, et al., ERα-dependent E2F transcription can mediate resistance to estrogen deprivation in human breast cancer, Cancer Discovery, Sep. 2011, 338-351, 1.

Moriarty, et al., The synthesis and SAR of 2-amino-pyrrolo[2,3-d]pyrimidines: a new class of Aurora-A kinase inhibitors, Bioorganic & Medicinal Chemistry Letters, Sep. 1, 2006, 5578-5783, 16.

Munster et al, Phase Ib study of LEE011 and BYL719 in combination with letrozole in estrogen receptor-positive, HER2-negative breast cancer (ER+, HER2–BC), Journal of Clinical Oncology, May 20, 2014, 533, vol. 15 Issue 15 (Supplement).

Novartis Pharmaceuticals UK Limited, Ribociclib in combination with an aromatase inhibitor for previously untreated advanced or metastatic hormone receptor-positive, HER2-negative breast cancer [ID1026]_2017-03-23_National Institute for Health and Care Excellence, Company Evidence Submission (201 pages).

O'Regan, Key Takeaways about Hormonal Therapy for Metastatic Breast Cancer, Oncology Times, Feb. 10, 2013, 21-22, vol. 35.

Office Communication sent and received electronically on Aug. 18, 2011 for U.S. Appl. No. 12/302,223; Examiner Jeffrey H. Murray.

Petrelli et al, Comparative efficacy of palbociclib, ribociclib and abemaciclib for ER+ metastatic breast cancer: an adjusted indirect analysis of randomized controlled trials, Breast Cancer Res Treat, Apr. 2019, 597-604, vol. 174 Issue 3.

Prof Peter Clark, NHS England Submission for the Appraisals of Palbociclib and Ribociclib in the Treatment of ER positive her-2 negative locally advanced or metastatic breast cancer, Sep. 30, 2017 (6 pages).

Roberts et al., Multiple roles of cyclin-dependent kinase 4/6 inhibitors in cancer therapy, J Natl Cancer Inst, Mar. 21, 2012, 476-87, vol. 104 Issue 6.

Rocca et al, Palbociclib (PD 0332991) : targeting the cell cycle machinery in breast cancer, Expert Opin Pharmacother, 2014, 407-420, vol. 15 Issue 3.

Rossi et al, Understanding and modulating cyclin-dependent kinase inhibitor specificity: molecular modeling and biochemical evaluation of pyrazolopyrimidinones as CDK2/cyclin A and CDK4/cyclin D1 inhibitors, Journal of Computer-Aided Molecular Design, 2005, 111-122, vol. 19.

Rugo et al, Matching-adjusted indirect comparison (MAIC) of palbociclib versus ribociclib and abemaciclib in hormone receptor-positive, human epidermal growth factor receptor 2-negative advanced breast cancer (HR+/HER2 ABC), Annals of Oncology, May 2020, S72, Abstract 156P (1 page), vol. 31 Supplement 2.

Rugo et al, Matching-adjusted indirect comparison of palbociclib versus ribociclib and abemaciclib in hormone receptor-positive/HER2-negative advanced breast cancer, J Comp Eff Res, 2021, 457-467, vol. 10 Issue 6.

Rugo, The breast cancer continuum in hormone-receptor-positive breast cancer in postmenopausal women: evolving management options focusing on aromatase inhibitors, Ann Oncol., 2008, 16-27, vol. 19 Issue 1.

Samson, LEE011 CDK Inhibitor Showing Early Promise in Drug-Resistant Cancers, Oncology Times, Feb. 10, 2014, 39-40, vol. 36 Issue 3.

Sanchez et al, Preclinical modeling of combined phosphatidylinositol-3-kinase inhibition with endocrine therapy for estrogen receptor-positive breast cancer, Breast Cancer Research, 2011, R21, vol. 13 Issue 2.

Serajuddin, Salt formation to improve drug solubility, Advanced Drug Delivery Reviews, May 29, 2007, 603-616, 59.

Siqqidi et al, Search for new purine- and ribose-modified adenosine analogues as selective agonists and antagonists at adenosine receptors, J Med Chem, 1995, 1174-88, vol. 37 Issue 7.

Slamon et al, Overall Survival with Ribociclib plus Fulvestrant in Advanced Breast Cancer, N Engl J Med, Feb. 6, 2020, 514-524, vol. 382.

Slamon et al, Phase I Study of PD 0332991 cyclin-D kinase (CDK) 4/6 inhibitor in combination with letrozole for first-line treatment of patients with ER-positive, HER2-negative breast cancer, Journal of Clinical Oncology, May 20, 2010, 2 pages, vol. 28 Issue 15 Suppl, Meeting Abstract, 2010 ASCO Annual Meeting.

Slamon et al, Ribociclib and endocrine therapy as adjuvant treatment in patients with HR+/HER2– early breast cancer: primary results from the Phase III Natalee trial, ASCO Annual Meeting, 2023, 18 pages.

Slamon, Palbociclib (PD-0332991), a "Breakthrough Therapy" for Breast Cancer, CDMRP, May 15, 2013, 2 pages.

Stahl, et al., Monographs on Acids and Bases, Handbook of Pharmaceutical Salts: Properties, Selection, and Use, 2002, 265-327, Chapter 12.

Study 1008:A study of Palbociclib (PD-0332991) in combination with letrozole vs. letrozole for first line treatment of postmenopausal women with ER+ and HER-2 advanced breast cancer, Pfizer Onocology, May 2013, electronic resource:http://www.pfizer.com/files/news/asco/palbociclib_study_1008_backgrounder.pdf, NA.

Sutherland et al., CDK inhibitors as potential breast cancer therapeutics: new evidence for enhanced efficacy in ER+ disease, Breast Cancer Research, 2009, 112, vol. 11 Issue 6.

Tallarida, Combinations of Chemicals, Drug Synergism and Dose-Effect Data Analysis, 2000, 9 pages, Taylor & Francis Group, LLC, Boca Raton, FL.

Tallarida, Quantitative methods for assessing drug synergism, Genes Cancer, Nov. 2011, 1003-8, vol. 2 Issue 11.

Thornber, Isosterism and molecular modification in drug design, Chemical Society Reviews, 1979, 563-580, vol. 8 Issue 4.

Toogood et al, Cyclin-dependent kinase inhibitors for treating cancer, Med Res Rev, 2001, 487-498, vol. 21 Issue 6.

Toogood et al, Discovery of a potent and selective inhibitor of cyclin-dependent kinase 4/6, J Med Chem, 2005, 2388-2406, vol. 48 Issue 7.

Tremblay et al, Matching-adjusted indirect treatment comparison of ribociclib and palbociclib in HR+, HER2– advanced breast cancer, Cancer Manag Res, 2018, 1319-1327, vol. 10.

U.S. Appl. No. 61/894,029, filed Oct. 22, 2013 (68 pages).

U.S. Appl. No. 61/865,804, filed Aug. 14, 2013 (60 pages).

Van Tine et al., ER and PI3K independently modulate endocrine resistance in ER-positive breast cancer, Cancer Discovery, 2011, 287-288, vol. 1 Issue 4.

Vanderwel et al, Pyrido[2,3-d]pyrimidin-7-ones as specific inhibitors of cyclin-dependent kinase 4, J Med Chem, 2005, 2371-2387, vol. 48 Issue 7.

Vora et al, CDK 4/6 inhibitors sensitize PIK3CA mutant breast cancer to PI3K inhibitors, Cancer Cell, Jul. 14, 2014, 136-49, vol. 26 Issue 1.

Yan, Molecular targeted agents—where we are and where we are going, Chin J Cancer, May 2013, 225-32, vol. 32 Issue 5.

Zardavas et al, Emerging targeted agents in metastatic breast cancer, Nat Rev Clin Oncol, Mar. 5, 2013, 191-210, vol. 10 Issue 4.

Baron, "Re: Addendum in Support of Kisqali® (ribociclib) in Premenopausal Women with HR+/HER2– Advanced Breast Cancer," Submission Request to National Comprehensive Cancer Network (NCCN) sent Jun. 6, 2019 (1 page).

Baron, "Re: MONALEESA-2 Overall Survival Data for Ribociclib in First-line Treatment of HR+/HER2– Metastatic Breast Cancer," Submission Request to National Comprehensive Cancer Network (NCCN) sent Oct. 11, 2021 (4 pages).

Baron, "Re: Overall Survival Data for CDK4/6 Inhibitors in the Treatment of HR-Positive/HER2-Negative Metastatic Breast Cancer," Addendum and Submission Request to National Comprehensive Cancer Network (NCCN) sent Jul. 2022 (4 pages).

Bhatnagar, The discovery and mechanism of action of letrozole, Breast Cancer Res Treat, vol. 105 (Suppl 1), 7-17, 2007.

Caffrey, "NATALEE: Ribociclib With Hormonal Therapy Cuts Recurrence Risk by 25% in Most Common Type of Breast Cancer," posted on Jun. 2, 2023, available at https://www.ajmc.com/view/natalee-ribociclib-with-hormonal-therapy-cuts-recurrence-risk-by-25-in-most-common-type-of-breast-cancer (5 pages).

(56) References Cited

OTHER PUBLICATIONS

Chen et al, Spectrum and Degree of CDK Drug Interactions Predicts Clinical Performance, Mol Cancer Ther, vol. 15 Issue 10, 2273-81, 2016.

Cleary, "Clinical Evidence in Support of Ribociclib in the Treatment of HR-Positive/HER2-Negative Advanced Breast Cancer With Visceral Crisis," Addendum and Submission Request to National Comprehensive Cancer Network (NCCN) sent Dec. 20, 2022 (4 pages).

Delach et al., "Preclinical head-to-head comparison of CDK4/6 inhibitor activity toward CDK4 vs CDK6," Abstract PS19-10. Presented at the San Antonio Breast Cancer Symposium (SABCS) 2020 VirtualMeeting; Dec. 8-12, 2020 (1 page).

ESMO Oncology News, "Two Years of Adjuvant Palbociclib Added to Endocrine Therapy Does Not Improve Outcomes in Early Breast Cancer," PALLAS Study, posted on Dec. 9, 2021 available at https://www.esmo.org/oncology-news/two-years-of-adjuvant-palbociclib-added-to-endocrine-therapy-does-not-improve-outcomes-in-early-breast-cancer (1 page).

Figlin and Slamon, "Not Coke vs. Pepsi: NATALEE Results Clarify CDK4/6 Inhibitor Choice in Breast Cancer," Interview Transcipt ASCO Conference Coverage, OBR Oncology, Jun. 4, 2023 (10 pages), https://https://www.obroncology.com/video/not-coke-vs-pepsi-natalee-results-clarify-cdk46-inhibitor-choice-in-breast-cancer.

Finn et al., "Overall survival (OS) with first-line palbociclib plus letrozole (PAL+LET) versus placebo plus letrozole (PBO+LET) in women with estrogen receptor-positive/human epidermal growth factor receptor 2-negative advanced breast cancer (ER+/HER2–ABC): Analyses from PALOMA-2" presented at the ASCO Annual Meeting 2022 on Jun. 4, 2022, Poster Presentation (17 pages).

Flaherty et al, Phase I, dose-escalation trial of the oral cyclin-dependent kinase 4/6 inhibitor PD 0332991, administered using a 21-day schedule in patients with advanced cancer, Clin Cancer Res, vol. 18 Issue 2, 568-76, 2012.

Gnant et al, Adjuvant Palbociclib for Early Breast Cancer: The PALLAS Trial Results (ABCSG-42/AFT-05/BIG-14-03), J Clin Oncol, vol. 40 Issue 3, 282-93, 2022.

History of Changes for Study: NCT00721409, Study Of Letrozole With Or Without Palbociclib (PD-0332991) For The First-Line Treatment Of Hormone-Receptor Positive Advanced Breast Cancer, posted on Jul. 24, 2008 available at https://classic.clinicaltrials.gov/ct2/history/NCT00721409?A=1&B=1&C=merged#StudyPageTop (6 pages).

History of Changes for Study: NCT00721409, Study Of Letrozole With Or Without Palbociclib (PD-0332991) For The First-Line Treatment Of Hormone-Receptor Positive Advanced Breast Cancer, posted on Mar. 19, 2015 available at https://classic.clinicaltrials.gov/ct2/history/NCT00721409?A=95&B=95&C=merged#StudyPageTop (51 pages).

History of Changes for Study: NCT01684215, A Study Of PD-0332991 (Cyclin Dependant Kinase 4/6 Inhibitor) In Japanese Patients With Advanced Solid Tumors, posted on May 2, 2017, available at https://classic.clinicaltrials.gov/ct2/history/NCT01684215?A=50&B=50&C=merged#StudyPageTop (35 pages).

History of Changes for Study: NCT01684215, A Study Of PD-0332991 (Cyclin Dependant Kinase 4/6 Inhibitor) In Japanese Patients With Advanced Solid Tumors, posted on Sep. 12, 2012, available at https://classic. clinicaltrials.gov/ct2/history/NCT01684215?A=1&B=1&C=merged#StudyPageTop (5 pages).

History of Changes for Study: NCT01723774, PD 0332991 and Anastrozole for Stage 2 or 3 Estrogen Receptor Positive and HER2 Negative Breast Cancer posted on Jun. 2, 2022 available at https://classic.clinicaltrials.gov/ct2/history/NCT01723774?A=26&B=26&C=merged#StudyPageTop (39 pages).

History of Changes for Study: NCT01723774, PD 0332991 and Anastrozole for Stage 2 or 3 Estrogen Receptor Positive and HER2 Negative Breast Cancer posted on Nov. 8, 2012 available at https://classic.clinicaltrials.gov/ct2/history/NCT01723774?A=1&B=1&C=merged#StudyPageTop (11 pages).

History of Changes for Study: NCT01740427, A Study of Palbociclib (PD-0332991) + Letrozole vs. Letrozole For 1st Line Treatment Of Postmenopausal Women With ER+/HER2– Advanced Breast Cancer (PALOMA-2), posted on Apr. 26, 2017 available at https://classic.clinicaltrials.gov/ct2/history/NCT01740427?A=47&B=47&C=merged#StudyPage Top (38 pages).

History of Changes for Study: NCT01740427, A Study of Palbociclib (PD-0332991) + Letrozole vs. Letrozole For 1st Line Treatment Of Postmenopausal Women With ER+/HER2– Advanced Breast Cancer (PALOMA-2), posted on Dec. 4, 2012 available at https://classic.clinicaltrials.gov/ct2/history/NCT00721409?A=1&B=1&C=merged#StudyPageTop (6 pages).

History of Changes for Study: NCT01864746, A Study of Palbociclib in Addition to Standard Endocrine Treatment in Hormone Receptor Positive Her2 Normal Patients With Residual Disease After Neoadjuvant Chemotherapy and Surgery (PENELOPE-B). posted on May 30, 2013 available at https://classic.clinicaltrials.gov/ct2/history/NCT01864746?A=1&B=1&C=merged#StudyPageTop (12 pages).

History of Changes for Study: NCT01864746, A Study of Palbociclib in Addition to Standard Endocrine Treatment in Hormone Receptor Positive Her2 Normal Patients With Residual Disease After Neoadjuvant Chemotherapy and Surgery (PENELOPE-B). posted on Nov. 22, 2023 available at https://classic.clinicaltrials.gov/ct2/history/NCT01864746?A=11&B=11&C=merged#StudyPageTop (28 pages).

History of Changes for Study: NCT01919229, A Pharmacodynamics Pre-surgical Study of LEE011 in Early Breast Cancer Patients (MONALEESA-1), posted on Aug. 8, 2013 available at https://classic.clinicaltrials.gov/ct2/history/NCT01919229?A=1&B=1&C=merged#StudyPageTop (8 pages).

History of Changes for Study: NCT01919229, A Pharmacodynamics Pre-surgical Study of LEE011 in Early Breast Cancer Patients (MONALEESA-1), posted on Jan. 1, 2016 available at https://classic.clinicaltrials.gov/ct2/history/NCT01919229?A=9&B=9&C=merged#StudyPageTop (12 pages).

History of Changes for Study: NCT01942135, Palbociclib (PD-0332991) Combined With Fulvestrant In Hormone Receptor+ HER2-Negative Metastatic Breast Cancer After Endocrine Failure (PALOMA-3), posted on May 23, 2016 available at https://classic.clinicaltrials.gov/ct2/history/NCT01942135?A=29&B=29&C=merged#StudyPageTop (65 pages).

History of Changes for Study: NCT01942135, Palbociclib (PD-0332991) Combined With Fulvestrant In Hormone Receptor+ HER2-Negative Metastatic Breast Cancer After Endocrine Failure (PALOMA-3), posted on Sep. 13, 2013 available at https://classic.clinicaltrials.gov/ct2/history/NCT01942135?A=1&B=1&C=merged#StudyPageTop (7 pages).

History of Changes for Study: NCT01958021, Study of Efficacy and Safety of LEE011 in Postmenopausal Women With Advanced Breast Cancer.(MONALEESA-2) (MONALEESA-2), posted on May 12, 2017 available at https://classic.clinicaltrials.gov/ct2/history/NCT01958021?A=24&B=24&C=merged#StudyPageTop (43 pages).

History of Changes for Study: NCT01958021, Study of Efficacy and Safety of LEE011 in Postmenopausal Women With Advanced Breast Cancer.(MONALEESA-2) (MONALEESA-2), posted on Oct. 8, 2013 available at https://classic.clinicaltrials.gov/ct2/history/NCT01958021?A=1&B=1&C=merged#StudyPageTop (6 pages).

History of Changes for Study: NCT02088684, Study of LEE011 With Fulvestrant and BYL719 or BKM120 in Advanced Breast Cancer, posted on Mar. 17, 2014 available at https://classic.clinicaltrials.gov/ct2/history/NCT02088684?A=1&B=1&C=merged#StudyPageTop (8 pages).

History of Changes for Study: NCT02278120, Study of Efficacy and Safety in Premenopausal Women With Hormone Receptor Positive, HER2-negative Advanced Breast Cancer (MONALEESA-7), posted on Feb. 26, 2019 available at https://classic.clinicaltrials.gov/ct2/history/NCT02278120?A=19&B=19&C=merged#StudyPageTop (43 pages).

History of Changes for Study: NCT02278120, Study of Efficacy and Safety in Premenopausal Women With Hormone Receptor Positive, HER2-negative Advanced Breast Cancer (MONALEESA-7), posted

(56) References Cited

OTHER PUBLICATIONS on Oct. 29, 2014 available at https://classic.clinicaltrials.gov/ct2/history/NCT02278120?A=1&B=1&C=merged#StudyPageTop (18 pages).
History of Changes for Study: NCT02513394, PALbociclib Collaborative Adjuvant Study: A Randomized Phase III Trial of Palbociclib With Standard Adjuvant Endocrine Therapy Versus Standard Adjuvant Endocrine Therapy Alone for Hormone Receptor Positive (HR+) / Human Epidermal Growth Factor Receptor 2 (HER2)-Negative Early Breast Cancer (PALLAS) posted on Apr. 13, 2022 available at https://classic.clinicaltrials.gov/ct2/history/NCT02513394?A=33&B=33&C=merged#StudyPageTop (158 pages).
History of Changes for Study: NCT02513394, PALbociclib Collaborative Adjuvant Study: A Randomized Phase III Trial of Palbociclib With Standard Adjuvant Endocrine Therapy Versus Standard Adjuvant Endocrine Therapy Alone for Hormone Receptor Positive (HR+) / Human Epidermal Growth Factor Receptor 2 (HER2)-Negative Early Breast Cancer (PALLAS) posted on Jul. 31, 2015 available at https://classic.clinicaltrials.gov/ct2/history/NCT02513394?A=1&B=1&C=merged#StudyPageTop (9 pages).
History of Changes for Study: NCT03078751, Adjuvant Ribociclib With Endocrine Therapy in Hormone Receptor+/ HER2- High Risk Early Breast Cancer (EarLEE-1) (EarLEE-1), posted on Jan. 15, 2021 available at https://classic.clinicaltrials.gov/ct2/history/NCT03078751?A=30&B=30&C=merged#StudyPageTop (22 pages).
History of Changes for Study: NCT03078751, Adjuvant Ribociclib With Endocrine Therapy in Hormone Receptor+/ HER2- High Risk Early Breast Cancer (EarLEE-1) (EarLEE-1), posted on Mar. 13, 2017 available at https://classic.clinicaltrials.gov/ct2/history/NCT03078751?A=1&B=1&C=merged#StudyPageTop (10 pages).
History of Changes for Study: NCT03081234, Adjuvant Ribociclib With Endocrine Therapy in Hormone Receptor+/ HER2- Intermediate Risk Early Breast Cancer (EarLEE-2) (EarLEE-2), posted on Mar. 16, 2017 available at https://classic.clinicaltrials.gov/ct2/history/NCT03081234?A=1&B=1&C=merged#StudyPageTop (8 pages).
History of Changes for Study: NCT03701334, A Phase III Multicenter, Randomized, Open-label Trial to Evaluate Efficacy and Safety of Ribociclib With Endocrine Therapy as Adjuvant Treatment in Patients With HR+/HER2- Early Breast Cancer (NATALEE), posted on Oct. 10, 2018 available at https://classic.clinicaltrials.gov/ct2/history/NCT03701334?A=1&B=1&C=merged#StudyPageTop (10 pages).
Hortobagyi et al, "Ribociclib + Nonsteroidal Aromatase Inhibitor as Adjuvant Treatment in Patients With HR+/HER2- Early Breast Cancer: Final Invasive Disease-Free Survival Analysis From the NATALEE Trial" presented at the San Antonio Breast Cancer Symposium on Dec. 8, 2023 (16 pages).
Hortobagyi, et al., Overall Survival with Ribociclib plus Letrozole in Advances Breast Cancer, The New England Journal of Medicine, 386(10), 942-950, Mar. 10, 2022.
Im et al, Overall Survival with Ribociclib plus Endocrine Therapy in Breast Cancer, N Engl J Med, vol. 381 Issue 4, 307-16, 2019.
Infante et al, A Phase I Study of the Cyclin-Dependent Kinase 4/6 Inhibitor Ribociclib (LEE011) in Patients with Advanced Solid Tumors and Lymphomas, Clin Cancer Res, vol. 22 Issue 23, 5696-705, 2016.
Kisqali Prescribing information published Aug. 24, 2023 (30 pages).
Liu, "ASCO: Novartis pressures Lilly with Kisqali, targeting $3B opportunity in early breast cancer," Fierce Pharma, published on Jun. 2, 2023, available at https://www.fiercepharma.com/pharma/novartis-pressures-lilly-targeting-broader-use-adjuvant-kisqali-early-breast-cancer (3 pages).
Liu, "SABCS: Novartis touts Kisqali's 5-year breast cancer survival, advantage over Pfizer's Ibrance," posted on Dec. 9, 2020 available athttps://www.fiercepharma.com/marketing/sabcs-novartis-touts-kisqali-s-5-year-breast-cancer-survival-advantage-over-pfizer-s (5 pages).
Loibl et al, Palbociclib for Residual High-Risk Invasive HR-Positive and HER2-Negative Early Breast Cancer—The Penelope-B Trial, J Clin Oncol, vol. 39 Issue 14, 1518-30, 2021.
Mayer et al, Palbociclib with adjuvant endocrine therapy in early breast cancer (PALLAS): interim analysis of a multicentre, open-label, randomised, phase 3 study, Lancet Oncol, vol. 22 Issue 2, 212-22, 2021.
National Comprehensive Cancer Network, "Development and Update of Guidelines," available at https://www.nccn.org/guidelines/guidelines-process/development-and-update-of-guidelines, Feb. 7, 2024 (9 pages).
Novartis, "Novartis Kisqali® NATALEE analysis reinforces consistent reduction in risk of recurrence across key subgroups of patients with early breast cancer," posted on Oct. 20, 2023, available at https://www.novartis.com/news/media-releases/novartis-kisqali-natalee-analysis-reinforces-consistent-reduction-risk-recurrence-across-key-subgroups-patients-early-breast-cancer (7 pages).
Novartis, "Novartis ribociclib (Kisqali®) only Category 1 preferred first-line treatment option for HR+/HER2- mBC in combination with an AI in updated NCCN Clinical Practice Guidelines in Oncology (NCCN Guidelines®)," published on Mar. 28, 2023, available at https://www.novartis.com/US-en/news/media-releases/novartis-ribociclib-kisqali-only-category-1-preferred-first-line-treatment-option-hrher2-mbc-combination-ai-updated-nccn-clinical-practice-guidelines-oncology-nccn-guidelines (5 pages).
Pfizer Press Release, "Pfizer Provides Update on Phase 3 PALLAS Trial of IBRANCE® (palbociclib) Plus Endocrine Therapy in HR+, HER2- Early Breast Cancer," published on May 29, 2020, available at https://www.pfizer.com/news/press-release/press-release-detail/pfizer-provides-update-phase-3-pallas-trial-ibrancer (24 pages).
Slamon et al, Overall Survival With Palbociclib Plus Letrozole in Advanced Breast Cancer, J Clin Oncol, 9 pages. Jan. 23, 2024.
Slamon et al, Rationale and trial design of NATALEE: a Phase III trial of adjuvant ribociclib + endocrine therapy versus endocrine therapy alone in patients with HR+/HER2- early breast cancer, Ther Adv Med Oncol, vol. 15, 1-16, 2023.
Slamon et al, Ribociclib and endocrine therapy as adjuvant treatment in patients with HR+/HER2- early breast cancer: Primary results from the phase III NATALEE trial, J Clin Oncol, vol. 41 Issue 17 Suppl, LBA500 (1 page), Jun. 7, 2023.
Toppe, "Novartis shares jump on breast cancer drug trials success," published on Mar. 27, 2023, available at https://www.foxbusiness.com/markets/novartis-shares-jump-breast-cancer-drug-trials-success (3 pages).
Turner et al, Overall Survival with Palbociclib and Fulvestrant in Advanced Breast Cancer, N Engl J Med, vol. 379 Issue 20, 1926-36, 2018.
Waseem, "Novartis Surges on Positive Key Cancer Trial Results," Capitol Trades published on Mar. 27, 2023, available at https://www.capitoltrades.com/articles/novartis-surges-on-positive-key-cancer-trial-results-2023-03-27 (3 pages).
National Comprehensive Cancer Network, "NCCN Clinical Practice Guidelines in Oncology (NCCN Guidelines): Breast Cancer," dated Jan. 25, 2024 (3 pages).
Burris et al, Safety and impact of dose reductions on efficacy in the randomised MONALEESA-2, -3 and -7 trials in hormone receptor-positive, HER2-negative advanced breast cancer, British Journal of Cancer, vol. 125 Issue 5, 679-686, Jun. 22, 2021.
Finn et al, Overall survival results from the randomized phase 2 study of palbociclib in combination with letrozole versus letrozole alone for first-line treatment of ER+/HER2- advanced breast cancer (PALOMA-1, TRIO-18), Breast Cancer Res Treat, vol. 183 Issue 2, 419-28, 2020.
Giaccone et al, Gefitinib in combination with gemcitabine and cisplatin in advanced non-small-cell lung cancer: a phase III trial—INTACT 1, J Clin Oncol, vol. 22 Issue 5, 777-84, Mar. 1, 2004.
Herbst et al, TRIBUTE: a phase III trial of erlotinib hydrochloride (OSI-774) combined with carboplatin and paclitaxel chemotherapy in advanced non-small-cell lung cancer, J Clin Oncol, vol. 23 Issue 25, 5892-9, Sep. 1, 2005.
Jhaveri et al, Matching-adjusted indirect comparison of PFS and OS comparing ribociclib plus letrozole versus palbociclib plus letrozole as first-line treatment of HR+/HER2- advanced breast cancer, Ther Adv Med Oncol, vol. 15, 1-11, 2023.
Neve et al, A collection of breast cancer cell lines for the study of functionally distinct cancer subtypes, Cancer Cell, vol. 10 Issue 6, 515-27, Dec. 2006.

(56) References Cited

OTHER PUBLICATIONS

Pfizer Press Release, "Pfizer's Palbociclib (PD-0332991) Receives Food and Drug Administration Breakthrough Therapy Designation for Potential Treatment of Patients with Breast Cancer," published Apr. 9, 2013 (16 pages).
Clinical trial NCT01872260, May 30, 2013, available at https://clinicaltrials.gov/search?term=NCT01872260.
Dean, et al., Therapeutic response to CDK4/6 inhibition in breast cancer defined by ex vivo analyses of human tumors, Cell Cycle, 11(14), 2756-2761, Jul. 15, 2012.
FDA approval of Kisqali (ribociclib), FDA approves ribociclib with an aromatase inhibitor and ribociclib and letrozole co-pack for early high-risk breast cancer, Sep. 17, 2024, pp. 1-2.
Furet, et al., Discovery of NVP-BYL719 a potent and selective phosphatifylinositol-3 kinase alpha inhibitor selected for clinical evaluation, Bioorganic & Medicinal Chemistry Letters, 23 (13), 3741-3748, May 14, 2013.
Highlights of prescribing information Kisqali, KISQALI (ribociclib) tablets, for oral use, revised Sep. 2024, 35 pages.
Highlights prescribing information Ibrance (palbociclib) tablets, for oral use, Dec. 2024. pp. 27.
Hortobagyi, et al., A phase III trial of adjuvant ribociclib plus endocrine therapy vs endocrine therapy alone in patients with HR+/HER2− early breast cancer: final invasive disease-free survival results from the NATALEE trial, Annals of Oncology, 36(2), 149-157, Oct. 11, 2024.
Kahraman, et al., Treatment efficacy of ribociclib or palbociclib plus letrozole in hormone receptor-positive/H ER2-negative metastatic breast cancer, Future Oncology, 19(10), 727-736, May 3, 2023.
Kappel, et al., Comparative overall survival of CDK4/6 inhibitors in combination with endocrine therapy in advanced breast cancer, Scientific Reports, 14:3129, 2024.
Kim, LEE011: A selective CDK4/6 inhibitor that reactivates Rb, AACR-NCI-EORTO Molecular Targets and Cancer Therapeutics, LEE011, 12 pages, Oct. 20, 2013, presentation.
Lange, et al., Killing the second messenger: targeting loss of cell cycle control in endocrine-resistant breast cancer, Endocrine-Related Cancer, 18, C19-C24, 2011.
Novartis Kisqali receives European Commission approval in a broad population of patients with HR+/HER2− early breast cancer at high risk of recurrence, dated Nov. 27, 2024, p. 10.
Novartis receives positive CHMP opinion for Kisqali® to help reduce risk of recurrence in people with HR+/HER2−early breast cancer. Basel, Oct. 18, 2024, pp. 1-9.
Oncology recommendations. Recommendations as of Jan. 10, 2024 apply to the South-Eastern Norway Regional Health Authority, Western Norway Regional Health Authority, Central Norway Regional Health Authority and Northern Norway Regional Health Authority. For the period Jan. 10, 2024-Sep. 30, 2025, pp. 1 and 18.
Slamon, et al., Ribociclib plus Endocrine Therapy in Early Breast Cancer, The New England Journal of Medicine, 390 (12), 1080-1091, Mar. 2024.
Trewin-Nybraten, Updated report. The effect of ribociclib, palbociclib, and abemaciclib on survival of metastatic HR-positive HER2-negative breast cancer: a real-world analysis from Norway, The Cancer Registry of Norway, 1-40, Jun. 19, 2024.
Robertson, et al., ICI 182,780 (Fulvestrant™)—the first oestrogen receptor down-regulator—current clinical data, British Journal of Cancer, 85(suppl. 2), 11-14, 2001.
Vanarsdale, et al., Molecular Pathways: Targeting the Cyclin D-CDK4/6 Axis for Cancer Treatment, Clinical Cancer Research, 21(13), 2905-2910, Jul. 1, 2015.
NCCN Guidelines for Patients, Metastatic Breast Cancer, 2024, p. 76.
Tolaney, et al., Phase Ib Study of Ribociclib plus Fulvestrant and Ribociclib plus Fulvestrant plus PI3K Inhibitor (Alpelisib or Buparlisib) for HRb Advanced Breast Cancer, Clinical Cancer Research, 27(12), 418-428, Jan. 15, 2021.
Yan et al., Chin J. Cancer, Molecular Targeted Agents—where we are and where we are going, 32(5):225—pp. 225-232 (2013).

\* cited by examiner

Partial Response Observed With Compound A1 300 mg + EVE 2.5 mg + EXE 25 mg

COMBINATION THERAPY USING RIBOCICLIB AND FULVESTRANT FOR THE TREATMENT OF HR+ BREAST CANCER

FIELD OF THE DISCLOSURE

The present disclosure relates to a pharmaceutical combination comprising a CDK inhibitor and an anti-hormonal agent for the treatment of cancer; the uses of such combinations in the treatment of cancer; and to a method of treating warm-blooded animals including humans suffering cancer comprising administering to said animal in need of such treatment an effective dose of a CDK inhibitor and an anti-hormonal agent. In addition, the combination can optionally include an agent that regulates the PI3K/Akt/mTOR pathway.

BACKGROUND OF THE DISCLOSURE

CDK Inhibitors

Tumor development is closely associated with genetic alteration and deregulation of CDKs and their regulators, suggesting that inhibitors of CDKs may be useful anti-cancer therapeutics. Indeed, early results suggest that transformed and normal cells differ in their requirement for, e.g., cyclin D/CDK4/6 and that it may be possible to develop novel antineoplastic agents devoid of the general host toxicity observed with conventional cytotoxic and cytostatic drugs.

The function of CDKs is to phosphorylate and thus activate or deactivate certain proteins, including e.g. retinoblastoma proteins, lamins, histone H1, and components of the mitotic spindle. The catalytic step mediated by CDKs involves a phospho-transfer reaction from ATP to the macromolecular enzyme substrate. Several groups of compounds (reviewed in e.g. Fischer, P. M. Curr. Opin. Drug Discovery Dev. 2001, 4, 623-634) have been found to possess anti-proliferative properties by virtue of CDK-specific ATP antagonism.

At a molecular level mediation of CDK/cyclin complex activity requires a series of stimulatory and inhibitory phosphorylation, or dephosphorylation, events. CDK phosphorylation is performed by a group of CDK activating kinases (CAKs) and/or kinases such as wee1, Myt1 and Mik1. Dephosphorylation is performed by phosphatases such as cdc25(a & c), pp2a, or KAP.

CDK/cyclin complex activity may be further regulated by two families of endogenous cellular proteinaceous inhibitors: the Kip/Cip family, or the INK family. The INK proteins specifically bind CDK4 and CDK6. p16ink4 (also known as MTS1) is a potential tumour suppressor gene that is mutated, or deleted, in a large number of primary cancers. The Kip/Cip family contains proteins such as p21Cip1, Waf1, p27Kip1 and p57kip2, where p21 is induced by p53 and is able to inactivate the CDK2/cyclin(E/A) complex. Atypically low levels of p27 expression have been observed in breast, colon and prostate cancers. Conversely over expression of cyclin E in solid tumours has been shown to correlate with poor patient prognosis. Over expression of cyclin D1 has been associated with oesophageal, breast, squamous, and non-small cell lung carcinomas.

The pivotal roles of CDKs, and their associated proteins, in co-ordinating and driving the cell cycle in proliferating cells have been outlined above. Some of the biochemical pathways in which CDKs play a key role have also been described. The development of monotherapies for the treatment of proliferative disorders, such as cancers, using therapeutics targeted generically at CDKs, or at specific CDKs, is therefore potentially highly desirable. Thus, there is a continued need to find new therapeutic agents to treat human diseases.

Anti-Hormonal Agent

Anti-hormonal agent works in two ways: (1) by lowering the amount of the hormone in the body or (2) by blocking the action of hormone on cells.

Various types of anti-hormonal agents are known.

One type of anti-hormonal agents is known as aromatase inhibitors. Aromatase inhibitors work by inhibiting the action of the enzyme aromatase, which converts androgens into estrogens by a process called aromatization. As breast tissue is stimulated by estrogens, decreasing their production is a way of suppressing recurrence of the breast tumor tissue. The main source of estrogen is the ovaries in premenopausal women, while in post-menopausal women most of the body's estrogen is produced in peripheral tissues (outside the CNS), and also a few CNS sites in various regions within the brain. Estrogen is produced and acts locally in these tissues, but any circulating estrogen, which exerts systemic estrogenic effects in men and women, is the result of estrogen escaping local metabolism and spreading to the circulatory system. There are two types of aromatase inhibitors: (1) steroidal inhibitors, such as exemestane (AROMASIN®) which forms a permanent and deactivating bond with the aromatase enzyme; and (2) non-steroidal inhibitors, such as anastrozole (ARIMIDEX®) or Letrozole (FEMARA®) which inhibit the synthesis of estrogen via reversible competition for the aromatase enzyme.

Another type of anti-hormonal agent is estrogen receptor antagonist. An example of an estrogen receptor antagonist is fulvestrant (FASLODEX®). Estrogen receptors are found in and on breast cells. Estrogen binds to estrogen receptors, like a key fitting into a lock. This can activate the receptor and cause hormone receptor-positive tumors to grow. Fulvestrant binds to and blocks estrogen receptors and reduces the number of estrogen receptors in breast cells.

Another type of anti-hormonal agent is selective estrogen receptor modulators (SERMs) are a class of compounds that act on the estrogen receptor. A characteristic that distinguishes these substances from pure receptor agonists and antagonists is that their action is different in various tissues, thereby granting the possibility to selectively inhibit or stimulate estrogen-like action in various tissues An example of a SERM is tamoxifen. Tamoxifen is an estrogen receptor agonist at bone and uterus, but an antagonist at breast.

Agent that Regulates the PI3K/Akt/mTOR Pathway

The PI3K/Akt/mTOR pathway is an important, tightly regulated survival pathway for the normal cell. Phosphatidylinositol 3-kinases (PI3Ks) are widely expressed lipid kinases that catalyze the transfer of phosphate to the D-3' position of inositol lipids to produce phosphoinositol-3-phosphate (PIP), phosphoinositol-3,4-diphosphate ($PIP_2$) and phosphoinositol-3,4,5-triphosphate ($PIP_3$). These products of the PI3K-catalyzed reactions act as second messengers and have central roles in key cellular processes, including cell growth, differentiation, mobility, proliferation and survival.

Of the two Class 1 PI3Ks, Class 1A PI3Ks are heterodimers composed of a catalytic p110 subunit (α, β, δ isoforms) constitutively associated with a regulatory subunit that can be p85α, p55α, p50α, p85β or p55γ. The Class 1B sub-class has one family member, a heterodimer composed of a catalytic p110γ subunit associated with one of two regulatory subunits, p101 or p84 (Fruman et al., *Annu Rev. Biochem.* 67:481 (1998); Suire et al., *Curr. Biol.* 15:566 (2005)).

In many cases, PIP2 and PIP3 recruit AKT to the plasma membrane where it acts as a nodal point for many intracellular signaling pathways important for growth and survival (Fantl et al., *Cell* 69:413-423(1992); Bader et al., *Nature Rev. Cancer* 5:921 (2005); Vivanco and Sawyer, *Nature Rev. Cancer* 2:489 (2002)). Aberrant regulation of PI3K, which often increases survival through AKT activation, is one of the most prevalent events in human cancer and has been shown to occur at multiple levels. The tumor suppressor gene PTEN, which dephosphorylates phosphoinositides at the 3' position of the inositol ring and in so doing antagonizes PI3K activity, is functionally deleted in a variety of tumors. In other tumors, the genes for the p110a isoform, PIK3CA, and for AKT are amplified and increased protein expression of their gene products has been demonstrated in several human cancers. Further, somatic missense mutations in PIK3CA that activate downstream signaling pathways have been described at significant frequencies in a wide diversity of human cancers (Kang at el., *Proc. Natl. Acad. Sci. USA* 102:802 (2005); Samuels et al., *Science* 304:554 (2004); Samuels et al., *Cancer Cell* 7:561-573 (2005)). Thus, inhibitors of PI3K alpha are known to be of particular value in the treatment of cancer and other disorders.

mTOR is a kinase protein predominantly found in the cytoplasm of the cell. It acts as a central regulator of many biological processes related to cell proliferation, angiogenesis, and cell metabolism. mTOR exerts its effects primarily by turning on and off the cell's translational machinery, which includes the ribosomes, and is responsible for protein synthesis. mTOR is a key intracellular point of convergence for a number of cellular signaling pathways. mTOR performs its regulatory function in response to activating or inhibitory signals transmitted through these pathways, which are located upstream from mTOR in the cell. These diverse signaling pathways are activated by a variety of growth factors (including vascular endothelial growth factors (VEGFs), platelet-derived growth factor (PDGF), epidermal growth factor (EGF), insulin-like growth factor 1 (IGF-1)), hormones (estrogen, progesterone), and the presence or absence of nutrients (glucose, amino acids) or oxygen. One or more of these signaling pathways may be abnormally activated in patients with many different types of cancer, resulting in deregulated cell proliferation, tumor angiogenesis, and abnormal cell metabolism.

In spite of numerous treatment options for cancer patients, there remains a need for effective and safe therapeutic agents and a need for their preferential use in combination therapy.

SUMMARY OF THE DISCLOSURE

The present disclosure relates to a pharmaceutical combination comprising (1) a first agent which is a CDK inhibitor or a pharmaceutically acceptable salt thereof and (2) a second agent which is an anti-hormonal agent or a pharmaceutically acceptable salt thereof.

The present disclosure also relates to a pharmaceutical combination comprising (1) a first agent which is a CDK inhibitor or a pharmaceutically acceptable salt thereof, (2) a second agent which is an anti-hormonal agent or a pharmaceutically acceptable salt thereof, and (3) a third agent which is an agent that regulates the PI3K/Akt/mTOR pathway or a pharmaceutically acceptable salt thereof.

Such combination may be for simultaneous, separate or sequential use for the treatment of a cancer.

In one embodiment, the CDK inhibitor is CDK4/6 inhibitor.

The CDK4/6 inhibitor can be, for example, Compound A1, described by Formula A1 below:

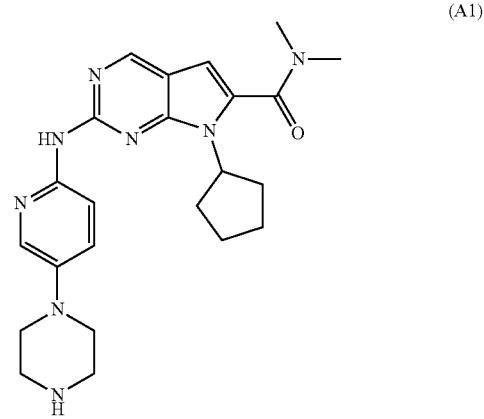 [SMILES: CN(C)C(=O)c1cc2cnc(Nc3ccc(N4CCNCC4)cn3)nc2n1C1CCCC1]

(A1)

or,

Compound A2, described by Formula A2 below:

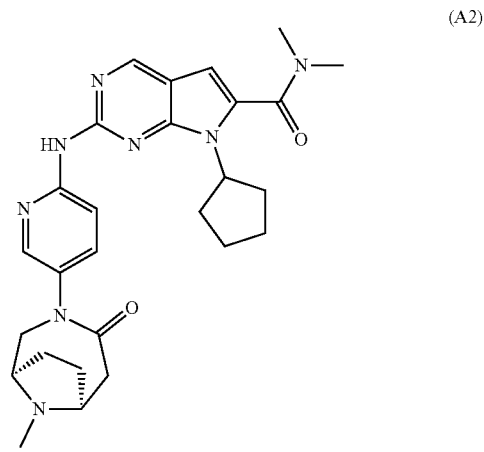 [SMILES: CN(C)C(=O)c1cc2cnc(Nc3ccc(N4C[C@H]5CC[C@@H](CC4=O)N5C)cn3)nc2n1C1CCCC1]

(A2)

or, palbociclib (hereinafter referred as Compound A3, also known as PD-0332991).

Compound A1 is also described by the chemical name 7-Cyclopentyl-2-(5-piperazin-1-yl-pyridin-2-ylamino)-7H-pyrrolo[2,3-d]pyrimidine-6-carboxylic acid dimethylamide.

Compound A2 is also described by the chemical name 7-cyclopentyl-N,N-dimethyl-2-(5-((1R,6S)-9-methyl-4-oxo-3,9-diazabicyclo[4.2.1]nonan-3-yl)pyridin-2-ylamino)-7H-pyrrolo[2,3-d]pyrimidine-6-carboxamide.

Compound A3 is also described by the chemical name 6-Acetyl-8-cyclopentyl-5-methyl-2-{[5-(1-piperazinyl)-2-pyridinyl]amino}pyrido[2,3-d]pyrimidin-7(8H)-one.

In one embodiment, the anti-hormonal agent is an aromatase inhibitor. Such aromatase inhibitor can be either a non-steroidal aromatase inhibitor or a steroidal aromatase inhibitor.

Letrozole (hereinafter referred as Compound 1) is an example of a non-steroidal aromatase inhibitor.

Exemestane (hereinafter referred as Compound B2) is an example of a steroidal aromatase inhibitor.

In another embodiment, the anti-hormonal agent is an estrogen receptor antagonist.

Fulvestrant (hereinafter referred as Compound B3) is an example of an estrogen receptor antagonist.

In yet another embodiment, the anti-hormonal agent is a selective estrogen receptor modulator.

Tamoxifen (hereinafter referred as Compound B4) is an example of a selective estrogen receptor modulator.

In one embodiment, the agent that regulates the PI3K/Akt/mTOR pathway is a PI3K inhibitor.

The PI3K inhibitor can be, for example,

Compound C1, described by Formula C1 below:

(C1)

or,

Compound C2, described by Formula C2 below:

(C2)

Compound C1 is also described by the chemical name (S)-Pyrrolidine-1,2-dicarboxylic acid 2-amide 1-({4-methyl-5-[2-(2,2,2-trifluoro-1,1-dimethyl-ethyl)-pyridin-4-yl]-thiazol-2-yl}-amide).

Compound C2 is also described by the chemical name 5-(2,6-di-4-morpholinyl-4-pyrimidinyl)-4-(trifluoromethyl)-2-pyrimidinamine.

In another embodiment, the agent that regulates the PI3K/Akt/mTOR pathway is a mTOR inhibitor.

Everolimus (hereinafter referred as Compound C3) is an example of a mTOR inhibitor.

The present disclosure further relates to the above pharmaceutical combination(s) for use in the treatment of a cancer.

The present disclosure further relates to a method for the treatment of a cancer comprising administering the above pharmaceutical combination(s) in jointly therapeutically effective amount, to a warm-blooded animal, preferably a human, in need thereof.

In accordance with the present disclosure, the compounds in the pharmaceutical combination(s) may be administered either as a single pharmaceutical composition, as separate compositions, or sequentially.

In a specific embodiment, the disclosure relates to a pharmaceutical combination comprising (1) a first agent which is Compound A1 described by Formula A1 below or a pharmaceutically acceptable salt thereof:

(A1)

and (2) a second agent which is letrozole.

In another specific embodiment, the disclosure relates to a pharmaceutical combination comprising (1) a first agent which is Compound A1 described by Formula A1 below or a pharmaceutically acceptable salt thereof:

(A1)

(2) a second agent which is letrozole, and (3) a third agent which is Compound C1, described by Formula C1 below or a pharmaceutically acceptable salt thereof:

(C1)

In another specific embodiment, the disclosure relates to a pharmaceutical combination comprising (1) a first agent which is Compound A1 described by Formula A1 below or a pharmaceutically acceptable salt thereof:

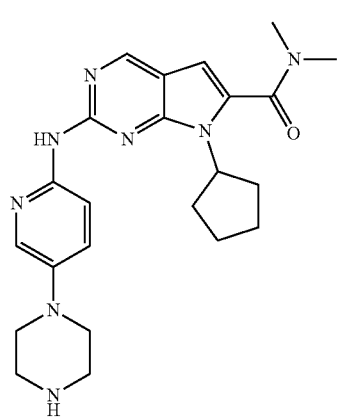

(A1)

(2) a second agent which is letrozole, and
(3) a third agent which is Compound C2, described by Formula C2 below or a pharmaceutically acceptable salt thereof:

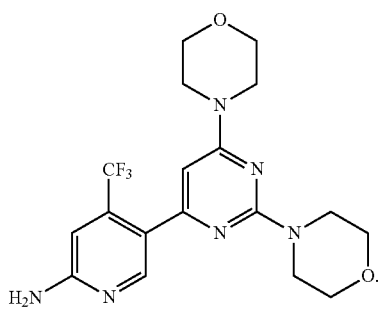

(C2)

In another specific embodiment, the disclosure relates to a pharmaceutical combination comprising (1) a first agent which is Compound A1 described by Formula A1 below or a pharmaceutically acceptable salt thereof:

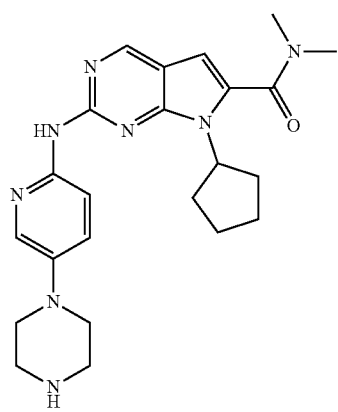

(A1)

and (2) a second agent which is fulvestrant.

In another specific embodiment, the disclosure relates to a pharmaceutical combination comprising (1) a first agent which is Compound A1 described by Formula A1 below or a pharmaceutically acceptable salt thereof:

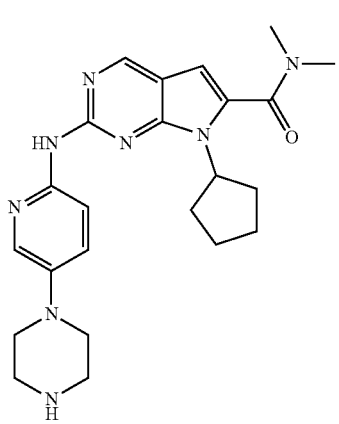

(A1)

(2) a second agent which is fulvestrant, and
(3) a third agent which is Compound C1, described by Formula C1 below or a pharmaceutically acceptable salt thereof:

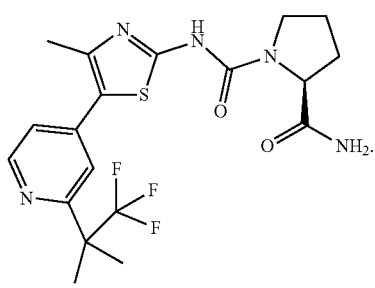

(C1)

In another specific embodiment, the disclosure relates to a pharmaceutical combination comprising (1) a first agent which is Compound A1 described by Formula A1 below or a pharmaceutically acceptable salt thereof:

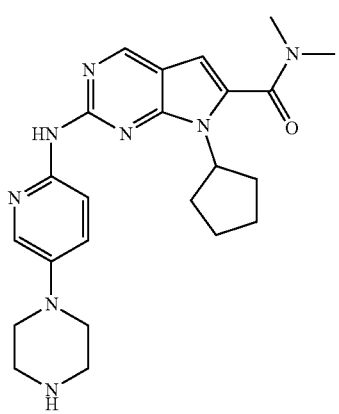

(A1)

(2) a second agent which is fulvestrant, and
(3) a third agent which is Compound C2, described by Formula C2 below or a pharmaceutically acceptable salt thereof:

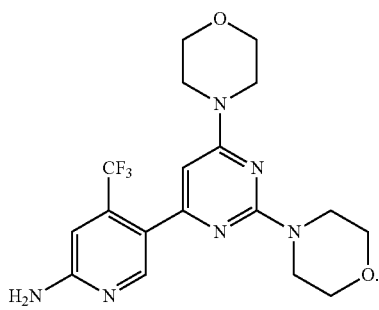
(C2)

In another specific embodiment, the disclosure relates to a pharmaceutical combination comprising (1) a first agent which is Compound A1 described by Formula A1 below or a

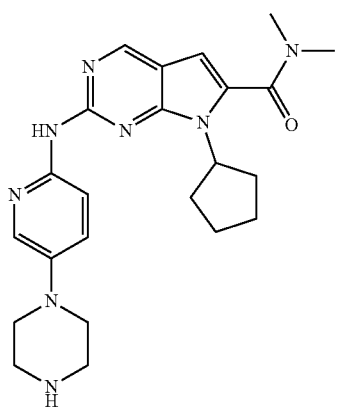
(A1)

(2) a second agent which is everolimus, and
(3) a third agent which is exemestane.

In another specific embodiment, the disclosure relates to a method of treating HR+, HER2− breast cancer comprising administering to a subject a pharmaceutical combination comprising (1) a first agent which is Compound A1 described by Formula A1 below or a pharmaceutically acceptable salt thereof:

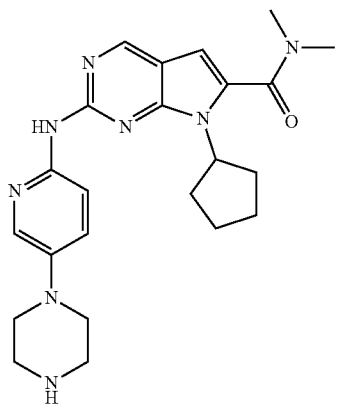
(A1)

and (2) a second agent which is letrozole.

In another specific embodiment, the disclosure relates to a method of treating ER+, HER2− advanced breast cancer comprising administering to a subject a pharmaceutical combination comprising (1) a first agent which is Compound A1 described by Formula A1 below or a pharmaceutically acceptable salt thereof:

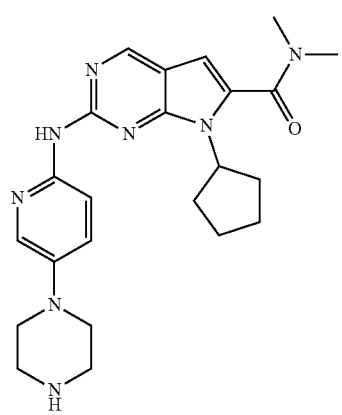
(A1)

and (2) a second agent which is letrozole.

In another specific embodiment, the disclosure relates to a method of treating ER+ advanced breast cancer comprising administering to a subject a pharmaceutical combination comprising (1) a first agent which is Compound A1 described by Formula A1 below or a pharmaceutically acceptable salt thereof:

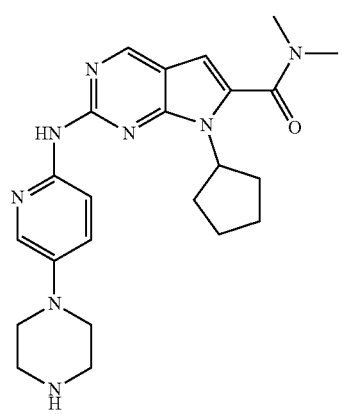
(A1)

(2) a second agent which is letrozole, and
(3) a third agent which is Compound C1, described by Formula C1 below or a pharmaceutically acceptable salt thereof:

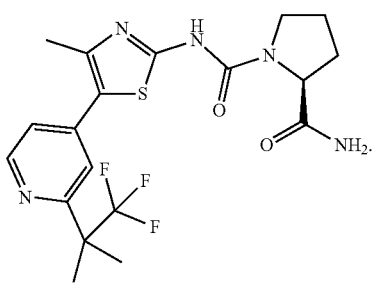

(C1)

In another specific embodiment, the disclosure relates to a method of treating ER+ advanced breast cancer comprising administering to a subject a pharmaceutical combination comprising (1) a first agent which is Compound A1 described by Formula A1 below or a pharmaceutically acceptable salt thereof:

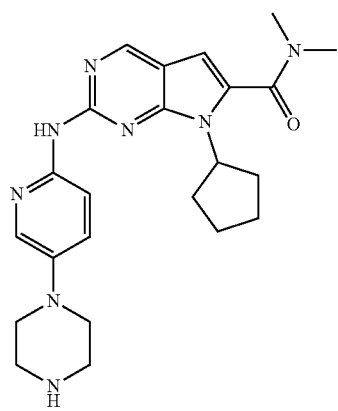

(A1)

(2) a second agent which is letrozole, and (3) a third agent which is Compound C2, described by Formula C2 below or a pharmaceutically acceptable salt thereof:

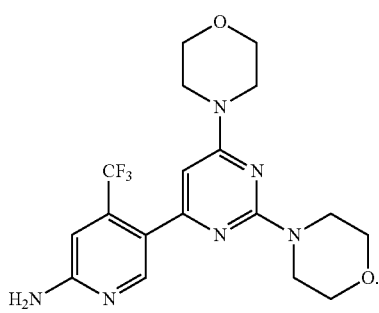

(C2)

In another specific embodiment, the disclosure relates to a method of treating postmenopausal woman with ER+, HER2− breast cancer comprising administering to a subject a pharmaceutical combination comprising (1) a first agent which is Compound A1 described by Formula A1 below or a pharmaceutically acceptable salt thereof:

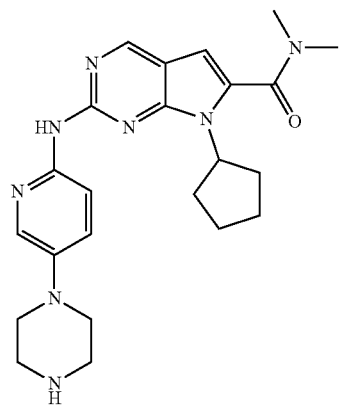

(A1)

and (2) a second agent which is fulvestrant.

In another specific embodiment, the disclosure relates to a method of treating postmenopausal woman with ER+, HER2− breast cancer comprising administering to a subject a pharmaceutical combination comprising (1) a first agent which is Compound A1 described by Formula A1 below or a pharmaceutically acceptable salt thereof:

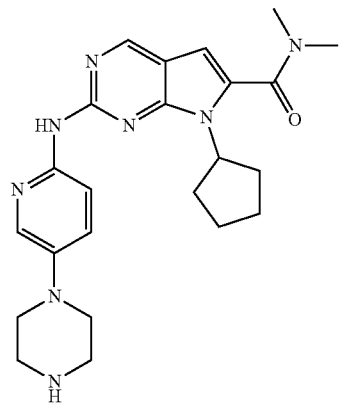

(A1)

(2) a second agent which is fulvestrant, and (3) a third agent which is Compound C1, described by Formula C1 below or a pharmaceutically acceptable salt thereof:

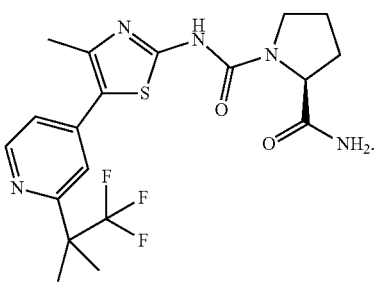

(C1)

In another specific embodiment, the disclosure relates to a method of treating postmenopausal woman with ER+, HER2− breast cancer comprising administering to a subject a pharmaceutical combination comprising (1) a first agent which is Compound A1 described by Formula A1 below or a pharmaceutically acceptable salt thereof:

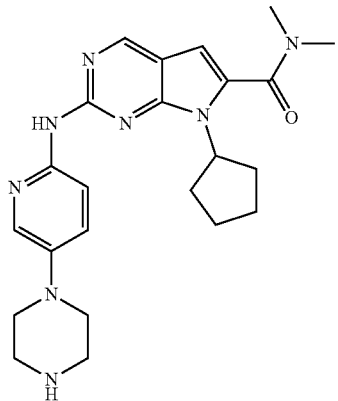

(A1)

(2) a second agent which is fulvestrant, and
(3) a third agent which is Compound C2, described by Formula C2 below or a pharmaceutically acceptable salt thereof:

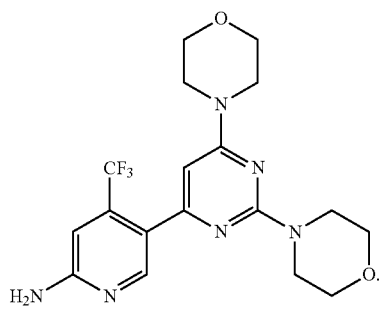

(C2)

In another specific embodiment, the disclosure relates to a method of treating ER+ breast cancer comprising administering to a subject a pharmaceutical combination comprising (1) a first agent which is Compound A1 described by Formula A1 below or a pharmaceutically acceptable salt thereof:

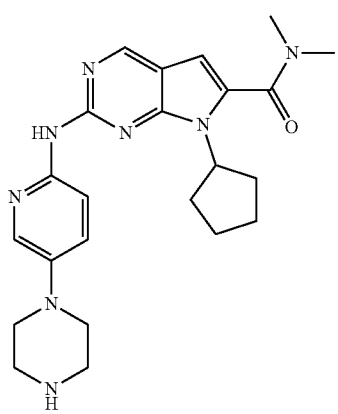

(A1)

(2) a second agent which is everolimus, and
(3) a third agent which is exemestane.

The present disclosure further relates to a kit comprising the pharmaceutical combination.

DETAILED DESCRIPTION OF THE FIGURES

DETAILED DESCRIPTION OF THE DISCLOSURE

Figure 1:
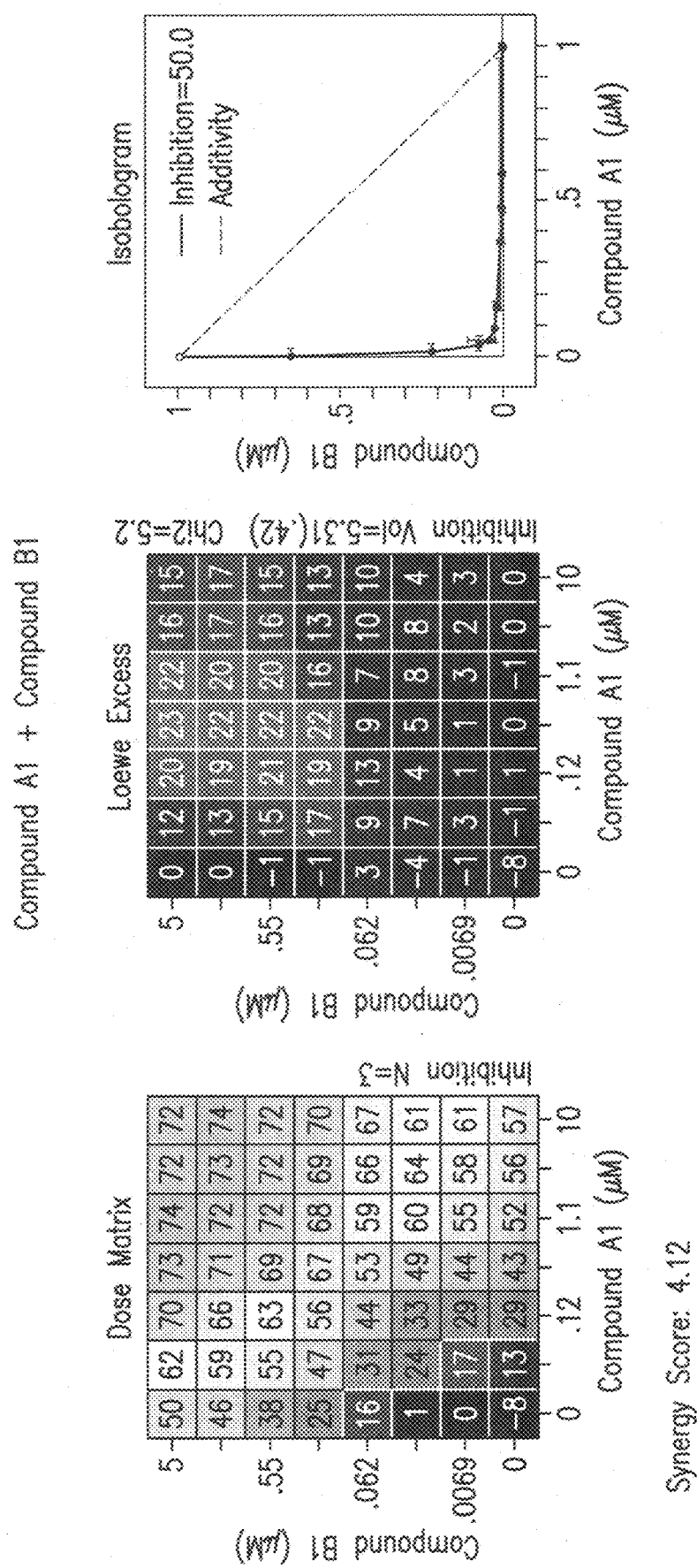
FIG. 1 shows an extended dose matrix and isobologram demonstrating the effects of combining Compound A1 and Compound 1 doses on proliferation of MCF7/ARO human breast carcinoma cells with Δ4A.
Figure 2:
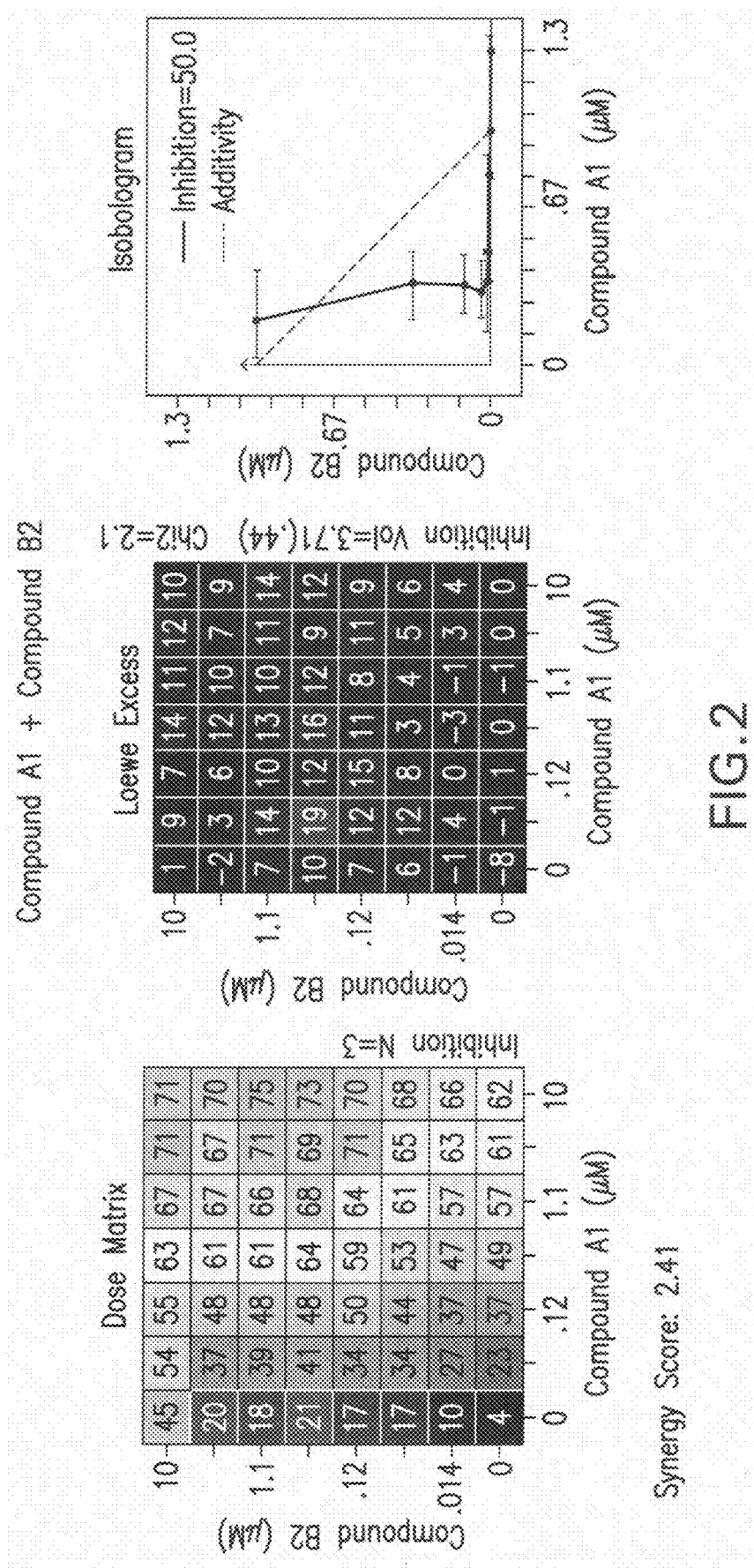
FIG. 2 shows an extended dose matrix and isobologram demonstrating the effects of combining Compound A1 and Compound B2 doses on proliferation of MCF7/ARO human breast carcinoma cells with Δ4A.
Figure 3:
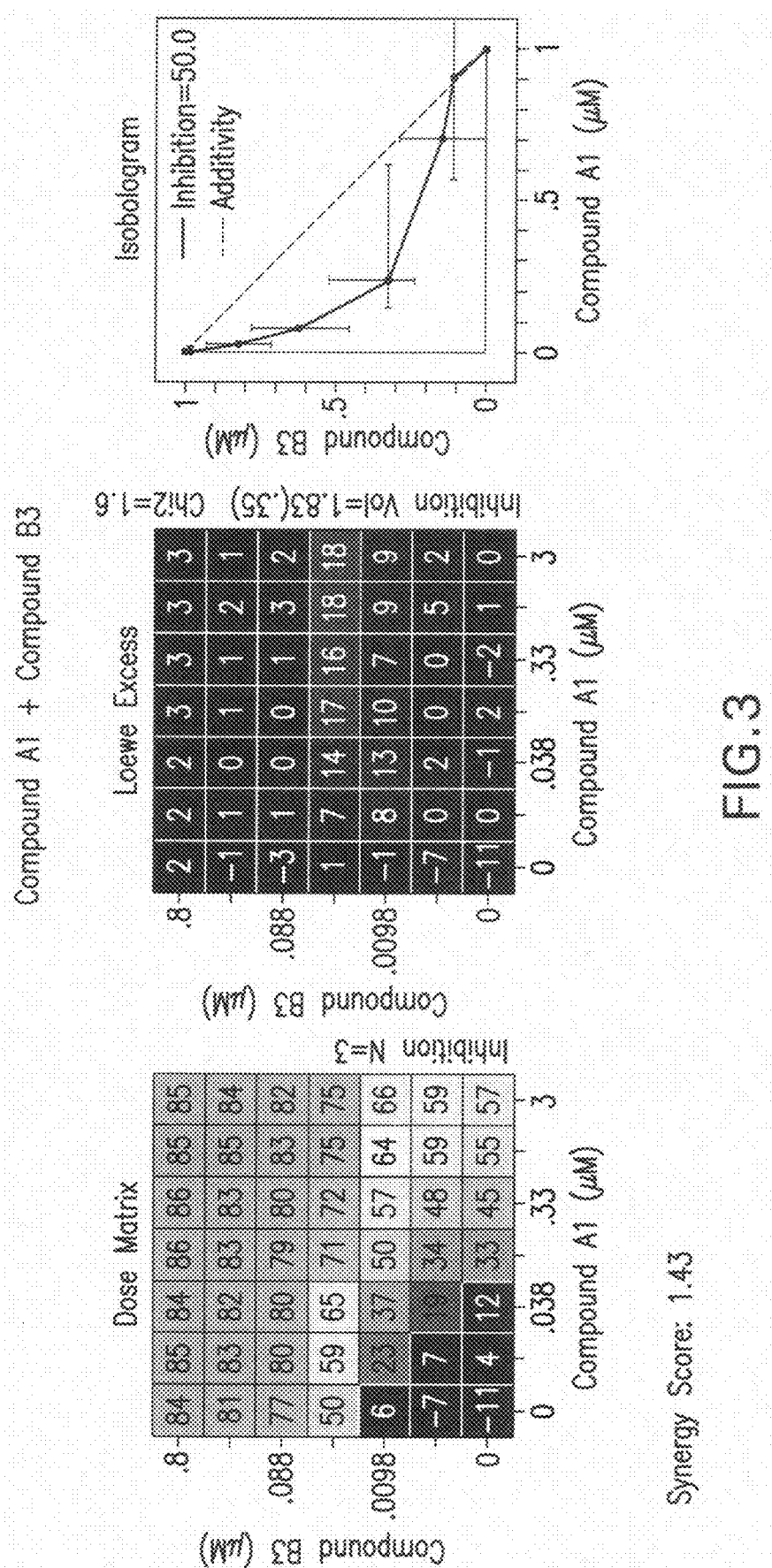
FIG. 3 shows an extended dose matrix and isobologram demonstrating the effects of combining Compound A1 and Compound B3 doses on proliferation of MCF7/ARO human breast carcinoma cells with Δ4A.
Figure 4:
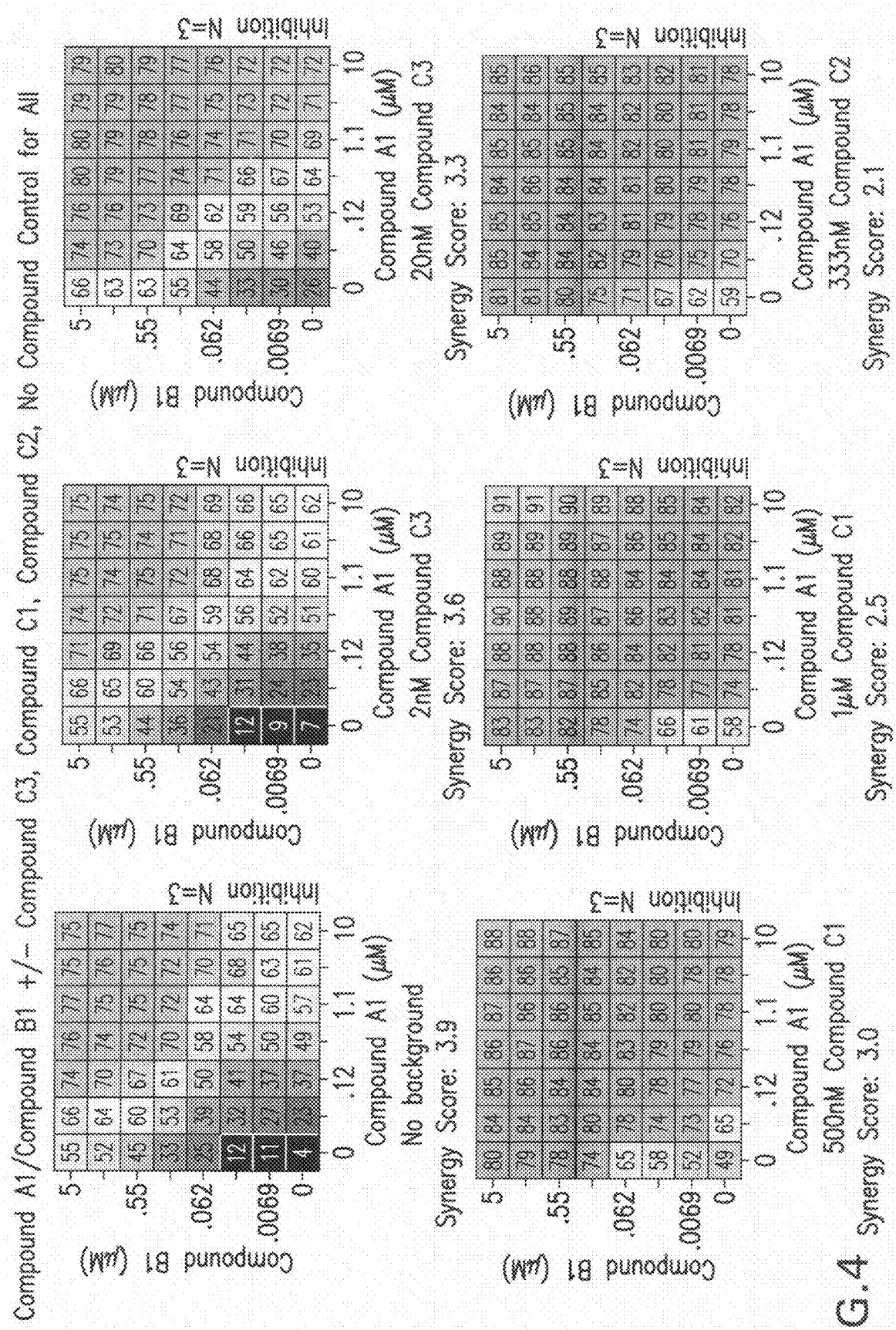
FIG. 4 shows an extended dose matrix demonstrating the effects of combining Compound A1 and Compound 1 with or without the presence of Compound C1, Compound C2 or Compound C3 on proliferation of MCF7/ARO human breast carcinoma cells with Δ4A.
Figure 5:
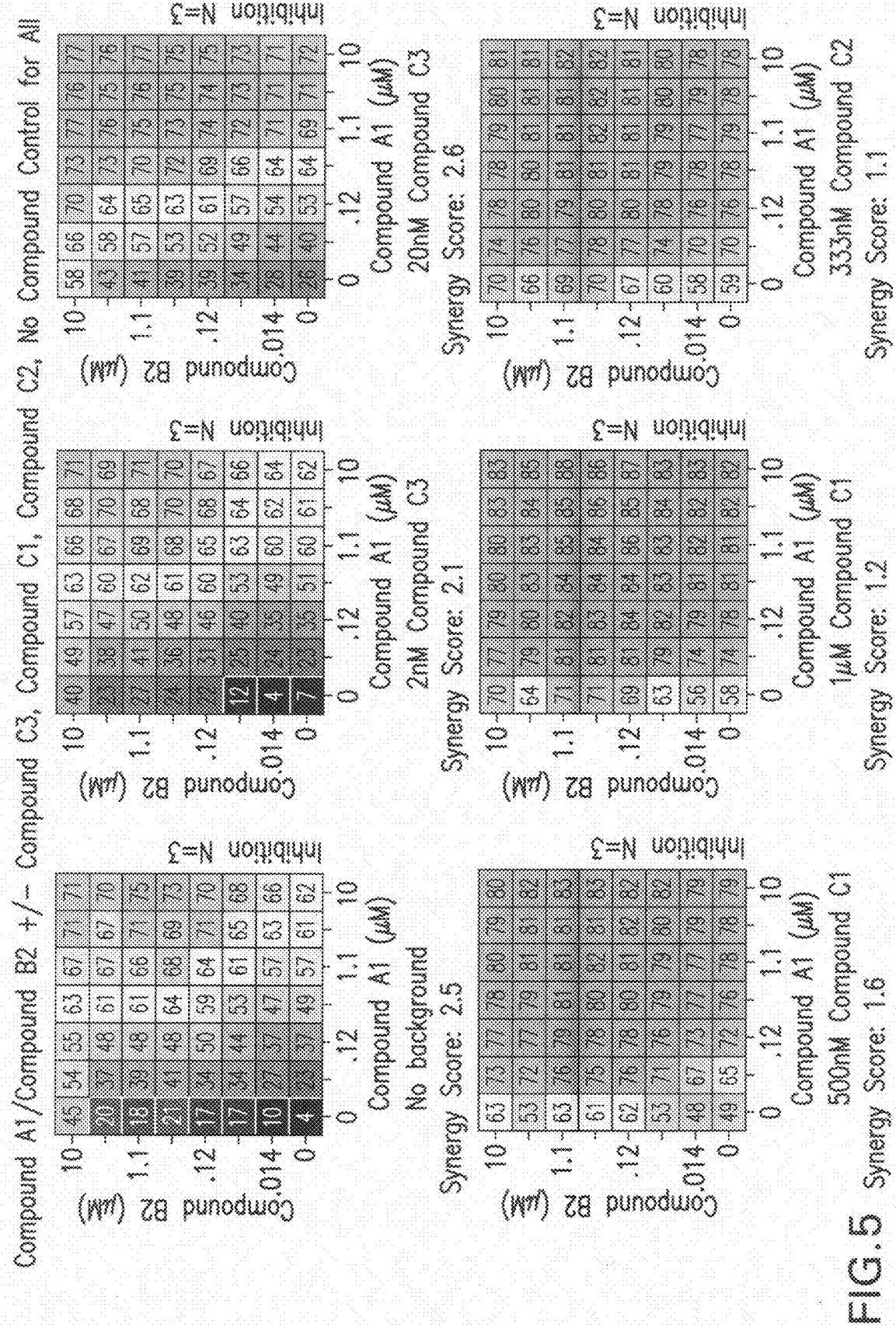
FIG. 5 shows an extended dose matrix demonstrating the effects of combining Compound A1 and Compound B2 with or without the presence of Compound C1, Compound C2 or Compound C3 on proliferation of MCF7/ARO human breast carcinoma cells with Δ4A.
Figure 6:
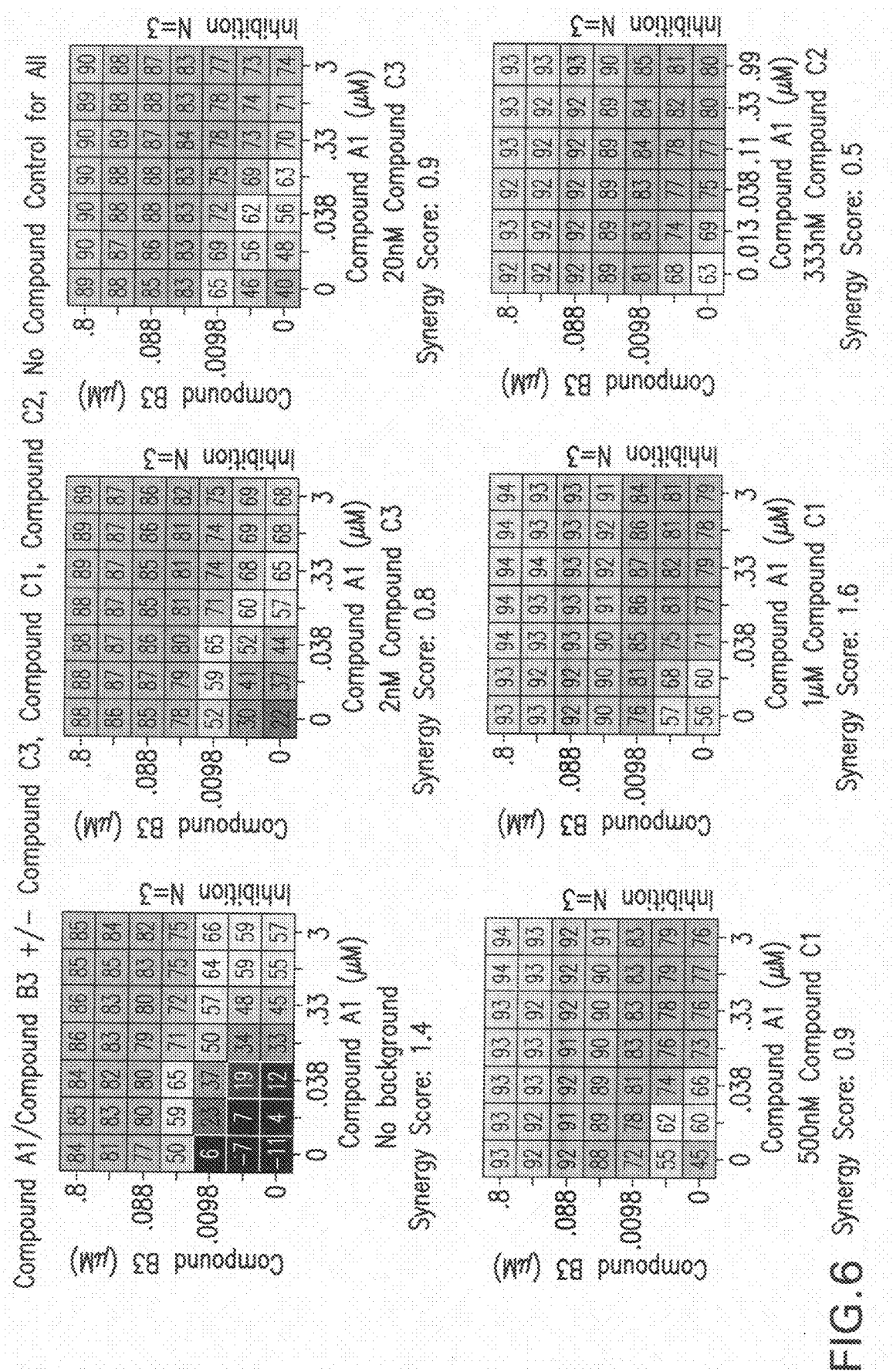
FIG. 6 shows an extended dose matrix demonstrating the effects of combining Compound A1 and Compound B3 with or without the presence of Compound C1, Compound C2 or Compound C3 on proliferation of MCF7/ARO human breast carcinoma cells with Δ4A.
Figure 7:
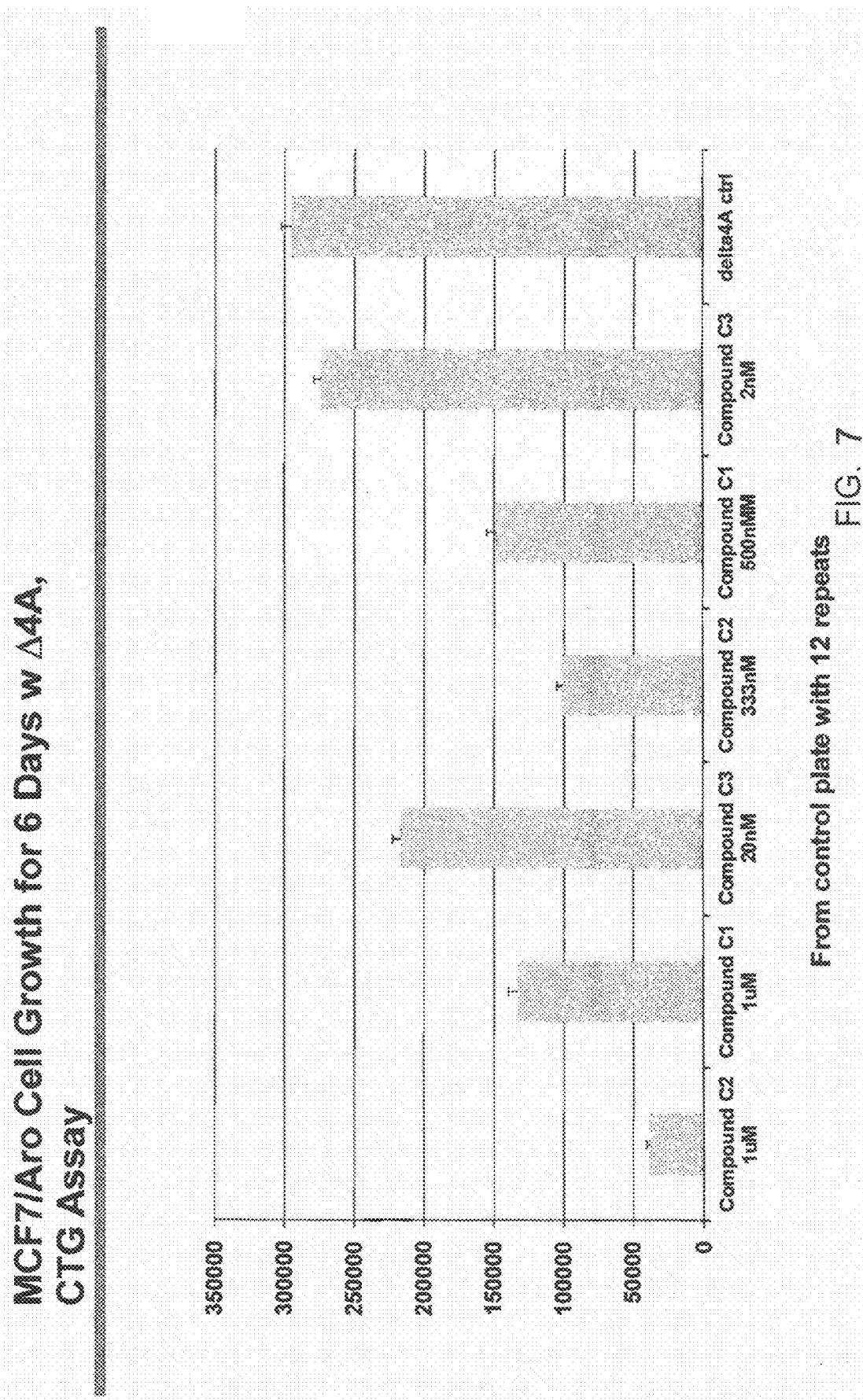
FIG. 7 shows the MCF7/Aro Cell Growth for 6 Days w Δ4A with the CTG Assay.
Figure 8:
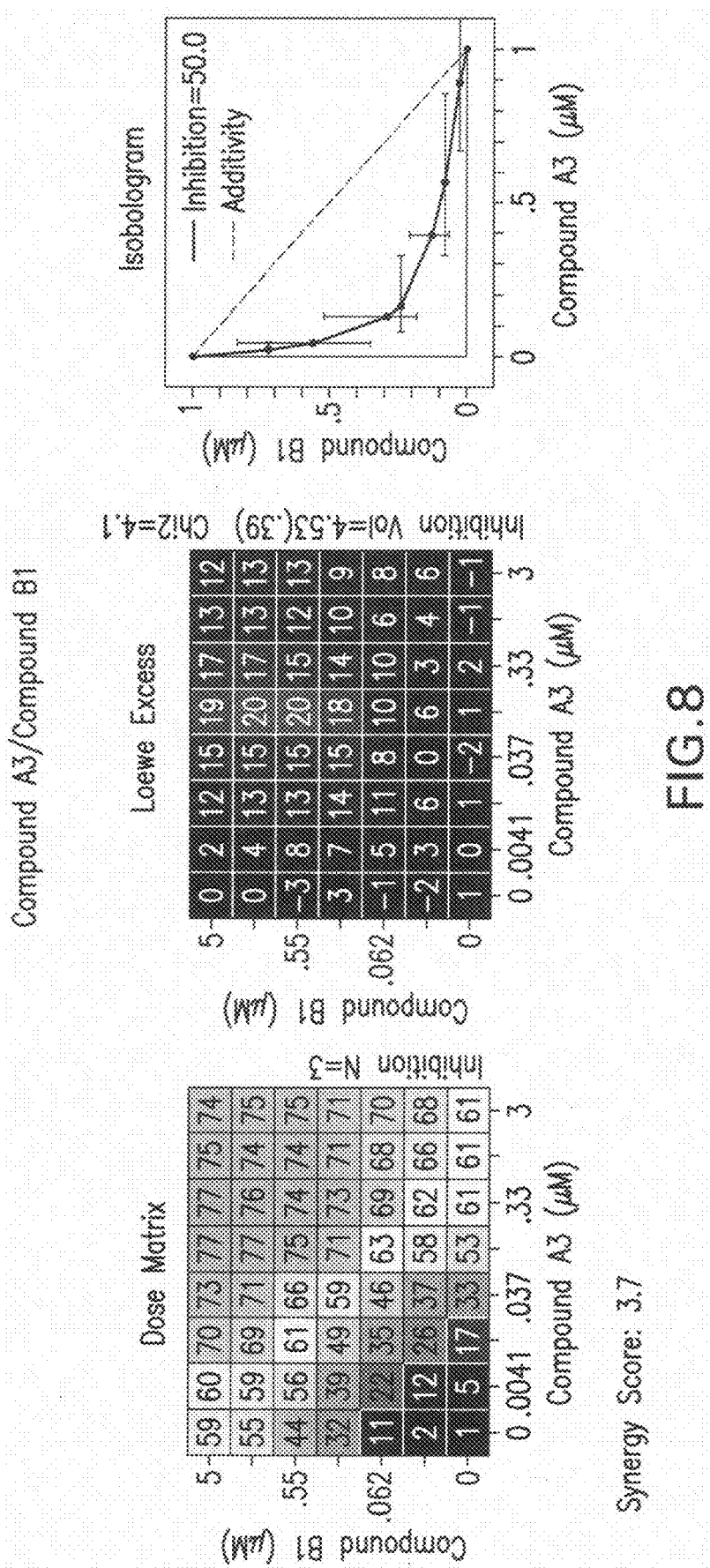
FIG. 8 shows an extended dose matrix and isobologram demonstrating the effects of combining Compound A3 and Compound 1 doses on proliferation of MCF7/ARO human breast carcinoma cells with Δ4A.
Figure 9:
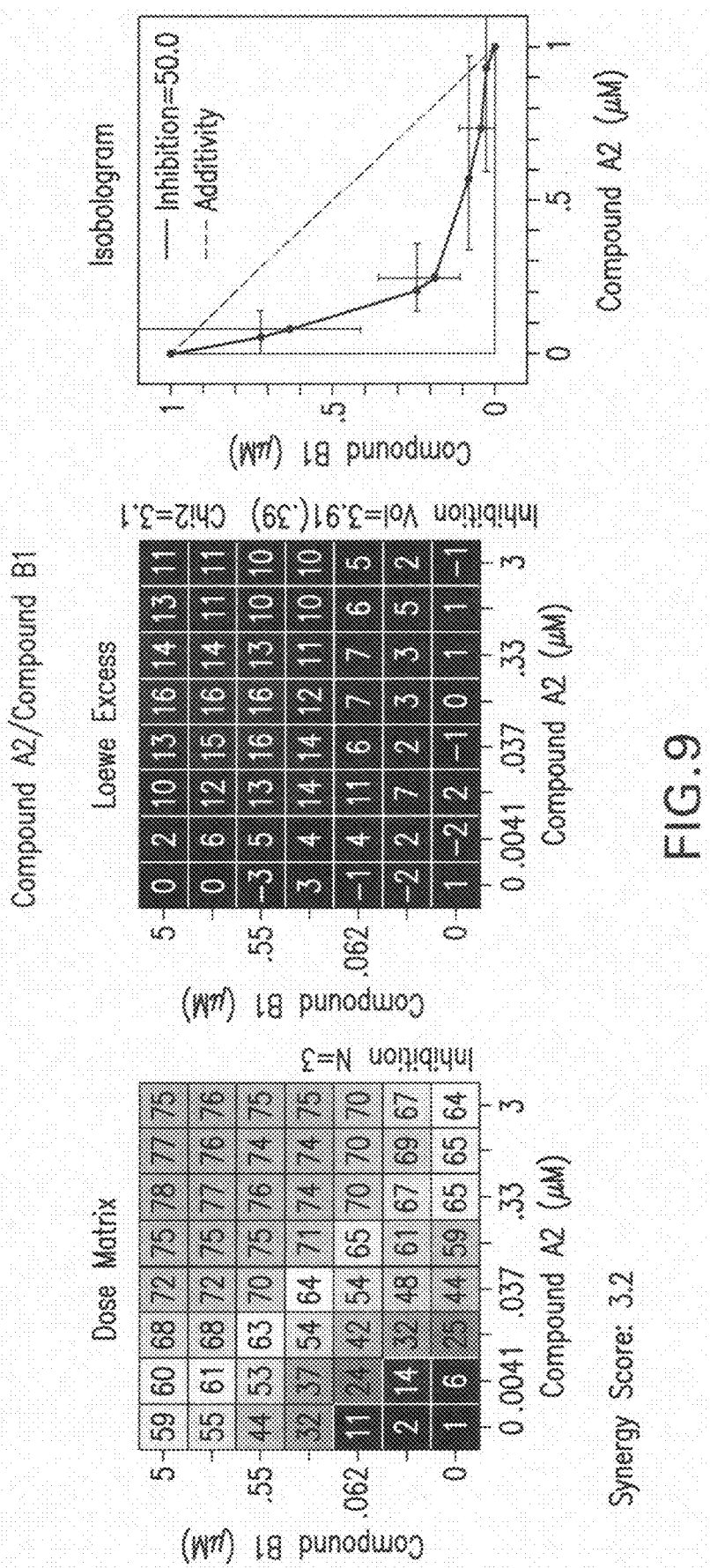
FIG. 9 shows an extended dose matrix and isobologram demonstrating the effects of combining Compound A2 and Compound 1 doses on proliferation of MCF7/ARO human breast carcinoma cells with Δ4A.
Figure 10:
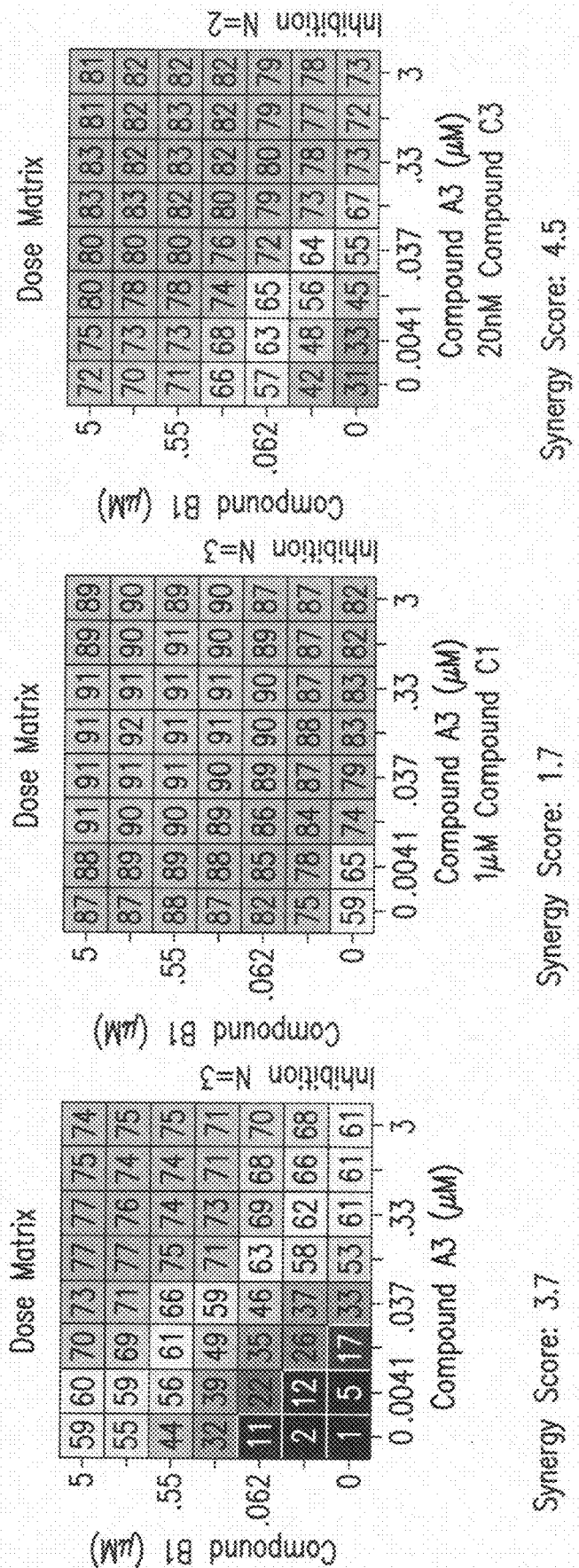
FIG. 10 shows an extended dose matrix demonstrating the effects of combining Compound A3 and Compound 1 with or without the presence of Compound C1 or Compound C3 on proliferation of MCF7/ARO human breast carcinoma cells with Δ4A.
Figure 11:
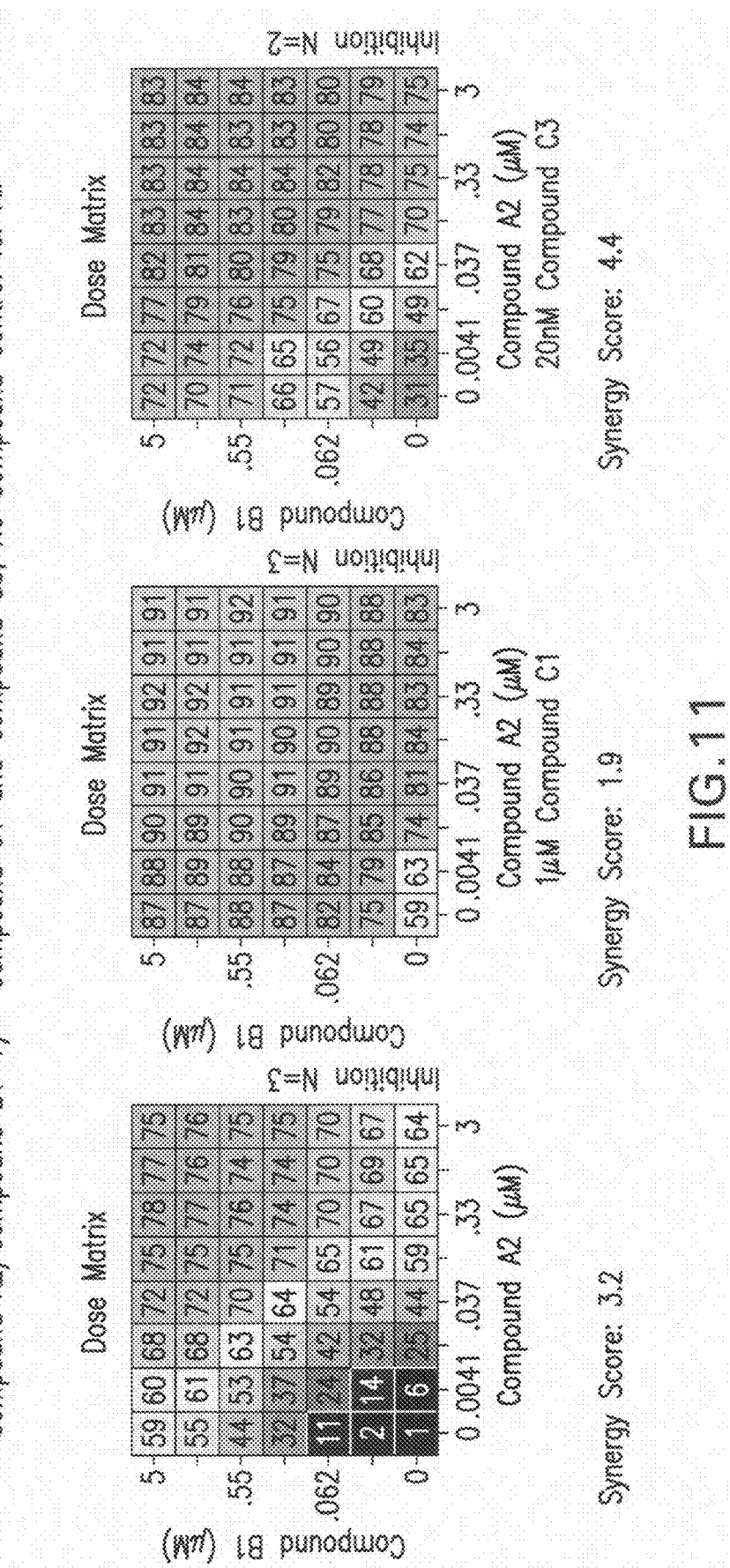
FIG. 11 shows an extended dose matrix demonstrating the effects of combining Compound A2 and Compound 1 with or without the presence of Compound C1 or Compound C3 on proliferation of MCF7/ARO human breast carcinoma cells with Δ4A.
Figure 12:
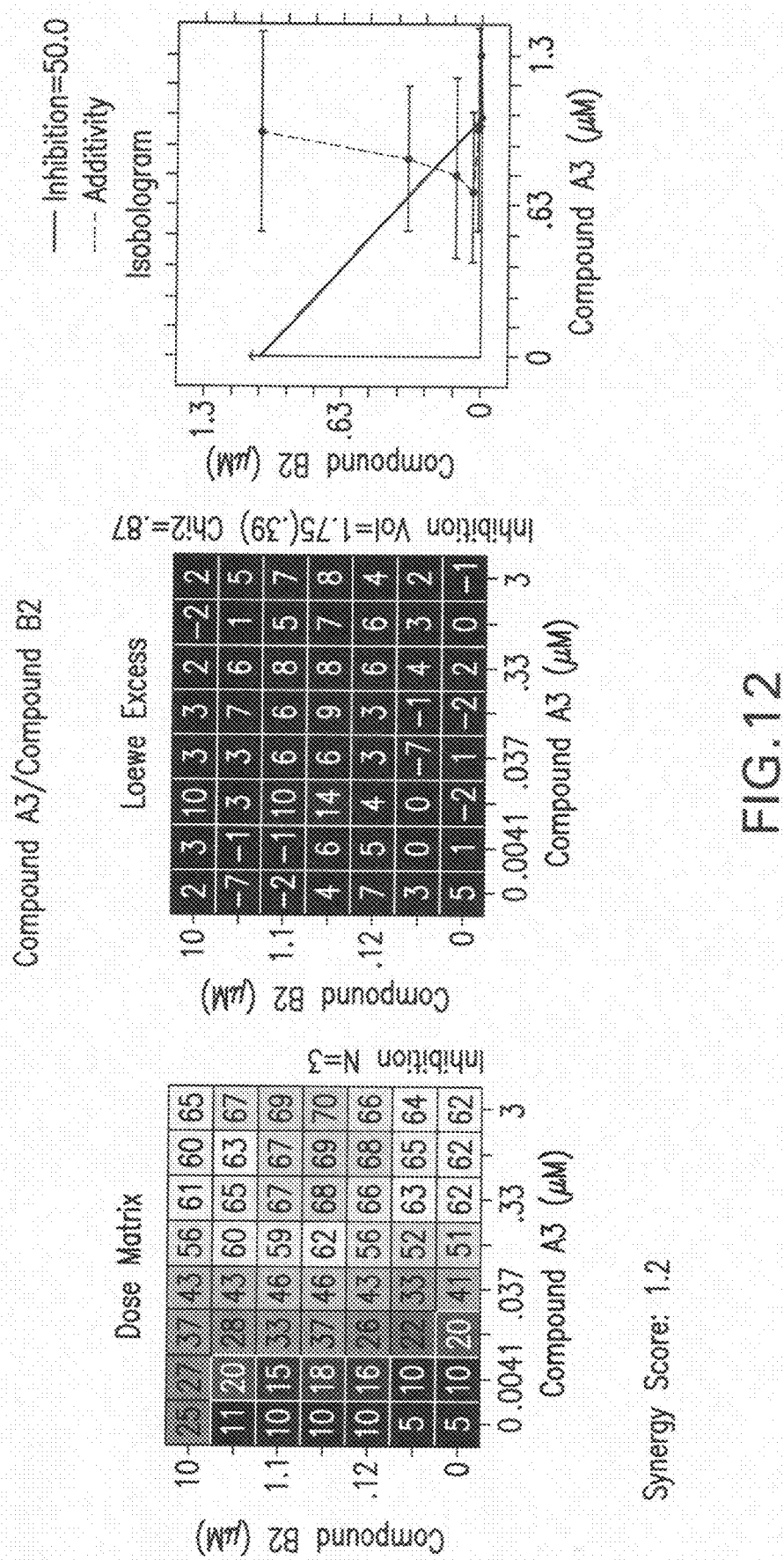
FIG. 12 shows an extended dose matrix and isobologram demonstrating the effects of combining Compound A3 and Compound B2 doses on proliferation of MCF7/ARO human breast carcinoma cells with Δ4A.
Figure 13:
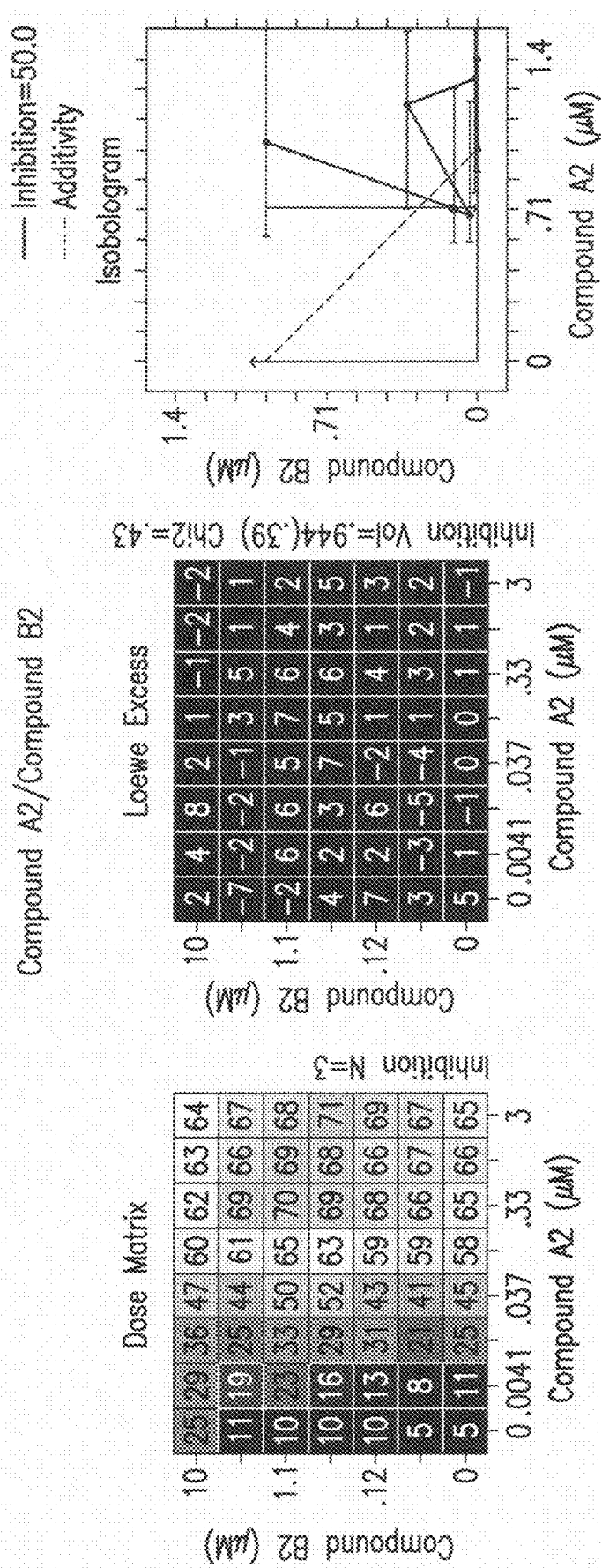
FIG. 13 shows an extended dose matrix and isobologram demonstrating the effects of combining Compound A2 and Compound B2 doses on proliferation of MCF7/ARO human breast carcinoma cells with Δ4A.
Figure 14:
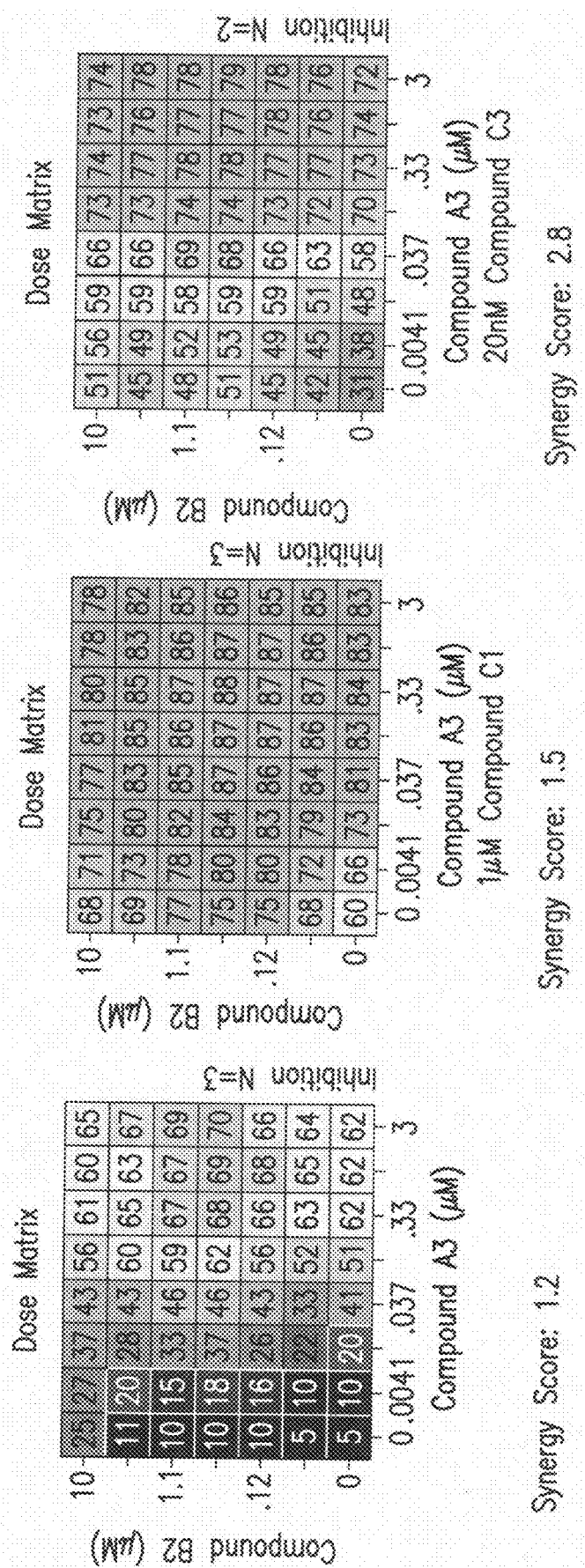
FIG. 14 shows an extended dose matrix demonstrating the effects of combining Compound A3 and Compound B2 with or without the presence of Compound C1 or Compound C3 on proliferation of MCF7/ARO human breast carcinoma cells with Δ4A.
Figure 15:
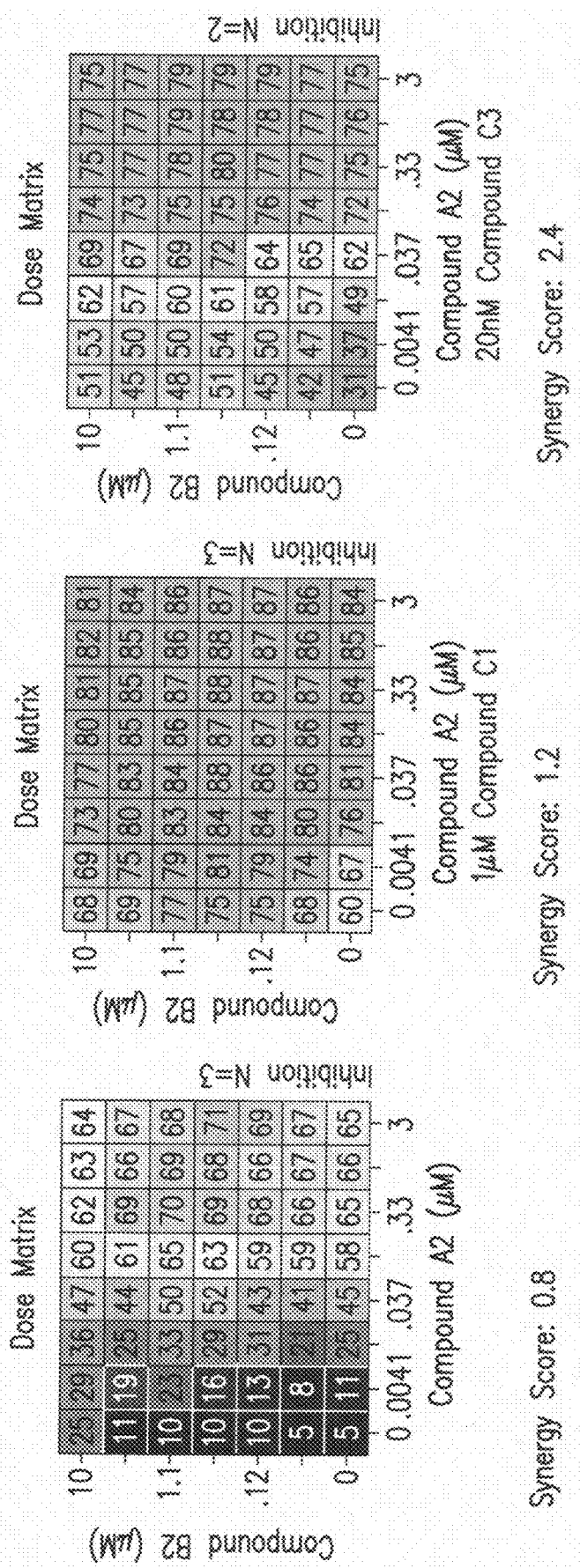
FIG. 15 shows an extended dose matrix demonstrating the effects of combining Compound A2 and Compound B2 with or without the presence of Compound C1 or Compound C3 on proliferation of MCF7/ARO human breast carcinoma cells with Δ4A.
Figure 16:
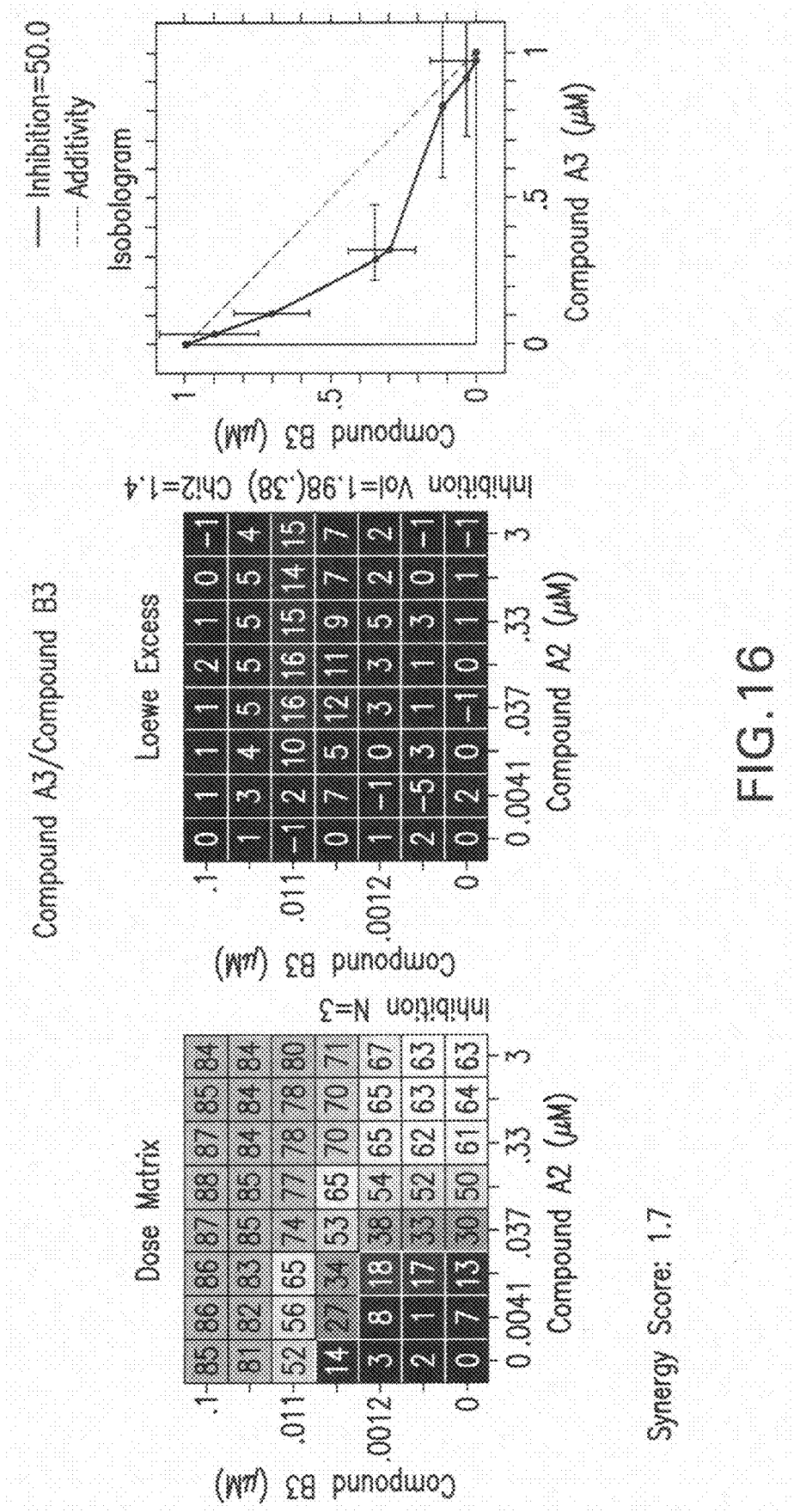
FIG. 16 shows an extended dose matrix and isobologram demonstrating the effects of combining Compound A3 and Compound B3 doses on proliferation of MCF7/ARO human breast carcinoma cells with Δ4A.
Figure 17:
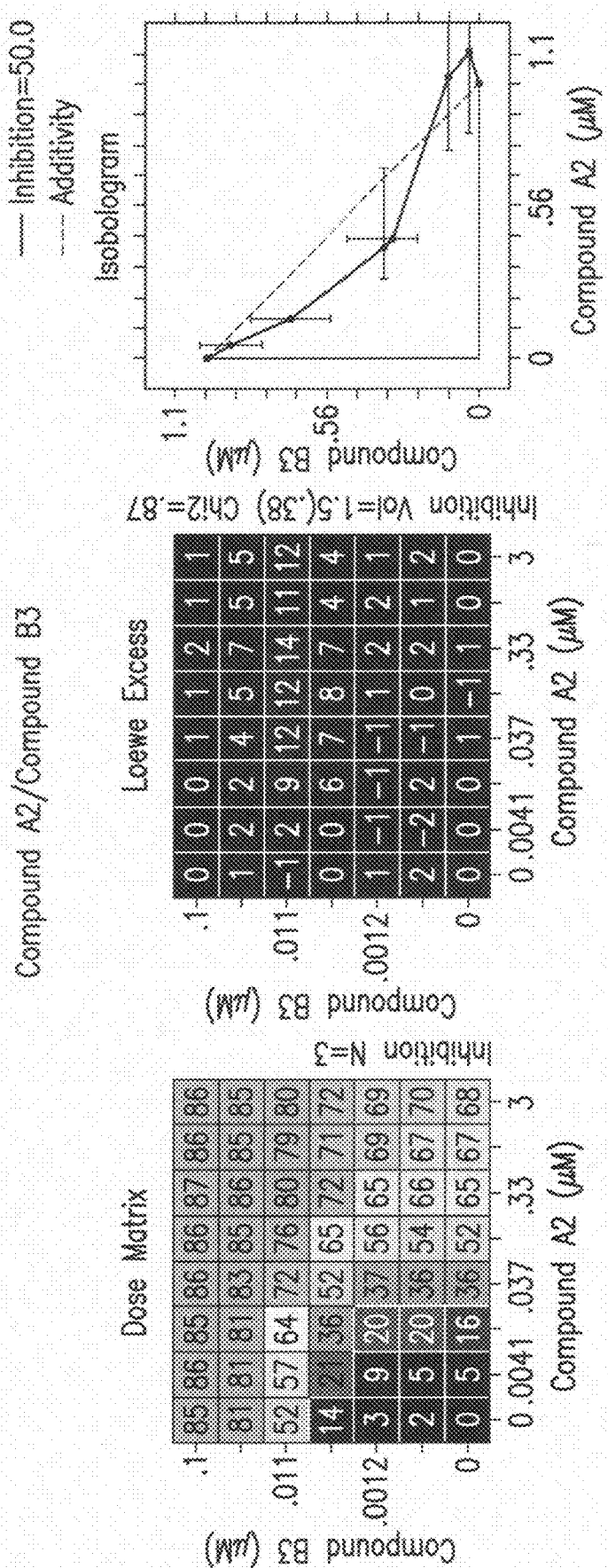
FIG. 17 shows an extended dose matrix and isobologram demonstrating the effects of combining Compound A2 and Compound B3 doses on proliferation of MCF7/ARO human breast carcinoma cells with Δ4A.
Figure 18:
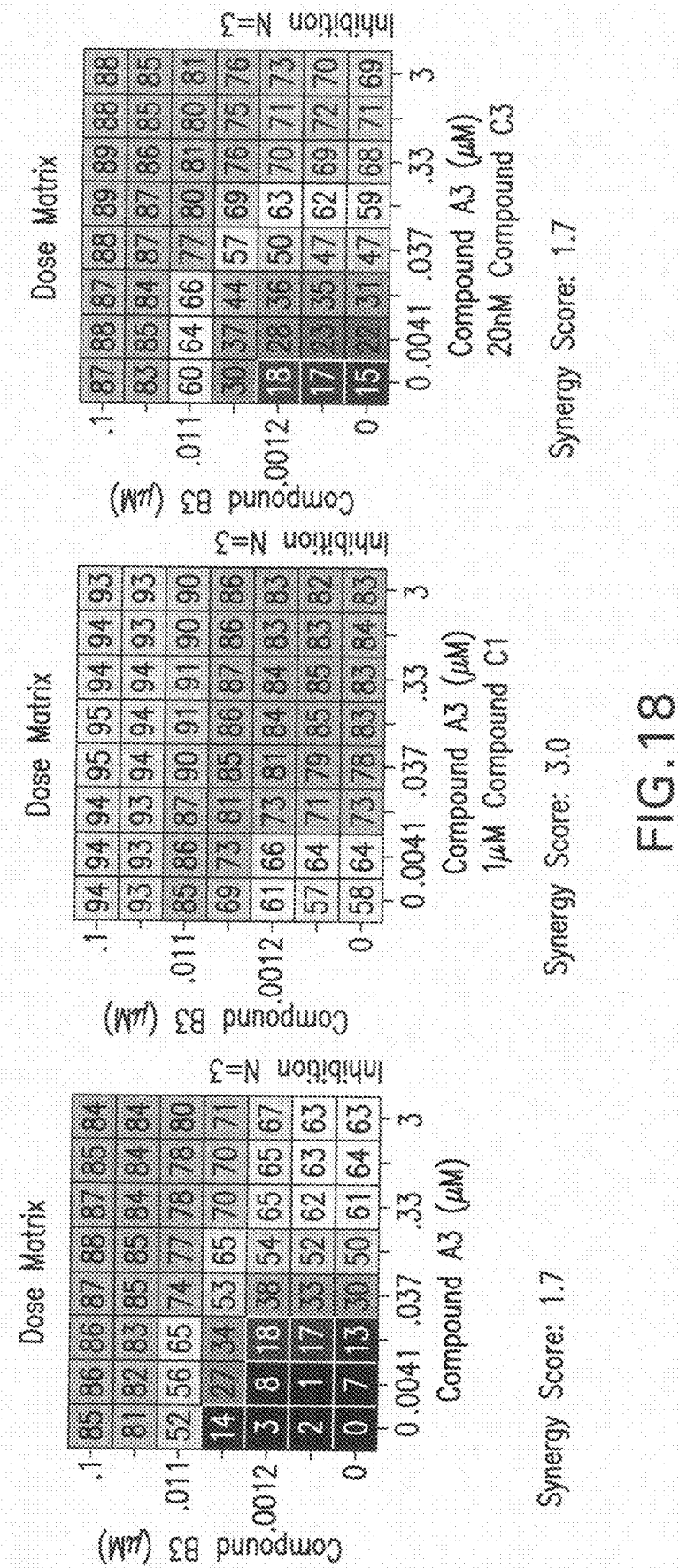
FIG. 18 shows an extended dose matrix demonstrating the effects of combining Compound A3 and Compound B3 with or without the presence of Compound C1 or Compound C3 on proliferation of MCF7/ARO human breast carcinoma cells with Δ4A.
Figure 19:
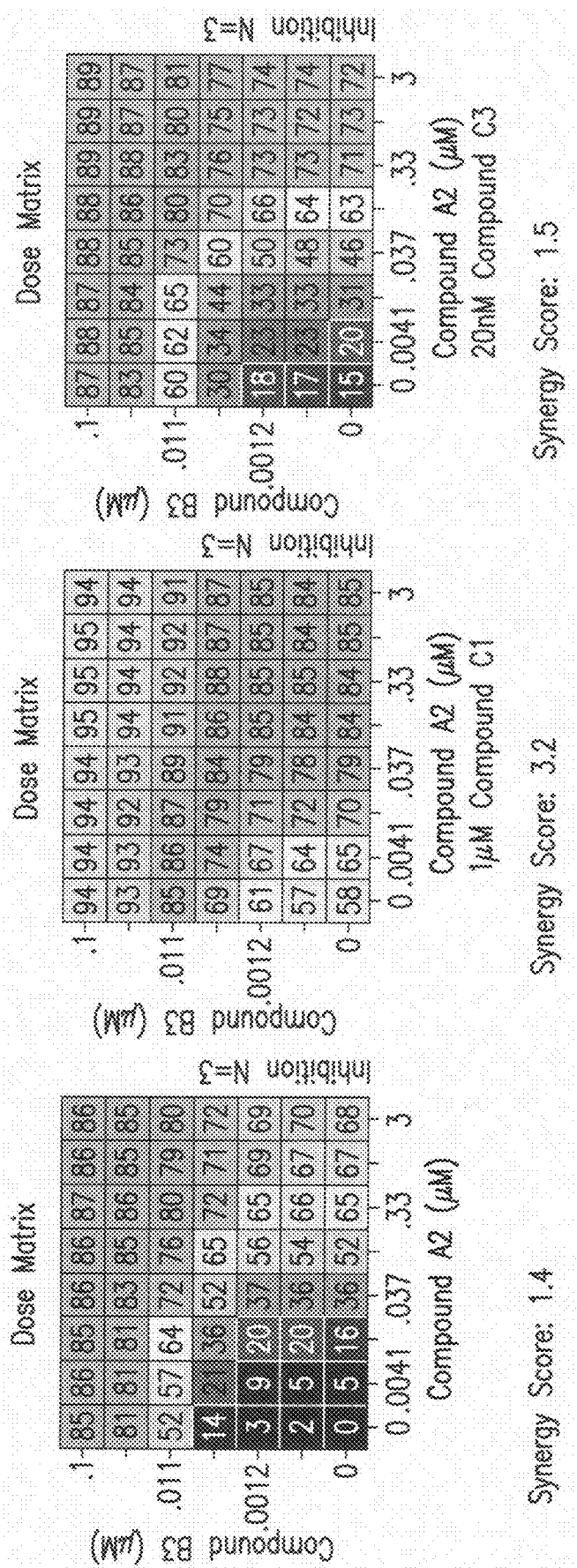
FIG. 19 shows an extended dose matrix demonstrating the effects of combining Compound A2 and Compound B3 with or without the presence of Compound C1 or Compound C3 on proliferation of MCF7/ARO human breast carcinoma cells with Δ4A.

The following general definitions are provided to better understand the disclosure: "Aromatase inhibitor" used herein relates to compounds which inhibit the estrogen production, i.e. the conversion of the substrates androstenedione and testosterone to estrone and estradiol, respectively. Such compounds will be referred to as "aromatase inhibitors".

"Selective estrogen receptor modulator (SERM)" refers to compound(s) that act on the estrogen receptor. A characteristic that distinguishes SERMs from pure receptor agonists and antagonists is that their action is different in various tissues, thereby granting the possibility to selectively inhibit or stimulate estrogen-like action in various tissues.

"PI3K inhibitor" is defined herein to refer to a compound which targets, decreases or inhibits phosphatidylinositol 3-kinase. Phosphatidylinositol 3-kinase activity has been shown to increase in response to a number of hormonal and growth factor stimuli, including insulin, platelet-derived growth factor, insulin-like growth factor, epidermal growth factor, colony-stimulating factor, and hepatocyte growth factor, and has been implicated in processes related to cellular growth and transformation.

"Combination" refers to either a fixed combination in one dosage unit form, or a non-fixed combination (or kit of parts) for the combined administration where a compound and a combination partner (e.g. another drug as explained below, also referred to as "therapeutic agent" or "co-agent") may be administered independently at the same time or separately within time intervals, especially where these time intervals allow that the combination partners show a cooperative, e.g. synergistic effect. The term "combined administration" or the like as utilized herein are meant to encompass administration of the selected combination partner to a single subject in need thereof (e.g. a patient), and are intended to include treatment regimens in which the agents are not necessarily administered by the same route of administration or at the same time. The term "fixed combination" means that the active ingredients, e.g. a compound of formula A1 and a combination partner, are both administered to a patient simultaneously in the form of a single entity or dosage. The terms "non-fixed combination" or "kit of parts" mean that the active ingredients, e.g. a compound of formula A1 and a combination partner, are both administered to a patient as separate entities either simultaneously, concurrently or sequentially with no specific time limits, wherein such administration provides therapeutically effective levels of the two compounds in the body of the patient.

"Treatment" includes prophylactic and therapeutic treatment (including but not limited to palliative, curing, symptom-alleviating, symptom-reducing) as well as the delay of progression of a cancer disease or disorder. The term "prophylactic" means the prevention of the onset or recurrence of a cancer. The term "delay of progression" as used herein means administration of the combination to patients being in a pre-stage or in an early phase of the cancer to be treated, a pre-form of the corresponding cancer is diagnosed and/or in a patient diagnosed with a condition under which it is likely that a corresponding cancer will develop.

"Pharmaceutical preparation" or "pharmaceutical composition" refers to a mixture or solution containing at least one therapeutic agent to be administered to a warm-bloodeded, e.g., a human.

"Co-administer", "co-administration" or "combined administration" or the like are meant to encompass administration of the selected therapeutic agents to a single patient, and are intended to include treatment regimens in which the agents are not necessarily administered by the same route of administration or at the same time.

"Pharmaceutically acceptable" refers to those compounds, materials, compositions and/or dosage forms, which are, within the scope of sound medical judgment, suitable for contact with the tissues of mammals, especially humans, without excessive toxicity, irritation, allergic response and other problem complications commensurate with a reasonable benefit/risk ratio.

"Therapeutically effective" preferably relates to an amount of a therapeutic agent that is therapeutically or in a broader sense also prophylactically effective against the progression of a cancer.

"Jointly therapeutically effective" means that the therapeutic agents may be given separately (in a chronologically staggered manner, especially a sequence-specific manner) in such time intervals that they prefer, in the warm-blooded animal, especially human, to be treated, still show a (preferably synergistic) interaction. Whether this is the case can, inter alia, be determined by following the blood levels, showing that both compounds are present in the blood of the human to be treated at least during certain time intervals.

"Single pharmaceutical composition" refers to a single carrier or vehicle formulated to deliver effective amounts of both therapeutic agents to a patient. The single vehicle is designed to deliver an effective amount of each of the agents, along with any pharmaceutically acceptable carriers or excipients. In some embodiments, the vehicle is a tablet, capsule, pill, or a patch. In other embodiments, the vehicle is a solution or a suspension.

"Dose range" refers to an upper and a lower limit of an acceptable variation of the amount of therapeutic agent specified. Typically, a dose of the agent in any amount within the specified range can be administered to patients undergoing treatment.

"Subject", "patient", or "warm-blooded animal" is intended to include animals. Examples of subjects include mammals, e.g., humans, dogs, cows, horses, pigs, sheep, goats, cats, mice, rabbits, rats, and transgenic non-human animals. In certain embodiments, the subject is a human, e.g., a human suffering from, at risk of suffering from, or potentially capable of suffering from a brain tumor disease. Particularly preferred, the subject or warm-blooded animal is human.

The terms "about" or "approximately" usually means within 20%, more preferably within 10%, and most preferably still within 5% of a given value or range. Alternatively, especially in biological systems, the term "about" means within about a log (i.e., an order of magnitude) preferably within a factor of two of a given value.

The present disclosure relates to a pharmaceutical combination comprising (1) a CDK inhibitor or a pharmaceutically acceptable salt thereof and (2) an anti-hormonal agent or a pharmaceutically acceptable salt thereof.

The present disclosure also relates to a pharmaceutical combination comprising (1) a CDK inhibitor or a pharmaceutically acceptable salt thereof, (2) an anti-hormonal agent or a pharmaceutically acceptable salt thereof, and (3) an agent that regulates the PI3K/Akt/mTOR pathway or a pharmaceutically acceptable salt thereof.

Such combination may be for simultaneous, separate or sequential use for the treatment of a cancer.

In one embodiment, the CDK inhibitor is CDK4/6 inhibitor.

The CDK4/6 inhibitor can be, for example, Compound A1, described by Formula A1 below:

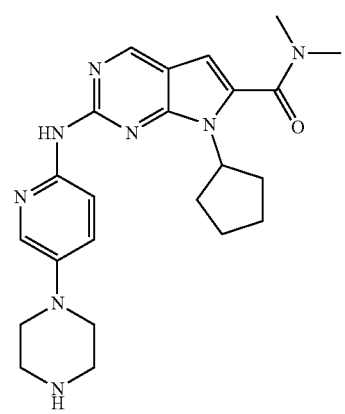

(A1)

or,

Compound A2, described by Formula A2 below:

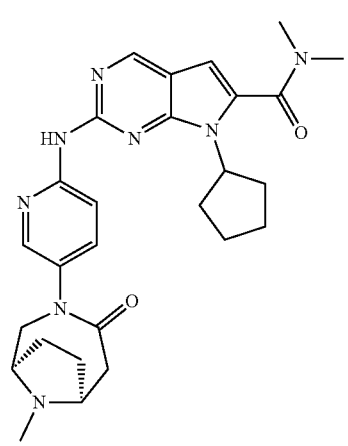

(A2)

or, palbociclib (hereinafter referred as Compound A3, also known as PD-0332991).

Compound A1 is also described by the chemical name 7-Cyclopentyl-2-(5-piperazin-1-yl-pyridin-2-ylamino)-7H-pyrrolo[2,3-d]pyrimidine-6-carboxylic acid dimethylamide.

Compound A2 is also described by the chemical name 7-cyclopentyl-N,N-dimethyl-2-(5-((1R,6S)-9-methyl-4-oxo-3,9-diazabicyclo[4.2.1]nonan-3-yl)pyridin-2-ylamino)-7H-pyrrolo[2,3-d]pyrimidine-6-carboxamide.

Compound A3 is also described by the chemical name 6-Acetyl-8-cyclopentyl-5-methyl-2-{[5-(1-piperazinyl)-2-pyridinyl]amino}pyrido[2,3-d]pyrimidin-7(8H)-one.

In one embodiment, the anti-hormonal agent is an aromatase inhibitor. Such aromatase inhibitor can be either a non-steroidal aromatase inhibitor or a steroidal aromatase inhibitor.

Letrozole (hereinafter referred as Compound B1) is an example of a non-steroidal aromatase inhibitor.

Exemestane (hereinafter referred as Compound B2) is an example of a steroidal aromatase inhibitor.

In another embodiment, the anti-hormonal agent is an estrogen receptor antagonist.

Fulvestrant (hereinafter referred as Compound B3) is an example of an estrogen receptor antagonist.

In yet another embodiment, the anti-hormonal agent is a selective estrogen receptor modulator.

Tamoxifen (hereinafter referred as Compound B4) is an example of a selective estrogen receptor modulator.

In one embodiment, the agent that regulates the PI3K/Akt/mTOR pathway is a PI3K inhibitor.

The PI3K inhibitor can be, for example,

Compound C1, described by Formula C1 below:

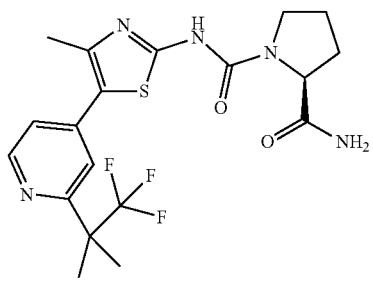

(C1)

or,

Compound C2, described by Formula C2 below:

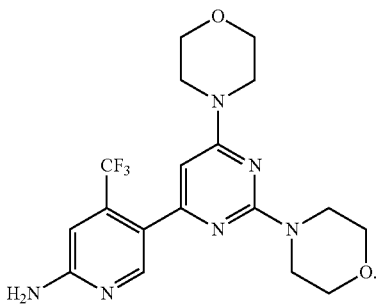

(C2)

Compound C1 is also described by the chemical name (S)-Pyrrolidine-1,2-dicarboxylic acid 2-amide 1-({4-methyl-5-[2-(2,2,2-trifluoro-1,1-dimethyl-ethyl)-pyridin-4-yl]-thiazol-2-yl}-amide).

Compound C2 is also described by the chemical name 5-(2,6-di-4-morpholinyl-4-pyrimidinyl)-4-(trifluoromethyl)-2-pyrimidinamine.

In another embodiment, the agent that regulates the PI3K/Akt/mTOR pathway is a mTOR inhibitor.

Everolimus (hereinafter referred as Compound C3) is an example of a mTOR inhibitor.

Specific embodiments of the present disclosure include the following:

(1) Combination comprising Compound A1 and Compound B1;
(2) Combination comprising Compound A1 and Compound B2;
(3) Combination comprising Compound A1 and Compound B3;
(4) Combination comprising Compound A1 and Compound B4;
(5) Combination comprising Compound A2 and Compound B1;
(6) Combination comprising Compound A2 and Compound B2;
(7) Combination comprising Compound A2 and Compound B3;
(8) Combination comprising Compound A2 and Compound B4;
(9) Combination comprising Compound A3 and Compound B1;
(10) Combination comprising Compound A3 and Compound B2;
(11) Combination comprising Compound A3 and Compound B3;
(12) Combination comprising Compound A3 and Compound B4;
(13) Combination comprising Compound A1, Compound 1 and Compound C1;
(14) Combination comprising Compound A1, Compound 1 and Compound C2;
(15) Combination comprising Compound A1, Compound 1 and Compound C3;
(16) Combination comprising Compound A1, Compound B2 and Compound C1;
(17) Combination comprising Compound A1, Compound B2 and Compound C2;
(18) Combination comprising Compound A1, Compound B2 and Compound C3;
(19) Combination comprising Compound A1, Compound B3 and Compound C1;
(20) Combination comprising Compound A1, Compound B3 and Compound C2;
(21) Combination comprising Compound A1, Compound B3 and Compound C3;
(22) Combination comprising Compound A1, Compound B4 and Compound C1;
(23) Combination comprising Compound A1, Compound B4 and Compound C2;
(24) Combination comprising Compound A1, Compound B4 and Compound C3;
(25) Combination comprising Compound A2, Compound 1 and Compound C1;
(26) Combination comprising Compound A2, Compound 1 and Compound C2;
(27) Combination comprising Compound A2, Compound 1 and Compound C3;
(28) Combination comprising Compound A2, Compound B2 and Compound C1;
(29) Combination comprising Compound A2, Compound B2 and Compound C2;
(30) Combination comprising Compound A2, Compound B2 and Compound C3;
(31) Combination comprising Compound A2, Compound B3 and Compound C1;
(32) Combination comprising Compound A2, Compound B3 and Compound C2;
(33) Combination comprising Compound A2, Compound B3 and Compound C3;
(34) Combination comprising Compound A2, Compound B4 and Compound C1;
(35) Combination comprising Compound A2, Compound B4 and Compound C2;
(36) Combination comprising Compound A2, Compound B4 and Compound C3;
(37) Combination comprising Compound A3, Compound 1 and Compound C1;
(38) Combination comprising Compound A3, Compound 1 and Compound C2;
(39) Combination comprising Compound A3, Compound 1 and Compound C3;

(40) Combination comprising Compound A3, Compound B2 and Compound C1;
(41) Combination comprising Compound A3, Compound B2 and Compound C2;
(42) Combination comprising Compound A3, Compound B2 and Compound C3;
(43) Combination comprising Compound A3, Compound B3 and Compound C1;
(44) Combination comprising Compound A3, Compound B3 and Compound C2;
(45) Combination comprising Compound A3, Compound B3 and Compound C3;
(46) Combination comprising Compound A3, Compound B4 and Compound C1;
(47) Combination comprising Compound A3, Compound B4 and Compound C2; and
(48) Combination comprising Compound A3, Compound B4 and Compound C3.

The present disclosure further relates to the above pharmaceutical combination(s) for use in the treatment of a cancer.

The present disclosure further relates to a method for the treatment of a cancer comprising administering the above pharmaceutical combination(s) in jointly therapeutically effective amount, to a warm-blooded animal, preferably a human, in need thereof.

In accordance with the present disclosure, the compounds in the pharmaceutical combination(s) may be administered either as a single pharmaceutical composition, as separate compositions, or sequentially.

The present disclosure further relates to a kit comprising the pharmaceutical combination.

The Compounds A1-A3, B1-B4, C1-C3 may be incorporated in the combination of the present disclosure in either the form of its free base or any salt thereof. Salts can be present alone or in mixture with free compound, e.g. the compound of the formula A1, and are preferably pharmaceutically acceptable salts. Such salts of the compounds of formula A1 are formed, for example, as acid addition salts, preferably with organic or inorganic acids, from compounds of formula A1 with a basic nitrogen atom. Suitable inorganic acids are, for example, halogen acids, such as hydrochloric acid, sulfuric acid, or phosphoric acid. Suitable organic acids are, e.g., succinic acid, carboxylic acids or sulfonic acids, such as fumaric acid or methansulfonic acid. For isolation or purification purposes it is also possible to use pharmaceutically unacceptable salts, for example picrates or perchlorates. For therapeutic use, only pharmaceutically acceptable salts or free compounds are employed (where applicable in the form of pharmaceutical preparations), and these are therefore preferred.

The Compounds A1-A3, B1-B4, C1-C3 can be synthesized by one skilled in the art. Specifically, Compound A1 is disclosed as Example 74 of WO2010/020675; Compound A2 is disclosed in WO2011/101409; Compound C1 is disclosed as Example 15 of WO2010/029082; and Compound C2 is disclosed as Example 10 of WO2007/084786.

Suitable aromatase inhibitors include, but are not limited to,
 (a) steroids, such as exemestane and formestane; and
 (b) non-steroids, such as aminoglutethimide, vorozole, fadrozole, anastrozole and, especially, letrozole.

Exemestane can be administered, e.g., in the form as it is marketed, e.g. under the trademark AROMASIN®. Formestane can be administered, e.g., in the form as it is marketed, e.g. under the trademark LENTARON®. Fadrozole can be administered, e.g., in the form as it is marketed, e.g. under the trademark AFEMA®. Anastrozole can be administered, e.g., in the form as it is marketed, e.g. under the trademark ARIMIDEX®. Letrozole can be administered, e.g., in the form as it is marketed, e.g. under the trademark FEMARA® or FEMAR®. Letrozole has been specifically described in the European patent No. 0 236 940 published on Sep. 16, 1987, as well as in U.S. Pat. No. 4,978,672 published on Dec. 18, 1990, and Japanese Patent No. 2018112 all in the name of the applicant. Aminoglutethimide can be administered, e.g., in the form as it is marketed, e.g. under the trademark ORIMETEN®.

The structure of the active agents identified by code nos., generic or trade names may be taken from the actual edition of the standard compendium "The Merck Index" or from databases, e.g., Patents International (e.g., IMS World Publications). The corresponding content thereof is hereby incorporated by reference.

Comprised are likewise the pharmaceutically acceptable salts thereof, the corresponding racemates, diastereoisomers, enantiomers, tautomers, as well as the corresponding crystal modifications of above disclosed compounds where present, e.g. solvates, hydrates and polymorphs, which are disclosed therein. The compounds used as active ingredients in the combinations of the present disclosure can be prepared and administered as described in the cited documents, respectively. Also within the scope of this disclosure is the combination of more than two separate active ingredients as set forth above, i.e., a pharmaceutical combination within the scope of this disclosure could include three active ingredients or more.

It is believed that the combination(s) of the present disclosure possesses beneficial therapeutic properties, e.g. synergistic interaction, strong in vitro or in vivo antiproliferative activity and/or strong in vitro or in vivo antitumor response, which render it particularly useful for the treatment of cancer.

Suitable cancers that can be treated with the combination of the present disclosure include, but are not limited to, sarcoma, lymphomas, cancer of the lung, bronchus, prostate, breast (including sporadic breast cancers and sufferers of Cowden disease), pancreas, gastrointestine, colon, rectum, colon, colorectal adenoma, thyroid, liver, intrahepatic bile duct, hepatocellular, adrenal gland, stomach, gastric, glioma, glioblastoma, endometrial, melanoma, kidney, renal pelvis, urinary bladder, uterine corpus, cervix, vagina, ovary, multiple myeloma, esophagus, a leukaemia, acute myelogenous leukemia, chronic myelogenous leukemia, lymphocytic leukemia, myeloid leukemia, brain, a carcinoma of the brain, oral cavity and pharynx, larynx, small intestine, non-Hodgkin lymphoma, melanoma, villous colon adenoma, a neoplasia, a neoplasia of epithelial character, a mammary carcinoma, basal cell carcinoma, squamous cell carcinoma, actinic keratosis, tumor diseases (including solid tumors), a tumor of the neck or head, polycythemia vera, essential thrombocythemia, myelofibrosis with myeloid metaplasia, and Waldenstroem disease. Where a cancer, a tumor, a tumor disease, sarcoma, or a cancer are mentioned, also metastasis in the original organ or tissue and/or in any other location are implied alternatively or in addition, whatever the location of the tumor and/or metastasis.

The combination of the present disclosure is particularly useful for the treatment of a cancer mediated by phosphatidylinositol 3-kinase (PI3K), particularly the alpha-subunit of PI3K. Proliferative diseases may include those showing overexpression or amplification of PI3K alpha, somatic mutation of PIK3CA or germline mutations or somatic mutation of PTEN or mutations and translocation of p85a that serve to up-regulate the p85-p110 complex. In a preferred embodiment, the cancer is a tumor and/or cancerous growth mediated by the alpha isoform of PI3K. Disease may include those showing overexpression or amplification of the alpha-isoform of PI3K and/or somatic mutation of PIK3CA.

The combination of the present disclosure is also particularly useful for the treatment of a hormone sensitive and/or hormone receptor positive cancers. Hormone sensitive cancers may include, but are not limited to, breast cancer, endometrial cancer, ovarian cancer, and/or cervical cancer. Hormone-receptor positive cancers may include estrogen receptor positive cancers (i.e., cancer that grows in response to the hormone estrogen) or progesterone receptor positive cancers (ie., cancer that grows in response to the hormone progesterone. Preferably, the hormone receptor positive cancer is estrogen receptor positive breast cancer.

In one embodiment, the cancer is a solid tumor.

In a further embodiment, the cancer is selected from the group consisting of cancer of the breast, endometrial, ovary and cervix.

In a further embodiment, the cancer is a cancer showing both (a) overexpression or amplification of the alpha-isoform of PI3K and/or somatic mutation of PIK3CA, and (b) hormone receptor positive status.

In a further embodiment, the cancer is breast cancer. Preferably, the cancer is a breast cancer having either hormone receptor positive, a mutation in the PIK3CA, or a combination thereof. More preferably, the cancer is estrogen receptor positive (+) breast cancer.

In a further embodiment, the cancer is a hormone receptor positive (+) breast cancer resistant to treatment with hormone therapy (e.g., estrogen or progesterone). A cancer "resistant to treatment with hormone therapy" refers to a cancer or tumor that either fails to respond favorably to treatment with prior hormone therapy, or alternatively, recurs or relapses after responding favorably to hormone therapy. Said hormone therapy is understood to be in the absence of a PI3K inhibitor. The cancer or tumor may be resistant or refractory at the beginning of treatment or it may become resistant or refractory during treatment.

It is one objective of this disclosure to provide a pharmaceutical composition comprising a quantity, which is jointly therapeutically effective at targeting or preventing a cancer, of each therapeutic agent of the disclosure.

In accordance with the present disclosure, agents in the composition of the present disclosure may be administered together in a single pharmaceutical composition, separately in two or more separate unit dosage forms, or sequentially. The unit dosage form may also be a fixed combination.

The pharmaceutical compositions for separate administration of agents or for the administration in a fixed combination (i.e., a single galenical composition comprising at least two therapeutic agents according to the disclosure may be prepared in a manner known per se and are those suitable for enteral, such as oral or rectal, topical, and parenteral administration to subjects, including mammals (warm-blooded animals) such as humans, comprising a therapeutically effective amount of at least one pharmacologically active combination partner alone, e.g., as indicated above, or in combination with one or more pharmaceutically acceptable carriers or diluents, especially suitable for enteral or parenteral application. Suitable pharmaceutical compositions contain, e.g., from about 0.1% to about 99.9%, preferably from about 1% to about 60%, of the active ingredient(s).

Pharmaceutical compositions for the combination therapy for enteral or parenteral administration are, e.g., those in unit dosage forms, such as sugar-coated tablets, tablets, capsules or suppositories, ampoules, injectable solutions or injectable suspensions. Topical administration is e.g. to the skin or the eye, e.g. in the form of lotions, gels, ointments or creams, or in a nasal or a suppository form. If not indicated otherwise, these are prepared in a manner known per se, e.g., by means of conventional mixing, granulating, sugar-coating, dissolving or lyophilizing processes. It will be appreciated that the unit content of each agent contained in an individual dose of each dosage form need not in itself constitute an effective amount since the necessary effective amount can be reached by administration of a plurality of dosage units.

Pharmaceutical compositions may comprise one or more pharmaceutical acceptable carriers or diluents and may be manufactured in conventional manner by mixing one or both combination partners with a pharmaceutically acceptable carrier or diluent. Examples of pharmaceutically acceptable diluents include, but are not limited to, lactose, dextrose, mannitol, and/or glycerol, and/or lubricants and/or polyethylene glycol. Examples of pharmaceutically acceptable acceptable binders include, but are not limited to, magnesium aluminum silicate, starches, such as corn, wheat or rice starch, gelatin, methylcellulose, sodium carboxymethylcellulose and/or polyvinylpyrrolidone, and, if desired, pharmaceutically acceptable disintegrators include, but are not limited to, starches, agar, alginic acid or a salt thereof, such as sodium alginate, and/or effervescent mixtures, or adsorbents, dyes, flavorings and sweeteners. It is also possible to use the compounds of the present disclosure in the form of parenterally administrable compositions or in the form of infusion solutions. The pharmaceutical compositions may be sterilized and/or may comprise excipients, for example preservatives, stabilizers, wetting compounds and/or emulsifiers, solubilisers, salts for regulating the osmotic pressure and/or buffers.

In particular, a therapeutically effective amount of each of the combination partner of the combination of the disclosure may be administered simultaneously or sequentially and in any order, and the components may be administered separately or as a fixed combination. For example, the method of preventing or treating a cancer according to the disclosure may comprise: (i) administration of the first agent in free or pharmaceutically acceptable salt form; and (ii) administration of a second agent in free or pharmaceutically acceptable salt form, simultaneously or sequentially in any order, in jointly therapeutically effective amounts, preferably in synergistically effective amounts, e.g., in daily or intermittently dosages corresponding to the amounts described herein. The individual combination partners of the combination of the disclosure may be administered separately at different times during the course of therapy or concurrently in divided or single combination forms. Furthermore, the term administering also encompasses the use of a pro-drug of a combination partner that convert in vivo to the combination partner as such. The instant disclosure is therefore to be understood as embracing all such regimens of simultaneous or alternating treatment and the term "administering" is to be interpreted accordingly.

The effective dosage of each of combination partner agents employed in the combination of the disclosure may vary depending on the particular compound or pharmaceutical composition employed, the mode of administration, the condition being treated, the severity of the condition being treated. Thus, the dosage regimen of the combination of the disclosure is selected in accordance with a variety of factors including type, species, age, weight, sex and medical condition of the patient; the severity of the condition to be treated; the route of administration; the renal and hepatic function of the patient; and the particular compound employed. A physician, clinician or veterinarian of ordinary skill can readily determine and prescribe the effective amount of the drug required to prevent, counter or arrest the progress of the condition. Optimal precision in achieving concentration of drug within the range that yields efficacy requires a regimen based on the kinetics of the drug's availability to target sites. This involves a consideration of the distribution, equilibrium, and elimination of a drug.

A further benefit is that lower doses of the active ingredients of the combination of the disclosure can be used, e.g., that the dosages need not only often be smaller but are also applied less frequently, or can be used in order to diminish the incidence of side effects. This is in accordance with the desires and requirements of the patients to be treated.

The combination of the agents can be combined in the same pharmaceutical preparation or in the form of combined preparations "kit of parts" in the sense that the combination partners can be dosed independently or by use of different fixed combinations with distinguished amounts of the combination partners, i.e., simultaneously or at different time points. The parts of the kit of parts can then, e.g., be administered simultaneously or chronologically staggered, that is at different time points and with equal or different time intervals for any part of the kit of parts.

The present disclosure further relates to a kit comprising a first compound selected from the group consisting of Compounds A1-A3 or pharmaceutically acceptable salts thereof, a second compound selected from the group consisting of Compounds B1-B4 or pharmaceutically acceptable salts thereof, and a package insert or other labeling including directions for treating a cancer.

The present disclosure further relates to a kit comprising a first compound selected from the group consisting of Compounds A1-A3 or pharmaceutically acceptable salts thereof, a second compound selected from the group consisting of Compounds B1-B4 or pharmaceutically acceptable salts thereof, a third compound selected from the group consisting of Compounds C1-C3 or pharmaceutically acceptable salts thereof, and a package insert or other labeling including directions for treating a cancer.

The following Examples illustrate the disclosure described above; they are not, however, intended to limit the scope of the disclosure in any way. The beneficial effects of the pharmaceutical combination of the present disclosure can also be determined by other test models known as such to the person skilled in the pertinent art.

Example 1

The following experimental procedure is performed to demonstrate the efficacy and anti-proliferative activity of Compound A1 in double or triple combination in the treatment of breast cancer:

Preparation of Compounds/Reagent Solutions

Compound A1 (a CDK4/6 inhibitor, 10 mM), Compound 1 (Letrozole, Sigma, 10 mM), Compound B3 (Fulvestrant, Sigma, 10 mM), Compound B2 (Exemestane, Sigma, 10 mM), Compound C1 (a PI3K inhibitor, 10 mM), Compound C3 (an mTor inhibitor, 10 mM) and Compound C2 (a PI3K inhibitor, 10 mM) were dissolved in DMSO. Δ4A (the precursor androstenedione10 mM) were dissolved in ethanol. All these reagents were stored in aliquots at −20° C.

Cell Culture

MCF7 human breast carcinoma cells were provided by Dr. Chen Shiuan (City of Hope National Medical Center, CA, USA), which were stably transfected with the aromatase expression vector bearing the neomycin (G418) resistance gene (also named MCF7/Aro). Aromatase converts the precursor androstenedione (Δ4A) into 17β-estradiol (E2), which is required for the proliferation of the host cell line. Unless otherwise mentioned, all cell culture reagents were obtained from Invitrogen. Cells were maintained in MEM (#11095-080) supplemented with 10% v/v fetal bovine serum (FBS, #10099-141), 1 mM sodium pyruvate (#11360-070), 1% v/v non-essential amino acids (#11140-050) and G418 (geneticin, #10131) in a humidified incubator at 37° C. in 5% CO2. The cells were passaged twice a week and the medium was changed every 2 to 3 days. To assess estrogen driven cell proliferation, it was necessary to deplete the medium of steroids. To do so, the steroid-depleted (SD) medium, MEM (#51200-038, no phenol red & no glutamine) supplemented with charcoal stripped FBS (#12676-029) and Glutamax (#35050-061) was used. Medium without phenol red (pH indicator) was required since it is a structural homologue of estrogen. Moreover, normal FBS need to be replaced by charcoal-stripped FBS in order to remove steroids. TryPLE Express (12604-013, no phenal red) was used for cell dissociation during SD treatment.

Cell viability assay and cell proliferation assay MCF7/Aro cells were steroid deprived for 3 days before trypsinized using TryPLE Express (#12604-013, without phenol red) and 1500 cells/well were plated on clear-bottom 384-well black plates (Greiner, #781091) in triplicates with 30 µl/well growth media, cells were allowed to attach overnight and were followed by 6 days of incubation with 10 nM of Δ4A and various concentrations of drugs or drug combinations (10 µl/well). Cell viability was determined by measuring cellular ATP content using the CELLTITER-GLO® (CTG) luminescent cell viability assay (PROMEGA®). Each single agent and combination treatment of cells was compared to controls (cells treated with an equivalent volume of medium). 30 ul/well of the CTG reagents was added to each well at the end of the compound treatment and luminescence was recorded on an ENVISION™ plate reader (PERKIN ELMER®). Reduced and enhanced luminescent signal values (responses) were calculated relative to untreated (control) cells.

Combinations Tested

The following combinations were tested:
(a) Compound A1/Compound 1 (Letrozole);
(b) Compound A1/Compound 1 (Letrozole)/Compound C1 (1 uM or 500 nM);
(c) Compound A1/Compound 1 (Letrozole)/Compound C3 (20 nM or 2 nM);
(d) Compound A1/Compound 1 (Letrozole)/Compound C2 (333 nM);
(e) Compound A1/Compound B3 (Fulvestrant);
(f) Compound A1/Compound B3 (Fulvestrant)/Compound C1 (1 uM or 500 nM);
(g) Compound A1/Compound B3 (Fulvestrant)/Compound C3 (20 nM or 2 nM);
(h) Compound A1/Compound B3 (Fulvestrant)/Compound C2 (333 nM);
(i) Compound A1/Compound B2 (Exemestane);
(j) Compound A1/Compound B2 (Exemestane)/Compound C1 (1 uM or 500 nM);
(k) Compound A1/Compound B2 (Exemestane)/Compound C3 (20 nM or 2 nM); and (l) Compound A1/Compound B2 (Exemestane)/Compound C2 (333 nM).

Compound A1, Compound 1 (Letrozole), Compound B2 (Exemestane) and Compound B3 (Fulvestant) were in multiple doses, and Compound C1, Compound C2 and Compound C3 were in a single dose as a background compounds (doses as labeled above) in all the triple combinations.

To evaluate the anti-proliferative activity of all the combinations in a non-bias way, as well as to identify synergistic effect at all possible concentrations, the studies were conducted with a "dose matrix." This utilized all possible permutations of serially-diluted Compound A1/Compound 1 (Letrozole), Compound A1/Compound B3 (Fulvestant) and Compound A1/Compound B2 (Exemestane) (with a single dose background compound). In all combination assays, agents were applied simultaneously.

The "dose matrix, Compound A1/Compound 1, Compound A1/Compound B3 and Compound A1/Compound B2" were consisted of the followings:
  (a) Compound A1 (in the combination of Compound A1/Compound 1 and Compound A1/Compound B2), which was subjected to a 6 dose 3× serial dilution with a high dose of 10 uM and a low dose of approximately 41 nM
  (b) Compound A1 (in the combination of Compound A1/Compound B3), which was subjected to a 5 or 6 dose 3× serial dilution with a high dose of 1 or 3 uM and a low dose of approximately 12 nM
  (c) Compound 1, which was subjected to a 7 dose 3× serial dilution with a high dose of 5 uM and a low dose of approximately 7 nM
  (d) Compound B3, which was subjected to a 6 dose 3× serial dilution with a high dose of 800 nM and a low dose of approximately 3 nM
  (e) Compound B2, which was subjected to a 7 dose 3× serial dilution with a high dose of 10 uM and a low dose of approximately 14 nM.

Calculating the Effect of Combinations:

The synergistic interaction (analyzed using Chalice software [CombinatoRx, Cambridge MA]) was calculated by comparing the response from a combination to the response of the agent acting alone, against the drug-with-itself dose-additive reference model. Deviations from dose additives can be assessed numerically with a Combination Index (CI), which quantifies the overall strength of combination effect. This calculation (essentially a volume score) is as follows: $V_{HSA}=\Sigma_{X,Y}\ln fX \ln fY (I_{data}-I_{HSA})$. Additionally, CI is calculated between the data and the highest single-agent surface, normalized for single agent dilution factors (Lehar et al, 2009):

Data Analysis

Data evaluation and graph generation were performed using MICROSOFT® EXCEL® software, and Chalice software.

Results

To investigate the activity of double or triple combinations of Compound A1 with antiestrogen therapeutics such as fulvestrant (Compound B3), letrozole (Compound 1) and exemestane (Compound B2), with or without PI3K or mTOR inhibitor Compound C1, Compound C2 or Compound C3 on cell proliferation, various combos as described in the method section were tested in androstenedione driven, aromatase overexpressing MCF7 cells. Synergy was observed between Compound A1 and all three antihormonal therapies in a 7×8 dose matrix combination setting, with synergy score each at 4.12, 2.41 and 1.43, for letrozole (Compound 1), exemestane (Compound B2) and fulvestrant (Compound B3), respectively. Various does of PI3K and mTOR inhibitor was also added to the same 7×8 does matrix setting as a background compounds to test the efficacy of triple combinations, in all cases, the triple combo significantly enhanced the maximum level of inhibition achieved by single or double reagents, and greatly reduced the doses needed for achieving the same levels of inhibition. Those results solidly support the concept of combining two or three reagents targeting cell cycle, mTOR/PI3K and estrogen pathway in ER positive breast cancer.

The results from Example 1 are shown in FIGS. 1-7.

Example 2

The following experimental procedure is performed to demonstrate the efficacy and anti-proliferative activity of Compound A2 or Compound A3 in double or triple combination in the treatment of breast cancer:

Preparation of Compounds/Reagent Solutions

Compound A2 (a CDK4/6 inhibitor, 10 mM), Compound A3 (a CDK4/6 inhibitor, 10 mM), Compound 1 (Letrozole, Sigma, 10 mM), Compound B3 (Fulvestrant, Sigma, 10 mM), Compound B2 (Exemestane, Sigma, 10 mM), Compound C1 (a PI3K inhibitor, 10 mM), and Compound C3 (an mTor inhibitor, 10 mM) were dissolved in DMSO. Δ4A (the precursor androstenedione, 10 mM) were dissolved in ethanol. All these reagents were stored in aliquots at −20° C.

Cell Culture

MCF7 human breast carcinoma cells were provided by Dr. Chen Shiuan (City of Hope National Medical Center, CA, USA), which were stably transfected with the aromatase expression vector bearing the neomycin (G418) resistance gene (also named MCF7/Aro). Aromatase converts the precursor androstenedione (Δ4A) into 17β-estradiol (E2), which is required for the proliferation of the host cell line. Unless otherwise mentioned, all cell culture reagents were obtained from Invitrogen. Cells were maintained in MEM (#11095-080) supplemented with 10% v/v fetal bovine serum (FBS, #10099-141), 1 mM sodium pyruvate (#11360-070), 1% v/v non-essential amino acids (#11140-050) and G418 (geneticin, #10131) in a humidified incubator at 37° C. in 5% CO2. The cells were passaged twice a week and the medium was changed every 2 to 3 days. To assess estrogen driven cell proliferation, it was necessary to deplete the medium of steroids. To do so, the steroid-depleted (SD) medium, MEM (#51200-038, no phenol red & no glutamine) supplemented with charcoal stripped FBS (#12676-029) and Glutamax (#35050-061) was used. Medium without phenol red (pH indicator) was required since it is a structural homologue of estrogen. Moreover, normal FBS need to be replaced by charcoal-stripped FBS in order to remove steroids. TryPLE Express (12604-013, no phenal red) was used for cell dissociation during SD treatment.

Cell Viability Assay and Cell Proliferation Assay

MCF7/Aro cells were steroid deprived for 3 days before trypsinized using TryPLE Express (#12604-013, without phenol red) and 1500 cells/well were plated on clear-bottom 384-well black plates (Greiner, #781091) in triplicates with 30 μl/well growth media, cells were allowed to attach overnight and were followed by 6 days of incubation with 10 nM of Δ4A and various concentrations of drugs or drug combinations (10 μl/well). Cell viability was determined by measuring cellular ATP content using the CELLTITER-GLO® (CTG) luminescent cell viability assay (PROMEGA®). Each single agent and combination treatment of cells was compared to controls (cells treated with an equivalent volume of medium). 30 ul/well of the CTG reagents was added to each well at the end of the compound treatment and luminescence was recorded on an ENVISION™ plate reader (PERKIN ELMER®). Reduced and enhanced luminescent signal values (responses) were calculated relative to untreated (control) cells.

Combinations Tested

The following combinations were tested:
- (a) Compound A2/Compound 1 (Letrozole);
- (b) Compound A2/Compound 1 (Letrozole)/Compound C1;
- (c) Compound A2/Compound 1 (Letrozole)/Compound C3;
- (d) Compound A2/Compound B3 (Fulvestrant);
- (e) Compound A2/Compound B3 (Fulvestrant)/Compound C1;
- (f) Compound A2/Compound B3 (Fulvestrant)/Compound C3;
- (g) Compound A2/Compound B3 (Exemestane);
- (h) Compound A2/Compound B3 (Exemestane)/Compound C1;
- (i) Compound A2/Compound B3 (Exemestane)/Compound C3;
- (j) Compound A3/Compound 1 (Letrozole);
- (k) Compound A3/Compound 1 (Letrozole)/Compound C1;
- (l) Compound A3/Compound 1 (Letrozole)/Compound C3;
- (m) Compound A3/Compound B3 (Fulvestrant);
- (n) Compound A3/Compound B3 (Fulvestrant)/Compound C1;
- (o) Compound A3/Compound B3 (Fulvestrant)/Compound C3;
- (p) Compound A3/Compound B3 (Exemestane);
- (q) Compound A3/Compound B3 (Exemestane)/Compound C1; and
- (r) Compound A3/Compound B3 (Exemestane)/Compound C3.

Compound A2, Compound A3, Letrozole (Compound 1), Exemestane (Compound B2) and Fulvestant (Compound B3) were in multiple doses, and Compound C1 (1 uM) and Compound C2 (20 nM) were in a single dose as a background in all the triple combinations.

To evaluate the anti-proliferative activity of all the combinations in a non-bias way, as well as to identify synergistic effect at all possible concentrations, the studies were conducted with a "dose matrix." This utilized all possible permutations of serially-diluted Compound A2/Compound 1 (Letrozole), Compound A2/Compound B3 (Fulvestant), Compound A2/Compound B2 (Exemestane), Compound A3/Compound 1 (Letrozole), Compound A3/Compound B3 (Fulvestant) and Compound A3/Compound B2 (Exemestane) (with a single dose background compound). In all combination assays, agents were applied simultaneously.

The "dose matrix, Compound A2/Compound 1, Compound A2/Compound B3, Compound A2/Compound B2, Compound A3/Compound 1, Compound A3/Compound B3 and Compound A3/Compound B2" were consisted of the followings:
- (a) Compound A2, which was subjected to a 7 dose 3× serial dilution with a high dose of 3 uM and a low dose of approximately 4.1 nM
- (b) Compound A3, which was subjected to a 7 dose 3× serial dilution with a high dose of 3 uM and a low dose of approximately 4.1 nM
- (c) Compound B1, which was subjected to a 6 dose 3× serial dilution with a high dose of 5 uM and a low dose of approximately 20.6 nM
- (d) Compound B3, which was subjected to a 6 dose 3× serial dilution with a high dose of 100 nM and a low dose of approximately 0.4 nM
- (e) Compound B2, which was subjected to a 6 dose 3× serial dilution with a high dose of 10 uM and a low dose of approximately 41.2 nM Calculating the Effect of Combinations The synergistic interaction (analyzed using Chalice software [CombinatoRx, Cambridge MA]) was calculated by comparing the response from a combination to the response of the agent acting alone, against the drug-with-itself dose-additive reference model. Deviations from dose additives can be assessed numerically with a Combination Index (CI), which quantifies the overall strength of combination effect. This calculation (essentially a volume score) is as follows: $V_{HSA} = \Sigma_{X,Y} \ln fX \ln fY (I_{data} - I_{HSA})$. Additionally, CI is calculated between the data and the highest single-agent surface, normalized for single agent dilution factors (Lehar et al, 2009):

Data Analysis

Data evaluation and graph generation were performed using Microsoft Excel software, and Chalice software.

Results

To investigate the activity of double or triple combinations of Compound A2 and Compound A3 with antiestrogen therapeutics such as fulvestrant (Compound B3), letrozole (Compound 1) and exemestane (Compound B2), with or without PI3K or mTOR inhibitor Compound C1 or Compound C3 on cell proliferation, various combos as described in the method section were tested in androstenedione driven, aromatase overexpressing MCF7 cells. Synergy was observed between Compound A3 and all three antihormonal therapies in a 7×8 dose matrix combination setting, with score each at 3.7, 1.2 and 1.7 for letrozole, exemestane and fulvestrant respectively. And synergy was also observed in Compound A2/Letrozole and Compound A2/Fulvestrant combinations with score each at 3.2 and 1.4. Single dose of PI3K and mTOR inhibitor was also added to the same 7×8 does matrix setting as a background compounds to test the efficacy of triple combinations, in all cases, the triple combo significantly enhanced the maximum level of inhibition achieved by single or double reagents, and greatly reduced the doses needed for achieving the same levels of inhibition. Those results solidly support the concept of combining two or three reagents targeting cell cycle, mTOR/PI3K and estrogen pathway in ER positive breast cancer.

The results from Example 2 are shown in FIGS. 8-19.

The Table below summarizes the synergy score of the various combinations tested in Example 2.

| Combo | synergy score |
|---|---|
| Compound A3/Compound B1 | 3.7 |
| Compound A3/Compound B1/Compound C1 | 1.7 |
| Compound A3/Compound B1/Compound C3 | 4.5 |
| Compound A3/Compound B2 | 1.2 |
| Compound A3/Compound B2/Compound C1 | 1.5 |
| Compound A3/Compound B2/Compound C3 | 2.8 |
| Compound A3/Compound B3 | 1.7 |
| Compound A3/Compound B3/Compound C1 | 3.0 |
| Compound A3/Compound B3/Compound C3 | 1.7 |
| Compound A2/Compound B1 | 3.2 |
| Compound A2/Compound B1/Compound C1 | 1.9 |
| Compound A2/Compound B1/Compound C3 | 4.4 |

-continued

| Combo | synergy score |
|---|---|
| Compound A2/Compound B2 | 0.8 |
| Compound A2/Compound B2/Compound C1 | 1.3 |
| Compound A2/Compound B2/Compound C3 | 2.4 |
| Compound A2/Compound B3 | 1.4 |
| Compound A2/Compound B3/Compound C1 | 3.2 |
| Compound A2/Compound B3/Compound C3 | 1.5 |

Example 3

A clinical trial is currently on going to further the clinical development of the two investigational agents in ER+ breast cancer, Compound A1 (CDK4/6 inhibitor) and Compound C1 (PI3K inhibitor). This is a multi-center, open-label, dose finding Phase Ib/II trial. The Phase Ib part is a three-part dose escalation study to estimate the MTD and/or RP2D for two double combinations: Compound A1 with letrozole and Compound C1 with letrozole followed by estimation of the MTD and/or RP2D of the triple combination of Compound A1+Compound C1 with letrozole.

The three-part Phase Ib will be followed by a randomized Phase II study to assess the preliminary anti-tumor activity of the two double combination regimens (Compound A1+letrozole and Compound C1+letrozole) versus the triple combination (Compound A1+Compound C1 with letrozole) and to further evaluate their safety in patients with ER+/HER2− locally advanced or metastatic breast cancer.

Approximately 290 adult women with ER+/HER2− locally advanced or metastatic breast cancer will be enrolled.

The starting dose for the study drug combination doublets and triplet are described below. The standard dose of letrozole will be used throughout this study (2.5 mg/day).

| Arm | Compound A1 (3 weeks followed by a one week break) | Compound C1 (QD) | Letrozole (QD) |
|---|---|---|---|
| Compound A1 and Letrozole | 600 mg | — | 2.5 mg |
| Compound C1 and Letrozole | — | 300 mg | 2.5 mg |
| Compound A1 and Compound C1 and Letrozole | 400 mg | 100 mg | 2.5 mg |

The objectives of the Phase Ib portion of the study are:
Primary Objectives
 To estimate the maximum tolerated dose (MTD) and/or recommended Phase II dose (RP2D) of the following combinations:
  Arm 1: Compound A1+letrozole (2.5 mg)
  Arm 2: Compound C1+letrozole (2.5 mg)
  Arm 3: Compound A1+Compound C1+letrozole (2.5 mg).
Secondary Objectives
 To characterize the pharmacokinetic (PK) profiles of Compound A1, Compound C1, and letrozole when used in combination.
 To characterize the safety and tolerability in Arms 1, 2, and 3.
 To assess preliminary clinical antitumor activity in Arms 1, 2, and 3.

Figure 23:
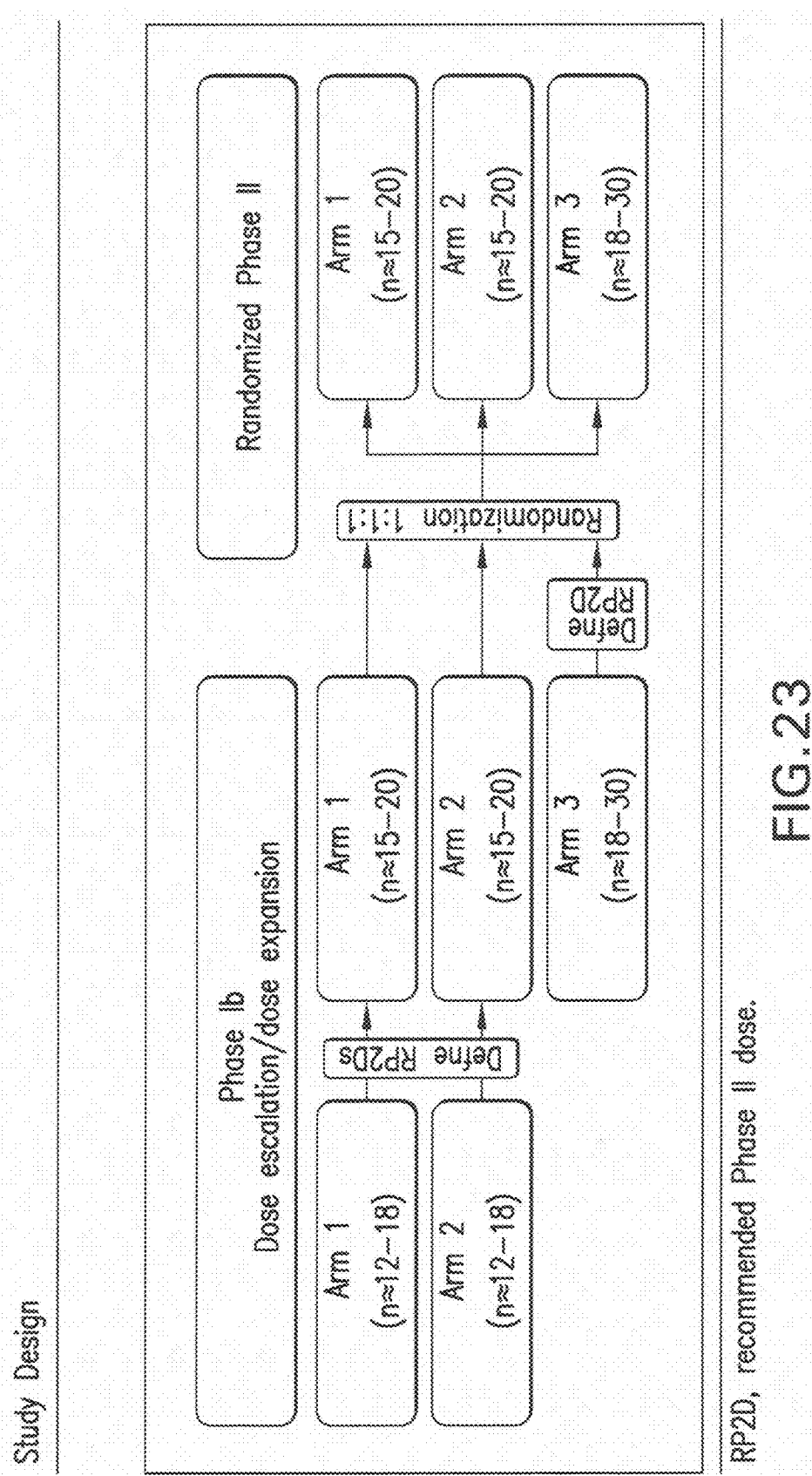
FIG. 23 illustrates the study design of clinical trial described in Example 3.

Study Design (FIG. 23)
 In the Phase Ib portion of this multicenter, open-label study, postmenopausal women with ER+/human epidermal growth factor receptor negative (HER2−) advanced BC are being treated with once-daily doses of Compound A1 (3-weeks-on/1-week-off)+letrozole (2.5 mg) or Compound C1+letrozole (2.5 mg).
 Dose escalation is guided by the adaptive Bayesian Logistic Regression Model (BLRM) along with the Escalation With Overdose Control principle.
 PK assessments were conducted prior to dose-escalation decisions during the study to monitor exposure and evaluate possibility of cytochrome P450-mediated drug-drug interactions.
 Upon determination of the MTD/RP2D in Arms 1 and 2, the BLRM will be updated with the most recent data from the dose-escalation in Arms 1 and 2, and this will be used to determine the starting dose for Arm 3.
Key Inclusion Criteria
 Postmenopausal women with metastatic or locally advanced ER+/HER2− BC.
 Any number of prior lines of endocrine therapy.
 Up to 1 prior cytotoxic regimen in the metastatic or locally advanced setting.
 Representative tumor specimen (archival or new) available for molecular testing (unless otherwise agreed).
 Newly obtained, matched pre- and on-therapy tumor samples are mandatory in the Phase Ib dose-escalation part of the study.
Key Exclusion Criteria
 Prior treatment with a CDK4/6, AKT, mTOR, or PI3K inhibitor and failure to benefit.
 Current symptomatic brain metastases.
 Clinically manifest diabetes mellitus, history of gestational diabetes mellitus, or documented steroid-induced diabetes mellitus.
 QT corrected with Fridericia's formula (QTcF)>470 ms.
Assessments
 Routine safety assessments conducted at baseline and at regular intervals throughout the study, and adverse events (AEs) assessed continuously according to Common Terminology Criteria for Adverse Events v4.03.
 Tumor response evaluated locally by the investigator, using computerized tomography and magnetic resonance imaging, based on Response Evaluation Criteria In Solid Tumors v1.1. Evaluations conducted at baseline, every 8 weeks through to Cycle 6, every 12 weeks thereafter (or sooner if there is clinical evidence of disease progression), and at end of treatment.
 Samples for PK evaluations collected on Days 1, 2, 8, 15, 21, and 22 of Cycle 1 and on Day 15 of Cycles 2-6. Real-time PK assessments were conducted to guide dose escalation (in addition to BLRM).
Interim Results
Patient Characteristics and Disposition
 10 patients have been treated with Compound A1 and letrozole (Arm 1), and 7 patients have been treated with Compound C1 and letrozole (Arm 2). The patients details are shown in Table 1.

TABLE 1

Patient Characteristics and Disposition

| Characteristic | Arm 1: Compound A1 600 mg + letrozole (n = 10) | Arm 2: Compound C1 300 mg + letrozole (n = 7) | All subjects (N = 17) |
|---|---|---|---|
| Median age, years (range) | 59 (45-67) | 61 (51-72) | 60 (45-72) |
| WHO performance status, n (%) | | | |
| 0 | 5 (50) | 4 (57) | 9 (53) |
| 1 | 5 (50) | 3 (43) | 8 (47) |
| Median time since initial diagnosis to first dose of treatment, months (range) | 123 (9-173) | 49 (2-295) | 104 (2-295) |
| Pts who received prior antineoplastic regimens, n (%) | 10 (100) | 7 (100) | 17 (100) |
| Number of regimens, n (%) | | | |
| 1 | 2 (20) | 3 (43) | 5 (29) |
| 2 | 1 (10) | 2 (29) | 3 (18) |
| 4 | 0 | 1 (14) | 1 (6) |
| 5 | 2 (20) | 0 | 2 (12) |
| >5 | 5 (50) | 1 (14) | 6 (35) |
| Prior therapies received in the advanced/metastatic setting, n (%) | | | |
| Chemotherapy | 4 (40) | 0 | 4 (24) |
| Anastrozole | 4 (40) | 3 (43) | 7 (41) |
| Fulvestrant | 6 (60) | 2 (29) | 8 (47) |
| Letrozole | 4 (40) | 3 (43) | 7 (41) |
| Tamoxifen | 1 (10) | 0 | 1 (6) |
| Exemestane | 3 (30) | 2 (29) | 5 (29) |
| PI3K/AKT/mTOR inhibitors | 5 (50) | 1 (14) | 6 (35) |
| Other | 7 (70) | 2 (29) | 9 (53) |
| Number of pts who received prior surgery, n (%) | 9 (90) | 7 (100) | 16 (94) |
| Number of pts who received prior radiotherapy, n (%) | 8 (80) | 4 (57) | 12 (71) | mTOR, mammalian target of rapamycin; PI3K, phosphatidylinositol 3-kinase; pts, patients; WHO, World Health Organization.

At the time of study entry, all patients had stage IV ER+/HER2− BC.

Treatment has been discontinued in 2 (20%) patients in Arm 1 due to disease progression. At the cut-off date, treatment was ongoing for all 7 (100%) patients in Arm 2.

Safety

Of 12 patients evaluable as part of the dose-determining set (6 in each arm), 3 dose-limiting toxicities (DLTs) were observed: 1 Grade 4 neutropenia in Arm 1 and 2 Grade 2 hyperglycemia in Arm 2.

The most common (>30% patients) all-grade adverse events suspected to be study drug-related were (see Table 2):

Arm 1: neutropenia (90%) and nausea (40%)

Arm 2: hyperglycemia (57%), nausea (43%), decreased appetite (43%), and diarrhea (43%).

TABLE 2

All Grades ≥10% and All Grade 3/4 Adverse Events

| Adverse event | Arm 1 Compound A1 600 mg + letrozole (n = 10) | | Arm 2: Compound C1 300 mg + letrozole (n = 7) | | All subjects (N = 17) | |
|---|---|---|---|---|---|---|
| | All grades, n (%) | Grade 3/4, n (%) | All grades, n (%) | Grade 3/4, n (%) | All grades, n (%) | Grade 3/4, n (%) |
| Hematologic adverse events | | | | | | |
| Neutropenia | 9 (90) | 5 (50) | 0 | 0 | 9 (53) | 5 (29) |
| Leukopenia | 2 (20) | 0 | 0 | 0 | 2 (12) | 0 |
| Lymphopenia | 0 | 0 | 1 (14) | 1 (14) | 1 (6) | 1 (6) |
| Non-hematologic adverse events | | | | | | |
| Nausea | 4 (40) | 0 | 3 (43) | 0 | 7 (41) | 0 |
| Fatigue | 3 (30) | 0 | 2 (29) | 1 (14) | 5 (29) | 1 (6) |
| Decreased appetite | 1 (10) | 0 | 3 (43) | 0 | 4 (24) | 0 |
| Diarrhea | 1 (10) | 0 | 3 (43) | 0 | 4 (24) | 0 |
| Hyperglycemia | 0 | 0 | 4 (57) | 1 (14) | 4 (24) | 1 (6) |

TABLE 2-continued

| | All Grades ≥10% and All Grade ¾ Adverse Events | | | | | |
|---|---|---|---|---|---|---|
| | Arm 1 Compound A1 600 mg + letrozole (n = 10) | | Arm 2: Compound C1 300 mg + letrozole (n = 7) | | All subjects (N = 17) | |
| Adverse event | All grades, n (%) | Grade ¾, n (%) | All grades, n (%) | Grade ¾, n (%) | All grades, n (%) | Grade ¾, n (%) |
| Weight decreased | 1 (10) | 0 | 2 (29) | 0 | 3 (18) | 0 |
| Dysgeusia | 0 | 0 | 2 (29) | 0 | 2 (12) | 0 |

QTcF prolongation (>470 ms) was not observed in Arm 1.
Grade 3/4 adverse events suspected to be study drug related included (Table 2):
Arm 1: neutropenia (50%)
Arm 2: lymphopenia (14%), fatigue (14%), and hyperglycemia (14%).
Dose reductions occurred in 5 patients: 1 patient in Arm 1 and 4 patients in Arm 2.

Pharmacokinetics
Preliminary PK data for Compound A1, Compound C1, and letrozole are as follows (Table 3):
PK for Compound A1 and Compound C1 on Days 1 and 21 are comparable with historic single-agent data.
PK for letrozole on Day 1 are comparable with those observed in single-agent studies.
Additional data are being gathered from patients currently enrolled in the trial to further evaluate letrozole PK in combination with Compound A1.

TABLE 3

Pharmacokinetic Parameters of Compound A1, Compound C1 and Letrozole

| Analyte | n | AUC all (h * ng/ml), mean (SD) | $C_{max}$ (ng/ml), mean (SD) | $T_{max}$ (h), median (range) |
|---|---|---|---|---|
| Arm 1, C1D1 | | | | |
| Compound A1 | 6 | 13072 (9458) | 1320 (859) | 3.0 (1.9-4.2) |
| Letrozole | 6 | 421 (115) | 25 (4) | 2.0 |
| Arm 1, C1D21 | | | | |
| Compound A1 | 3 | 32038 (16586) | 2780 (767) | 4.0 (1.9-4.0) |
| Letrozole | 3 | 1364 (785) | 79 (12) | 4.0 (4.0-7.5) |
| Arm 2, C1D1 | | | | |
| Compound C1 | 5 | 29102 (8251) | 2480 (922) | 3.8 (1.2-4.1) |
| Letrozole | 5 | 330 (115) | 27 (13) | 2.0 (1.2-4.0) |
| Arm 2, C1D21 | | | | |
| Compound C1 | 3 | 40358 (6329) | 3167 (314) | 2.0 (2.0-3.8) |
| Letrozole | 3 | 2412 (189) | 118 (9) | 2.0 (1.9-2.0) |

AUC, area under the curve; C, cycle; Cmax, maximum concentration; D, day; Tmax, time to reach maximum concentration.

Figure 24:
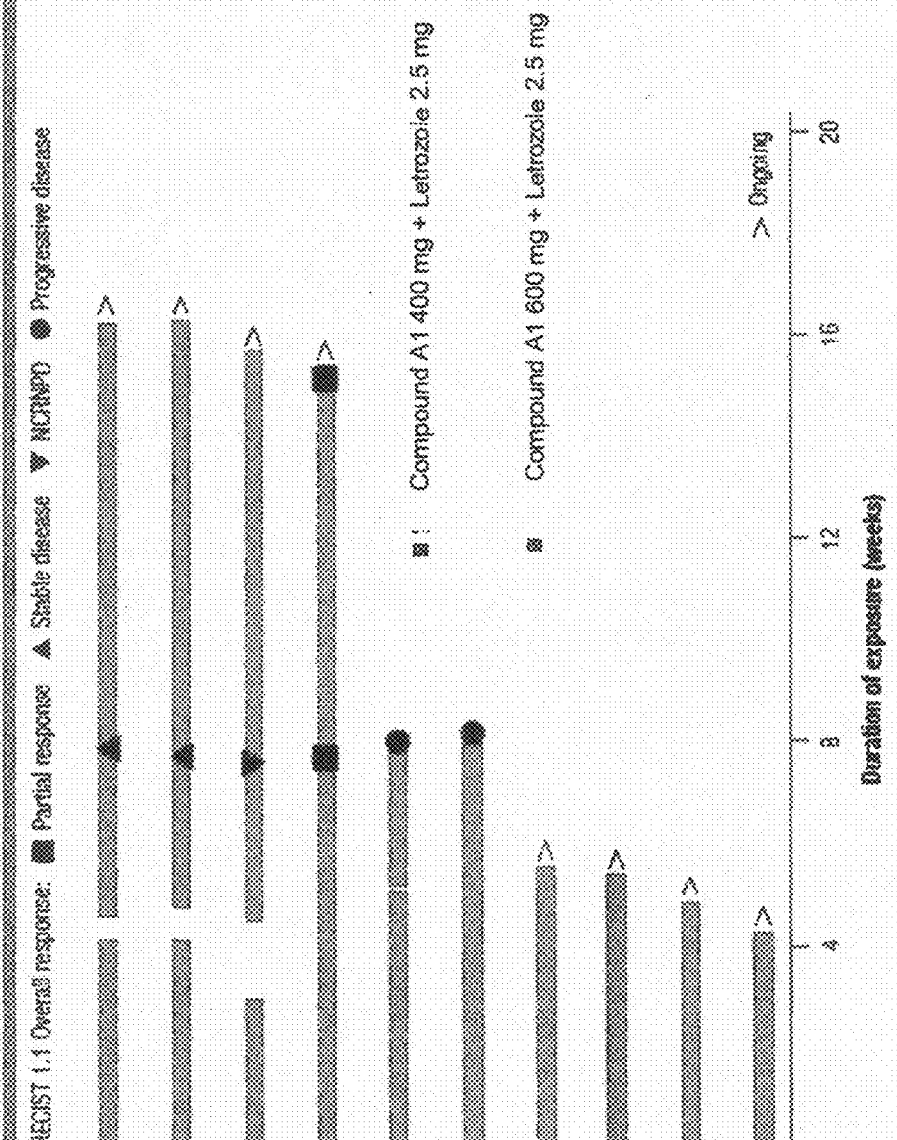
FIGS. 24 and 25 show the duration of exposure to treatment in ARM1 and ARM2 of the clinical trial described in Example 3 (interim results).
Figure 25:
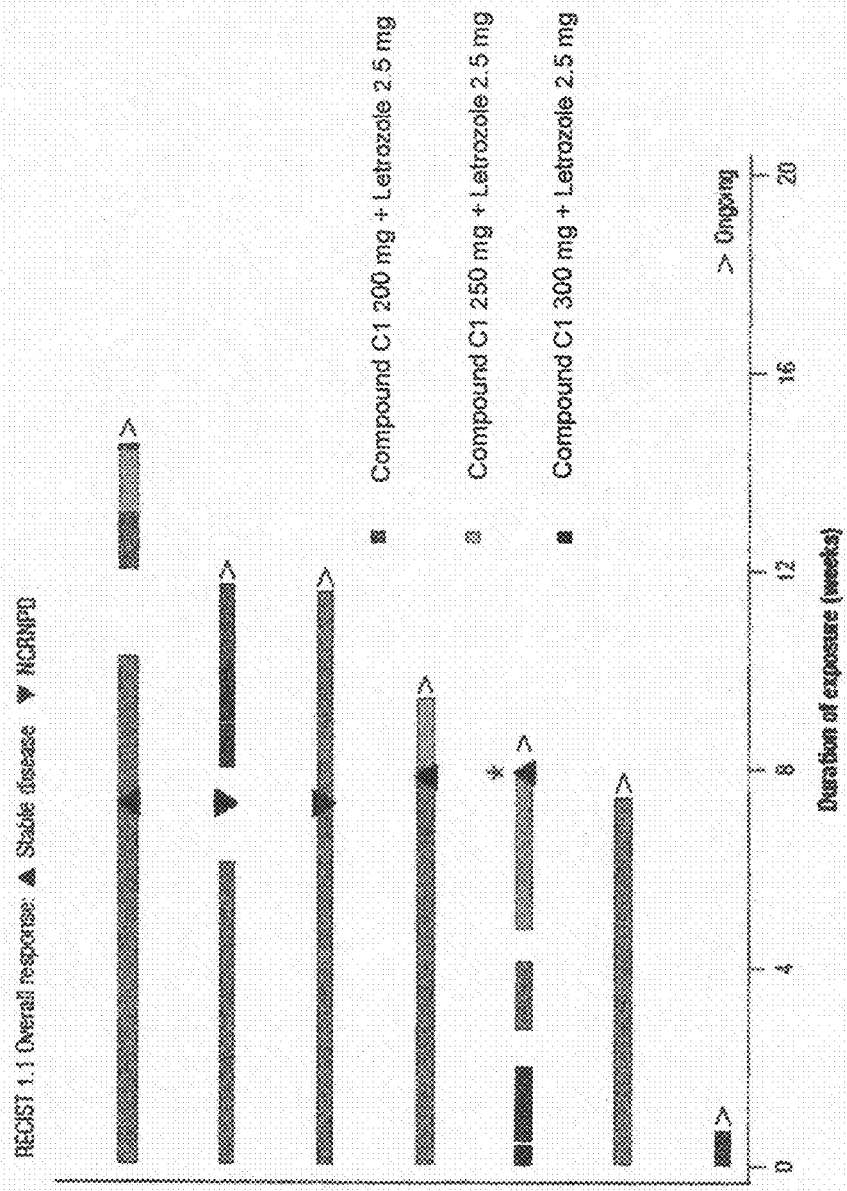
Figure 26:
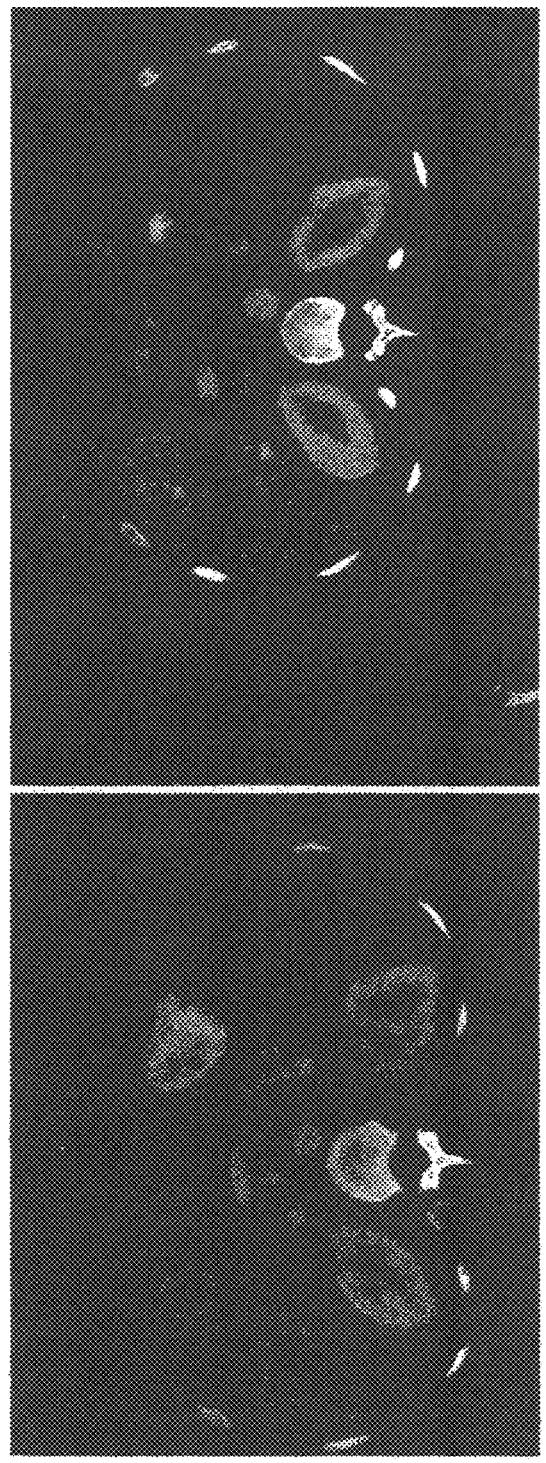
FIG. 26 shows the partial response observed for patient with metastatic breast carcinoma treated with Compound A1 and Letrozole; patient with metastatic breast carcinoma who had received a bilateral salpingo-oophorectomy and right neck mass excision, and treatment with letrozole, fulvestrant, and the phosphatidylinositol 3-kinase inhibitor GD00032 in the metastatic setting.

Clinical Activity
Duration of exposure to treatment is shown in FIGS. 24 and 25.
In Arm 1, there was 1 patient with a confirmed partial response (FIG. 26), 2 patients with stable disease (SD), and 1 patient without measurable disease had neither complete response nor progressive disease (NCRNPD; FIG. 24).
In Arm 2, there were 2 patients with SD and 3 patients had NCRNPD (FIG. 25).

Conclusion (Based on Interim Results)
Both arms of the study have demonstrated an acceptable safety profile and preliminary signs of clinical activity in postmenopausal women with ER+/HER2− advanced BC.
Neutropenia is an anticipated side effect of Compound A1, potentially due to inhibition of proliferation via CDK4/6 inhibition.
Hyperglycemia observed in Arm 2 (Compound C1+letrozole) may be an on-target effect of PI3K inhibition.
Dose escalation continues to determine the MTD/RP2D.
Upon determination of the MTD/RP2D in Arms 1 and 2, enrollment into Arm 3 will commence. Following the Phase Ib portion of the study a randomized Phase II portion will compare Compound A1+letrozole and Compound C1+letrozole with Compound A1+Compound C1+letrozole.

Example 4

A multi-center, pre-surgical, randomized, phase II study is planned, to assess the biological activity of Compound A1, 400 mg or 600 mg daily, in combination with letrozole 2.5 mg daily, as compared to single agent letrozole daily in postmenopausal patients with newly diagnosed HR+, HER2-negative, early breast cancer. A total of approximately 120 patients will be randomized. Patients will receive trial therapy for 14 days (±3 days) and then undergo surgery. Patients will be randomly assigned to treatment with:
a. Letrozole (2.5 mg once daily); OR
b. Letrozole (2.5 mg once daily)+Compound A1 400 mg daily; OR
c. Letrozole (2.5 mg once daily)+Compound A1 600 mg daily The primary objective of the study is to assess the cell cycle response rate defined as the percentage of patients who achieve a reduction in Ki67 expression to natural logarithm of percentage positive Ki67 of less than 1 (Baselga 2009). Although the trial is designed as open label, all pharmacodynamics and clinical pharmacology endpoints will be assessed by experts who are blinded to randomized treatment.

Example 5

A Phase Ib/II Trial of Compound A1 with everolimus and exemestane in the treatment of ER+ Her2− Advanced Breast Cancer is on-going. The purpose of the trial is to estimate the MTD(s) and/or RP2D of Compound A1 in combination with everolimus+exemestane, and Compound A1 in combination with exemestane, and to characterize the safety and tolerability of the combinations of everolimus+exemestane ±Compound A1 and Compound A1+exemestane in patients with ER+ HER2− advanced breast cancer. The study consists of 3 arms:

| Arms | Assigned Interventions |
|---|---|
| Compound A1 + everolimus + exemestane triple combination | Compound A1 is taken orally once per day for 21 days of each 28 day cycle. Exemestane is taken orally once per day. Everolimus is taken orally once per day. |
| Compound A1 + exemestane double combination | Compound A1 is taken orally once per day for 21 days of each 28 day cycle Exemestane is taken orally once per day. |
| everolimus + exemestane double combination | Exemestane is taken orally once per day. Everolimus is taken orally once per day. |

Compound A1 comes in 50 mg and 200 mg capsules. Exemestane comes in 25 mg tablets. Everolimus comes in 2.5 mg, 5 mg, and 7.5 mg tablets.

The objectives of the Phase Ib portion of this study are:

Primary Objective
  Determine the maximum tolerated dose (MTD)/recommended Phase II dose (RP2D) of Compound A1+everolimus (EVE)+exemestane (EXE) in patients with ER+/human epidermal growth factor receptor 2-negative (HER2−) advanced BC.

Secondary Objectives
  Determine the safety and tolerability of Compound A1+EVE+EXE and Compound A1+EXE.
  Characterize the pharmacokinetics (PK) of Compound A1 and/or EVE when administered in combination with EXE.
  Assess preliminary antitumor activity of Compound A1+EVE+EXE and Compound A1+EXE.
  Evaluate the relationship between antitumor activity and molecular aberrations in the cyclin D-CDK4/6-INK-Rb, PI3K/AKT/mTOR, and other cancer-related pathways.

Figure 27:
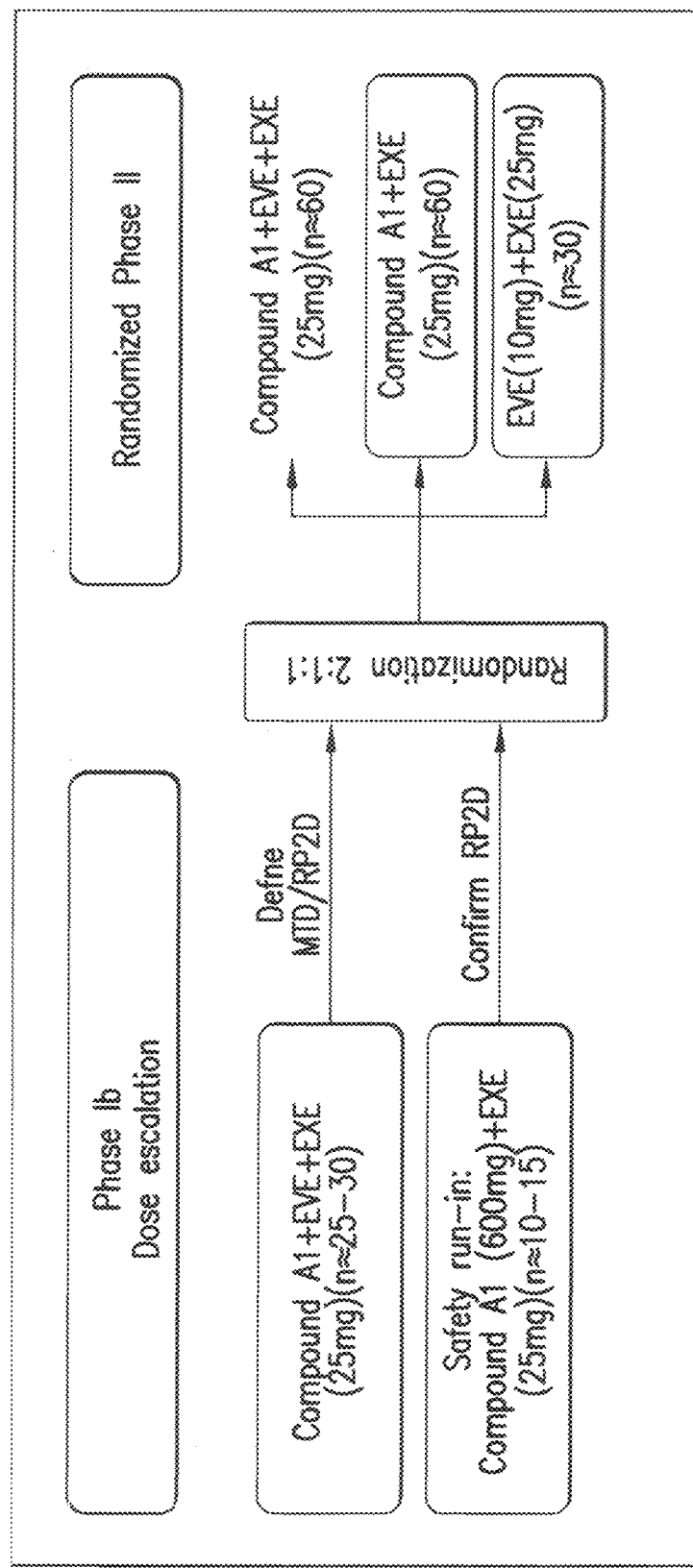
FIG. 27 illustrates the study design of clinical trial described in Example 5.

Study Design:
  In the Phase Ib portion of this Phase Ib/II multicenter, open-label study, postmenopausal women with ER+/HER2− advanced BC, resistant to letrozole or anastrozole, are being treated with escalating doses of Compound A1+EVE+EXE (25 mg/day) or a safety run-in of Compound A1 (600 mg/day)+EXE (25 mg/day; FIG. 27).
  Dose escalation is being guided by the adaptive Bayesian Logistic Regression Model along with the Escalation with Overdose Control principle and PK was assessed prior to dose-escalation decisions.
  Upon determination of the MTD/RP2D, the Phase II portion of the study will compare Compound A1+EVE+EXE triplet) and Compound A1+EXE (doublet) with EVE+EXE.

Key Inclusion Criteria:
  Postmenopausal women with ER+/HER2− locally advanced or metastatic BC.
  Recurrence while on, or within 12 months of end of, adjuvant treatment with letrozole or anastrozole OR progression while on, or within 1 month of end of, treatment with letrozole or anastrozole treatment for locally advanced or metastatic BC. Letrozole or anastrozole need not be the last treatment prior to study start.
  Previous treatment with a CDK4/6 inhibitor, EXE, or mTOR inhibitor allowed (for Phase Ib but not Phase II).
  Representative tumor specimen (archival or new) available for molecular testing.

Key Exclusion Criteria:
  >2 chemotherapy lines for advanced BC.
  Absolute neutrophil count ≤1.5×109/L.
  QT corrected with Fridericia's formula >470 ms.

Assessments:
  Routine safety assessments conducted at baseline and at regular intervals throughout the study. Adverse events (AEs) are being assessed continuously according to Common Terminology Criteria for Adverse Events v4.03.
  Tumor response assessed locally by the investigator using computerized tomography or magnetic resonance imaging according to Response Evaluation Criteria In Solid Tumors v1.1 at baseline and on Day (D) 1 of Cycles (C) 3, 5, and 7, on D1 of every 4th subsequent cycle (or sooner if clinically indicated), and at the end of treatment.
  PK evaluations for Compound A1 and EVE performed in patients treated with Compound A1+EVE+EXE during C1 on D1, 2, 8, 15, 16, and 21, and D1 of each subsequent cycle up to and including C6.
  Tumor samples analyzed by next-generation sequencing to determine any alterations in genes of interest.

Interim Results:

Patient Characteristics and Disposition:
  As of the interim report cut of date, 16 patients have been treated: 3 patients with Compound A1 600 mg+EXE 25 mg and 13 patients with Compound A1 (200 mg [6 patients]; 300 mg [6 patients]; 250 mg [1 patient])+EVE 2.5 mg+EXE 25 mg.
  Treatment has been discontinued in 5 (31%) patients. The primary reasons for discontinuation were: disease progression (4 patients) and death (1 patient).
  In the advanced/metastatic setting, previous treatment with letrozole or anastrozole was reported in 10 (63%) and 5 (31%) patients, respectively, while 6 (38%) and 3 (19%) patients had received prior EXE and EVE, respectively (Table 4).

TABLE 4

Patient and Disease Characteristics

| Characteristic | All (N = 16) |
|---|---|
| Median age, years (range) 57 (41-84) | 57 (41-84) |
| Time since initial diagnosis of primary site to first dose of drug (months), median (range) | 83 (8-355) |
| Site of metastases, n (%) | |
| Bone (no visceral disease) | 3 (25) |
| Bone and visceral | 9 (50) |
| Visceral (no bone disease) | 4 (25) |
| Others | 9 (56) |
| Setting at last medication, n (%) | |
| Adjuvant | 2 (13) |
| Neoadjuvant | 1 (6) |
| Advanced/metastatic disease | 14 (88) |
| Number of prior regimens in the advanced/metastatic setting, n (%) | |
| 0 | 2 (13) |
| 1-2 | 5 (31) |
| 3-4 | 7 (44) |
| >4 | 2 (13) |

TABLE 4-continued

Patient and Disease Characteristics

| Characteristic | All (N = 16) |
|---|---|
| Number of prior chemotherapy regimens in the advanced/metastatic setting, n (%) | |
| 0 | 10 (63) |
| 1 | 2 (13) |
| 2 | 4 (25) |
| Prior therapies received in the advanced/metastatic setting, n (%) | |
| Letrozole | 10 (63) |
| Anastrozole | 5 (31) |
| Fulvestrant | 11 (69) |
| Chemotherapy | 6 (38) |
| Exemestane | 6 (38) |
| Everolimus | 3 (19) |
| Other PI3K/AKT/mTOR pathway inhibitors | 4 (25) |
| Tamoxifen | 2 (13) |
| Others | 5 (31) |

PI3K, phosphatidylinositol 3-kinase; mTOR, mammalian target of rapamycin.

Safety:
  Among 13 patients evaluable for dose-limiting toxicities (DLTs), 3 DLTs were observed, all with Compound A1 300 mg+EVE 2.5 mg+EXE 25 mg: 1 Grade 3 febrile neutropenia and 2 Grade 3 alanine aminotransferase (ALT) elevation.
  Hematologic AEs were the most common toxicity across all cohorts (Table 5).
  The most common (≥10%) Grade 3/4 study drug-related AEs were neutropenia (50%), leukopenia (31%), ALT increased (13%), and hypophosphatemia (13%).

TABLE 5

Adverse Events (All Grade >15% in All Pts) Suspected to be Treatment Related

| Adverse Event | | Comp A1 (600 mg) + EXE (25mg) n = 3 | Comp A1 (200 mg) + EVE (2.5 mg) + EXE (25 mg) n = 6 | Comp A1 (250 mg) + EVE (2.5 mg) + EXE (25 mg) n = 1 | Comp A1 (300 mg) + EVE (2.5 mg) + EXE (25 mg) n = 6 | All pts treated with Comp A1 + EVE + EXE n = 13 | All pts N = 16 |
|---|---|---|---|---|---|---|---|
| Hematologic toxicities | | | | | | | |
| Neutropenia | All | 3 (100) | 4 (67) | 0 | 5 (83) | 9 (69) | 12 (75) |
| | G3/4 | 2 (67) | 3 (33) | 0 | 4 (67)* | 6 (46) | 8 (50) |
| Thrombocytopenia | All | 3 (100) | 3 (50) | 0 | 5 (83) | 8 (62) | 11 (69) |
| | G3/4 | 0 | 1 (17) | 0 | 0 | 1 (8) | 1 (6) |
| Anemia | All | 3 (100) | 2 (33) | 0 | 5 (83) | 7 (54) | 10 (63) |
| | G3/4 | 0 | 0 | 0 | 0 | 0 | 0 |
| Leukopenia | All | 3 (100) | 1 (17) | 1 (100) | 5 (83) | 7 (54) | 10 (63) |
| | G3/4 | 2 (67) | 1 (17) | 0 | 2 (33) | 3 (23) | 5 (31) |
| Lymphopenia | All | 0 | 3 (50) | 0 | 2 (33) | 5 (39) | 5 (31) |
| | G3/4 | 0 | 1 (17) | 0 | 0 | 1 (8) | 1 (6) |
| Hypophosphatemia | All | 0 | 1 (17) | 1 (100) | 1 (17) | 3 (23) | 3 (19) |
| | G3/4 | 0 | 0 | 1 (100) | 1 (17) | 2 (15) | 2 (13) |
| Non-hematologic toxicities | | | | | | | |
| ALT increased | All | 1 (33) | 2 (33) | 0 | 4 (67) | 6 (46) | 7 (44) |
| | G3/4 | 0 | 0 | 0 | 2 (33)* | 2 (15) | 2 (13) |
| AST increased | All | 1 (33) | 1 (17) | 0 | 4 (67) | 5 (39) | 6 (38) |
| | G3/4 | 0 | 0 | 0 | 1 (17) | 1 (8) | 1 (6) |
| Stomatitis | All | 2 (67) | 3 (50) | 0 | 1 (17) | 4 (31) | 6 (38) |
| | G3/4 | 0 | 0 | 0 | 0 | 0 | 0 |
| Blood alkaline phosphatase increased | All | 0 | 2 (33) | 0 | 2 (33) | 4 (31) | 4 (25) |
| | G3/4 | 0 | 0 | 0 | 0 | 0 | 0 |
| Diarrhea | All | 2 (67) | 1 (17) | 0 | 1 (17) | 2 (15) | 4 (25) |
| | G3/4 | 0 | 0 | 0 | 0 | 0 | 0 |
| Nausea | All | 1 (33) | 1 (17) | 0 | 2 (33) | 3 (23) | 4 (25) |
| | G3/4 | 0 | 0 | 0 | 0 | 0 | 0 |
| Fatigue | All | 0 | 0 | 0 | 3 (50) | 3 (23) | 3 (19) |
| | G3/4 | 0 | 0 | 0 | 1 (17) | 1 (8) | 1 (6) |
| Headache | All | 1 (33) | 1 (17) | 0 | 1 (17) | 2 (15) | 3 (19) |
| | G3/4 | 0 | 0 | 0 | 0 | 0 | 0 |

ALT, alanine aminotransferase; AST, aspartate aminotransferase; EVE, everolimus; EXE, exemestane; pt, patient; Comp A1, Compound A1.
*Dose-limiting toxicities included 1 Grade 3 febrile neutropenia and 2 Grade 3 ALT elevations.

Figure 28:
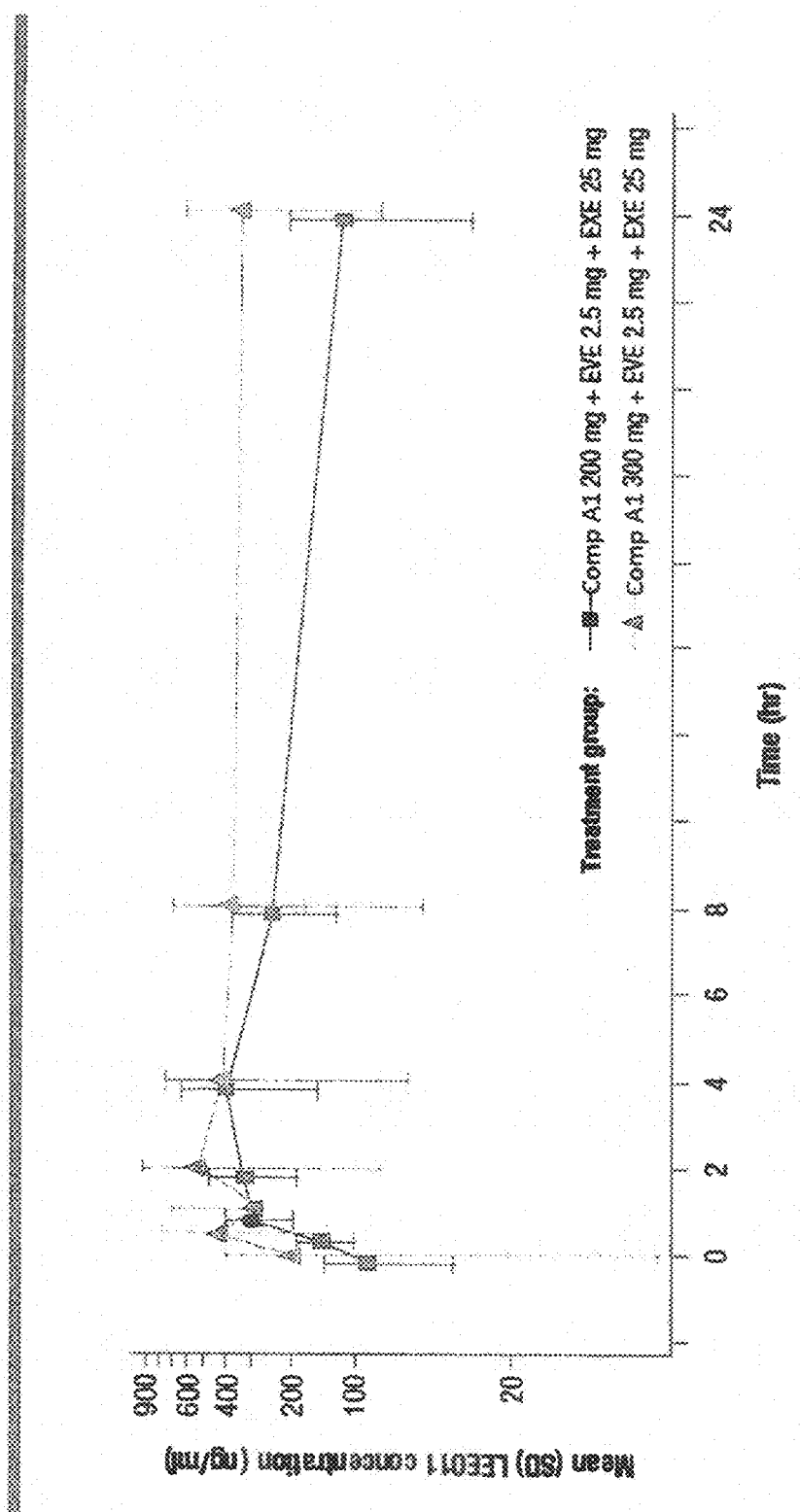
FIGS. 28 and 29 show the Mean plasma concentration-time profiles for Compound A1 and EVE in patients treated with Compound A1+EVE+EXE on C1D15.
Figure 29:
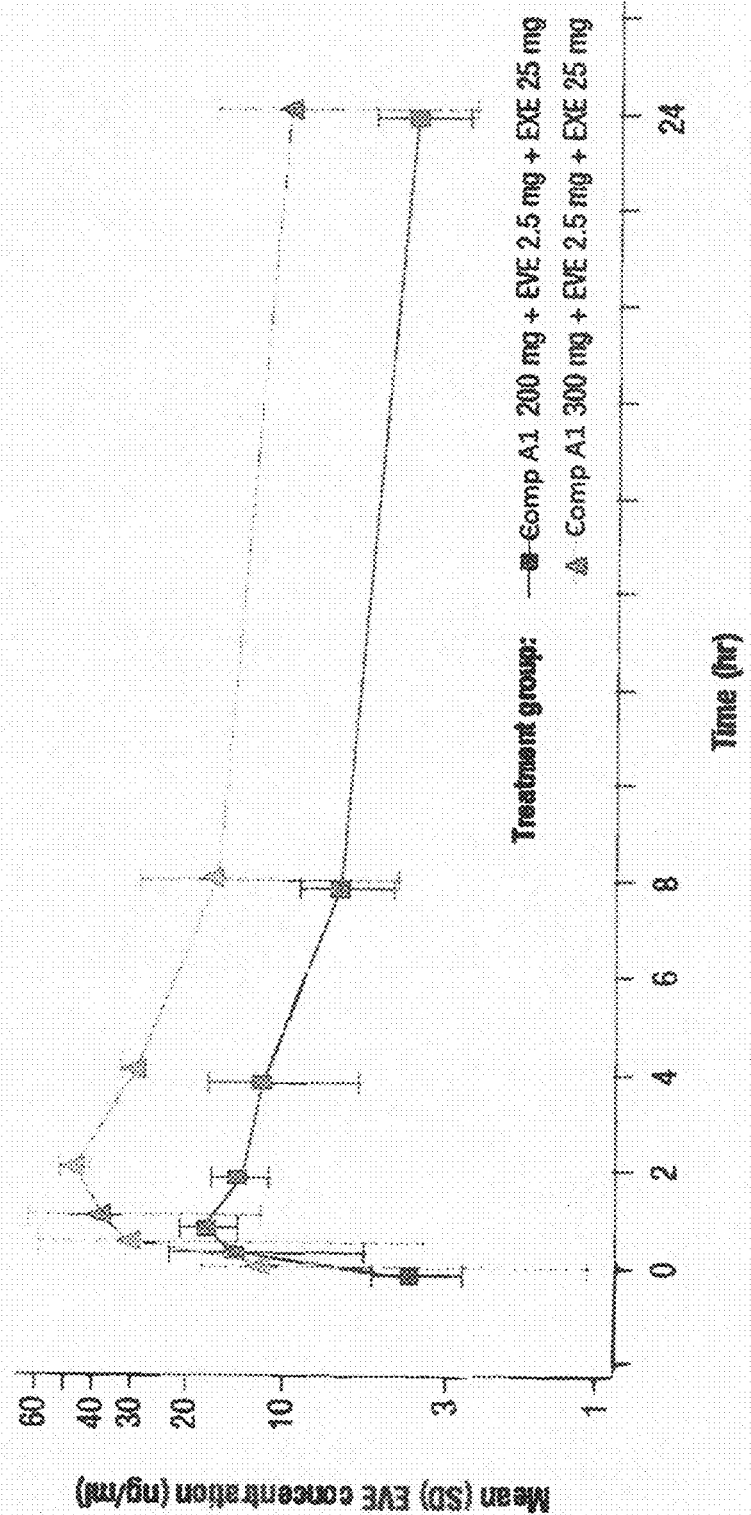

Pharmacokinetics:
Mean plasma concentration-time profiles for Compound A1 and EVE in patients treated with Compound A1+EVE+EXE on C1D15 are shown in FIGS. 28 and 29.
Both Compound A1 and EVE were rapidly absorbed at steady state (C1D15); median Tmax of Compound A1 and EVE was 2 and 1 hours, respectively, across dose ranges.
At steady state, treatment with Compound A1 (200 and 300 mg)+EVE 2.5 mg+EXE 25 mg resulted in Compound A1 exposure similar to that of single-agent Compound A1, while EVE exposure was approximately 1.5- to 2-fold and 2- to 3-fold higher than historical single-agent data when administered with Compound A1 200 and 300 mg, respectively.

Figure 30:
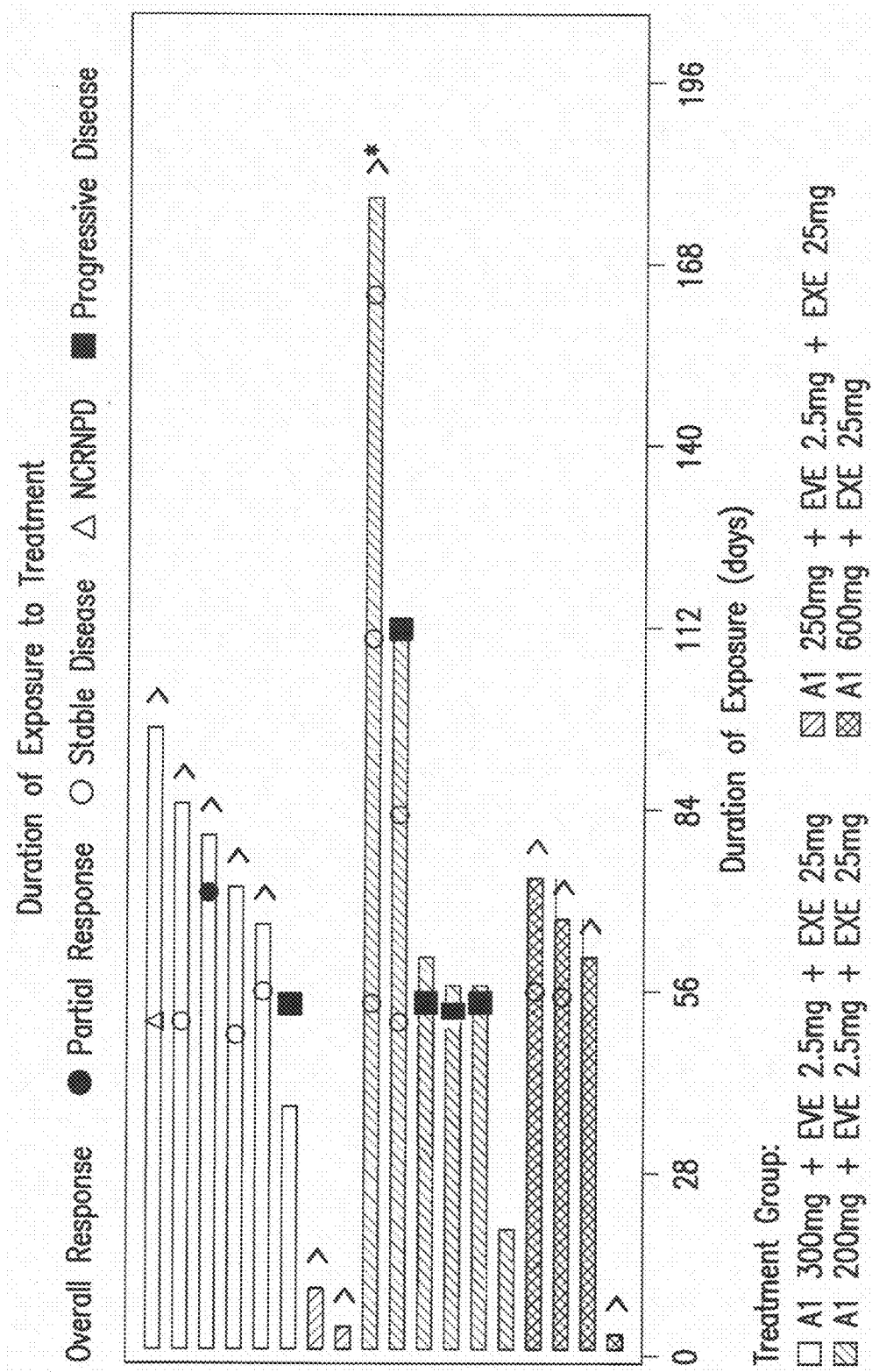
FIG. 30 shows the duration of exposure to treatment of the clinical trial described in Example 5 (interim results).
Figure 31:
FIG. 31 shows improvement in soft tissue metastases in a patient with lymph node, plura, lung, and soft tissue metastases who had received 1 prior line of anastrozole and 1 prior line of fulvestrant in the advanced/metastatic setting; the Cycle 3 Day 1 scan shows the largest area of disease on follow-up.
Figure 31:

Clinical Activity:
Of 13 patients evaluable for response, 1 patient had a confirmed partial response (Compound A1 300 mg+EVE 2.5 mg+EXE 25 mg), 7 patients had stable disease (SD; Compound A1 600 mg+EXE 25 mg: 1 patient; Compound A1 200 mg+EVE 2.5 mg+EXE 25 mg: 2 patients; Compound A1 300 mg+EVE 2.5 mg+EXE 25 mg: 4 patients), and 1 patient had neither complete response nor progressive disease (Compound A1 300 mg+EVE 2.5 mg+EXE 25 mg; FIG. 30 and FIG. 31).
One patient with a p16 (CDKN2A) deletion, and cyclin D1 (CCND1) and insulin-like growth factor receptor 1 (IGFR1) amplification treated with Compound A1 200 mg+EVE 2.5 mg+EXE had SD >6 months (FIG. 30).

Conclusions (Based on Interim Result)
Preliminary data suggest that the combinations of Compound A1+EXE and Compound A1+EVE+EXE are feasible, and clinical signs of activity have been observed in both arms of the study.
Preliminary PK analysis suggests that the 300-mg dose of Compound A1 resulted in increased EVE exposure at steady state, but EVE does not affect Compound A1 exposure.
The most common AEs were hematologic as anticipated with CDK4/6 inhibitors, and were mild to moderate.

Example 6

A Phase Ib/II trial is planned. The trial will have 3 arms as described below:

| Arm | Assigned Interventions |
| --- | --- |
| Compound A1 and Fulvestrant | Compound A1: 600 mg each day, 21 days on, 7 days off; Fulvestrant: 500 mg IM Day 1 and 15, followed by Q month |
| Compound A1 and Compound C2 and Fulvestrant | Compound A1: 400 mg each day, 21 days on, 7 days off; Compound C2: 20 mg each day continuous; Fulvestrant: 500 mg IM Day 1 and 15, followed by Q month |
| Compound A1 and Compound C1 and Fulvestrant | Compound A1: 400 mg each day, 21 days on, 7 days off; Compound C1: 100 mg each day continuous; Fulvestrant: 500 mg IM Day 1 and 15, followed by Q month |

Example 7

This on-going study aims at determining antitumor efficacy of various compounds used as single agent, in double or in triple combination in the HBCx-34 human breast patient-derived xenograft model.

The xenograft model proposed in this study is HBCx-34. HBCx-34 is a ductal carcinoma with wild type P53, no HER2 overexpression and PR and ERα overexpression. The tumor is highly responsive to adriamycine/cyclophosphamide and responsive to docetaxel and capecitabine. HBCx-34 has got no cachexia properties, but no body weight gain is observed for HBCx-34 bearing mice.

HBCx-34 breast tumor-bearing mice will receive estrogen diluted in drinking water (β-oestradiol, 8.5 mg/l), from the date of tumor implant to the date of inclusion. No estrogen will be added during the rest of the study.

Female athymic nude mice (Hsd:Athymic Nude-Fox1nu), 6- to 9-week-old at the beginning of the experimental phase, will be obtained from Harlan Laboratories (Gannat, France). Animals will be maintained in specific pathogen-free animal housing at the Center for Exploration and Experimental Functional Research (CERFE, Evry, France) animal facility. Animals will be delivered to the laboratory at least 7 days before the experiments during which time they are acclimatized to laboratory conditions. Mice will be housed in groups of a maximum of 7 animals during acclimation period and 5 animals during experimental phase. Mice will be housed inside individually ventilated cages (IVC) of Polysulfone (PSU) plastic (mm 213 W×362 D×185 H, Allentown, USA) with sterilized and dust-free bedding cobs. Food and water will be sterilized. Animals will be housed under a light-dark cycle (14-hour circadian cycle of artificial light) and controlled room temperature and humidity.

| Compound A1: 75 mg/kg free base, p.o. | |
| --- | --- |
| Volume of administration: | 5 ml/kg (i.e. 125 µl for a 25 g mouse) |
| Route of administration: | p.o. |
| Form: | solution |
| Vehicle: | 0.5% Methylcellulose in water |
| Concentration: | 15 mg/ml free base |

| Compound C2: 30 and 20 mg/kg free base, p.o. | |
| --- | --- |
| Volume of administration: | 5 ml/kg (i.e. 125 µl for a 25 g mouse) |
| Route of administration: | p.o. |
| Form: | solution |
| Vehicle: | 10% NMP/90% PEG300 |
| Concentration: | 6 mg/ml free base = 6.534 mg/ml salt base |
| | 4 mg/ml free base = 4.356 mg/ml salt base |

| Compound C1: 35 mg/kg, p.o. | |
| --- | --- |
| Volume of administration: | 5 ml/kg (i.e. 125 µl for a 25 g mouse) |
| Route of administration: | p.o. |
| Form: | suspension |
| Vehicle: | 0.5% Methylcellulose in water |
| Concentration: | 7 mg/ml |

| Vehicle: NaCl 0.9% | |
| --- | --- |
| Volume of administration: | 5 ml/kg (i.e. 125 µl for a 25 g mouse) |
| Route of administration: | p.o. |

| COMPARISON COMPOUNDS: STANDARDS OF CARE | |
| --- | --- |
| Letrozole (Compound B1) 2.5 mg/kg (FEMARA ®, Novartis) | |
| Volume of administration: | 5 ml/kg (i.e. 125 µl for a 25 g mouse) |
| Route of administration: | p.o. |
| Form: | Suspension |
| Vehicle: | NaCl 0.9% |
| Concentration: | 0.5 mg/ml |

-continued

| COMPARISON COMPOUNDS: STANDARDS OF CARE |
| --- |
| Exemestane 25 mg/kg (Compound B2, AROMASIN ®, Pharmacia) |

| Dose: | 25 mg/kg |
| --- | --- |
| Volume of administration: | 5 ml/kg (i.e. 125 µl for a 25 g mouse) |
| Route of administration: | p.o. |
| Form: | Suspension |
| Vehicle: | 0.9% NaCl |
| Concentration: | 5 mg/ml |

Study Groups and Regimen

For each group, 10 mice with established tumors and average tumor volume ranging 108 (6×6) to 288 (9×8) mm³ will be included in the study. In the case that tumor growth is heterogeneous, group size may be reduced (up to 8 mice/group) and/or inclusion may be staggered.

Animals Observations

From grafting day to study termination, animals will be observed every day, for physical appearance, behavior and clinical changes.

Tumor Measurements and Body Weight Monitoring

Tumor volume will be evaluated by measuring tumor diameters, with a calliper, biweekly during the treatment

| | | 1 Drug/Testing Agent | | | | 2 Drug/Testing Agent | | | | 3 Drug/Testing Agent | | | |
| --- | --- | --- | --- | --- | --- | --- | --- | --- | --- | --- | --- | --- | --- |
| Gr. | N | Agent | mg/kg | Route | Schedule | Agent | mg/kg | Route | Schedule | Agent | mg/kg | Route | Schedule |
| 1 | 10 | Vehicle | — | PO | qd × 56* | — | — | — | — | — | — | — | — |
| 2 | 10 | Letrozole (Compound B1) | 2.5 | PO | qd × 56* | — | — | — | — | — | — | — | — |
| 3 | 10 | — | — | — | — | Compound A1 | 75 | PO | qd × 56* | — | — | — | — |
| 4 | 10 | — | — | — | — | — | — | — | — | Compound C2 | 30-20 | PO | qd × 26-30** |
| 5 | 10 | — | — | — | — | — | — | — | — | Compound C1 | 35 | PO | qd × 56* |
| 6 | 10 | Letrozole (Compound B1) | 2.5 | PO | qd × 56* | Compound A1 | 75 | PO | qd × 56* | — | — | — | — |
| 7 | 10 | Letrozole (Compound B1) | 2.5 | PO | qd × 56* | — | — | — | — | Compound C2 | 30-20 | PO | qd × 26-30** |
| 8 | 10 | Letrozole (Compound B1) | 2.5 | PO | qd × 56* | — | — | — | — | Compound C1 | 35 | PO | qd × 56* |
| 9 | 10 | Letrozole (Compound B1) | 2.5 | PO | qd × 56* | Compound A1 | 75 | PO | qd × 56* | Compound C2 | 30-20 | PO | qd × 26-30** |
| 10 | 10 | Letrozole (Compound B1) | 2.5 | PO | qd × 56* | Compound A1 | 75 | PO | qd × 56* | Compound C1 | 35 | PO | qd × 56* |

*qd × 56: from D0 to D55
**qd × 26-30: from D0 to D25 at 30 mg/kg then from D26 to D56 at 20 mg/kg Dosing volume will be individually adjusted to the body weight. In each experimental group, the mentioned dose will be applied for all mice.

Tumorgraft Model Induction

Tumors of the same passage will be transplanted subcutaneously onto 5-10 mice (donor mice, passage (n−1)). When these tumors reach 1000 to 2000 mm³, donor mice will be sacrificed by cervical dislocation, tumors will be aseptically excised and dissected. After removing necrotic areas, tumors will be cut into fragments measuring approximately 20 mm³ and transferred in culture medium before grafting.

Mice will be anaesthetized with ketamine/xylazine, and then skin will be aseptized with a chlorhexidine solution, incised at the level of the interscapular region, and a 20 mm³ tumor fragment will be placed in the subcutaneous tissue. Skin will be closed with clips.

All mice from the same experiment will be implanted on the same day.

Inclusion Criteria

Healthy mice aged 6 to 9 weeks and weighing at least 20 g will be included in the study. Mice will be allocated to different groups according to their tumor volume to give homogenous mean and median tumor volume in each treatment arms. Treatments will be randomly attributed to cages housing up to 5 mice.

period and once a week during the follow-up period. The formula TV (mm³)=[length (mm)×width (mm)²]/2 will be used, where the length and the width are the longest and the shortest diameters of the tumor, respectively.

Tumors will not be weighed at the end of experimental phase.

All animals will be weighted biweekly during the treatment period and once a week during the follow-up period.

Unless specified otherwise by the Sponsor, in case that body weight loss reaches 15% compared to the 1$^{st}$ day of treatment, DIETGEL RECOVERY® will be given for the entire group in which the body weight loss is observed.

Criteria for Ethical Sacrifice

Each animal will be sacrificed if one of the following conditions is met:
  Body weight loss (BWL) ≥20% compared to the 1st day of treatment for 3 consecutive measurements (2 days or 48 hours).
  General alteration of behaviour or clinical signs.
  Tumor volume ≥2000 mm³.

Unless specified otherwise, no necropsy will be performed at sacrifice.

End Points (Whichever Comes First)

Each group of animals will be sacrificed if the two following conditions are met:

A tumor volume of 2000 mm³ is reached for at least one animal
And the initial median tumor volume has been increased by 3 to 5-fold.

The endpoints for the experiment are:
a treatment phase of 8 weeks*
and a follow-up phase of 57 days.

(*) Treatment phase could be extended by 2 or 3 weeks if no toxicity is observed and if required according to "Tumorgraft model induction".

Data Analysis

Day 0 will be always considered the first day of treatment. The days of the experiment will be subsequently numbered according to this definition. Recordings will be expressed as mean+/−standard error of the mean (mean+/−sem) and median+/−interquartile (median+/−IQR).

Statistical analysis will be done for each measurement by Mann-Whitney non parametric comparison test using GRAPHPAD PRISM®_software. Each treated group will be compared with control group.

Figure 20:
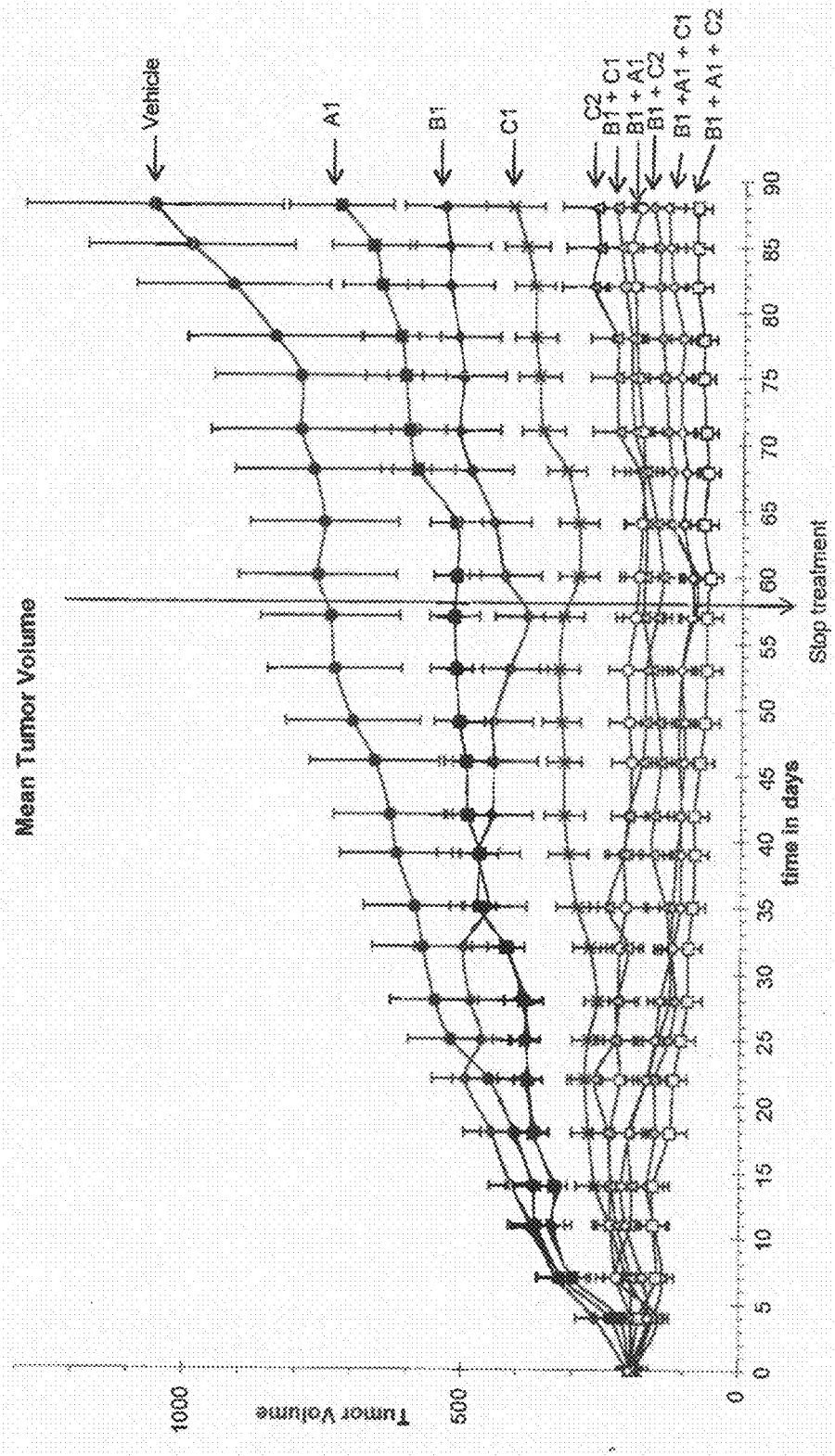
FIGS. 20-22 show antitumor efficacy of various compounds used as single agent, in double or in triple combination in the HBCx-34 human breast patient-derived xenograft model.
Figure 21:
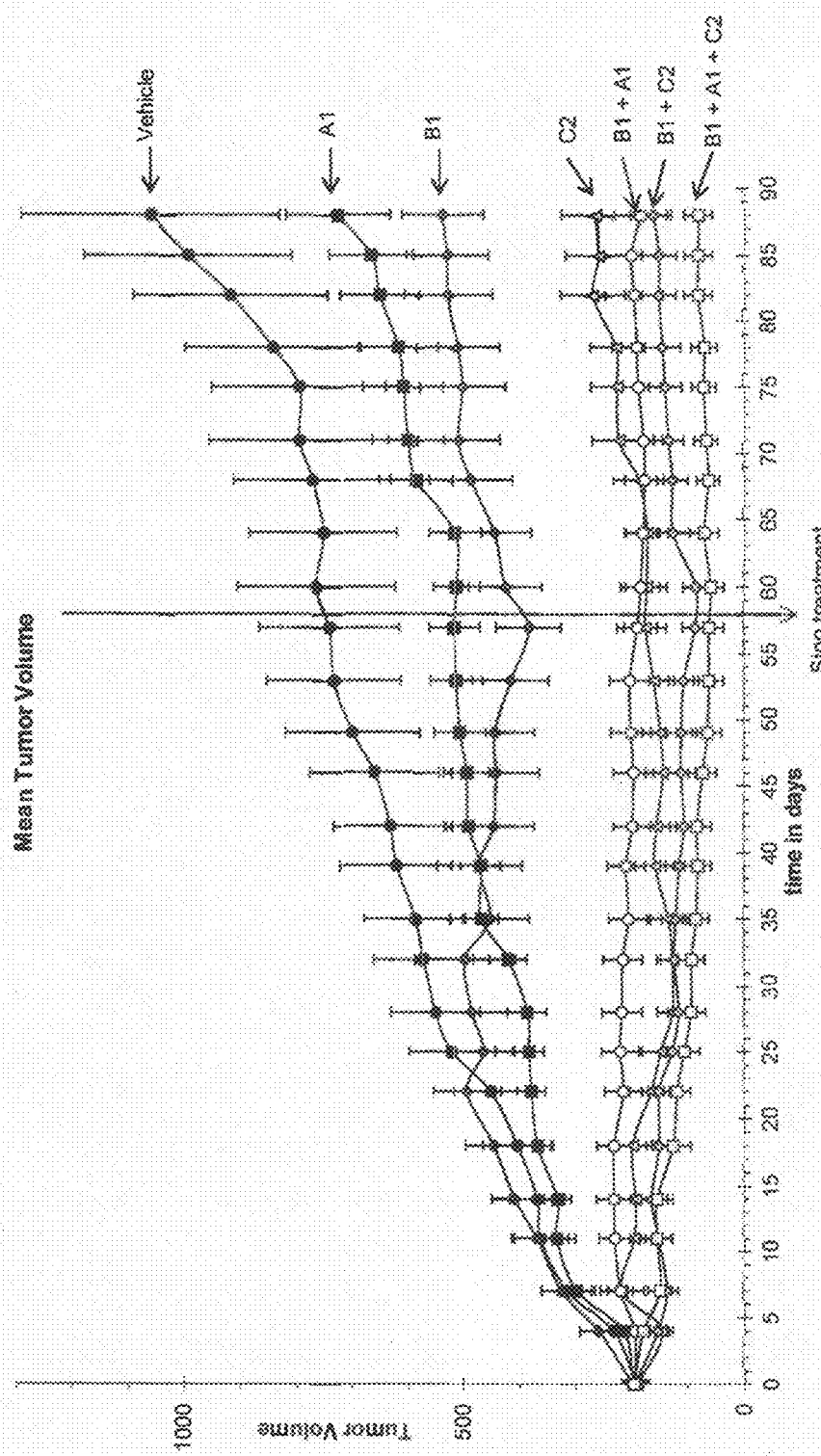
Figure 22:
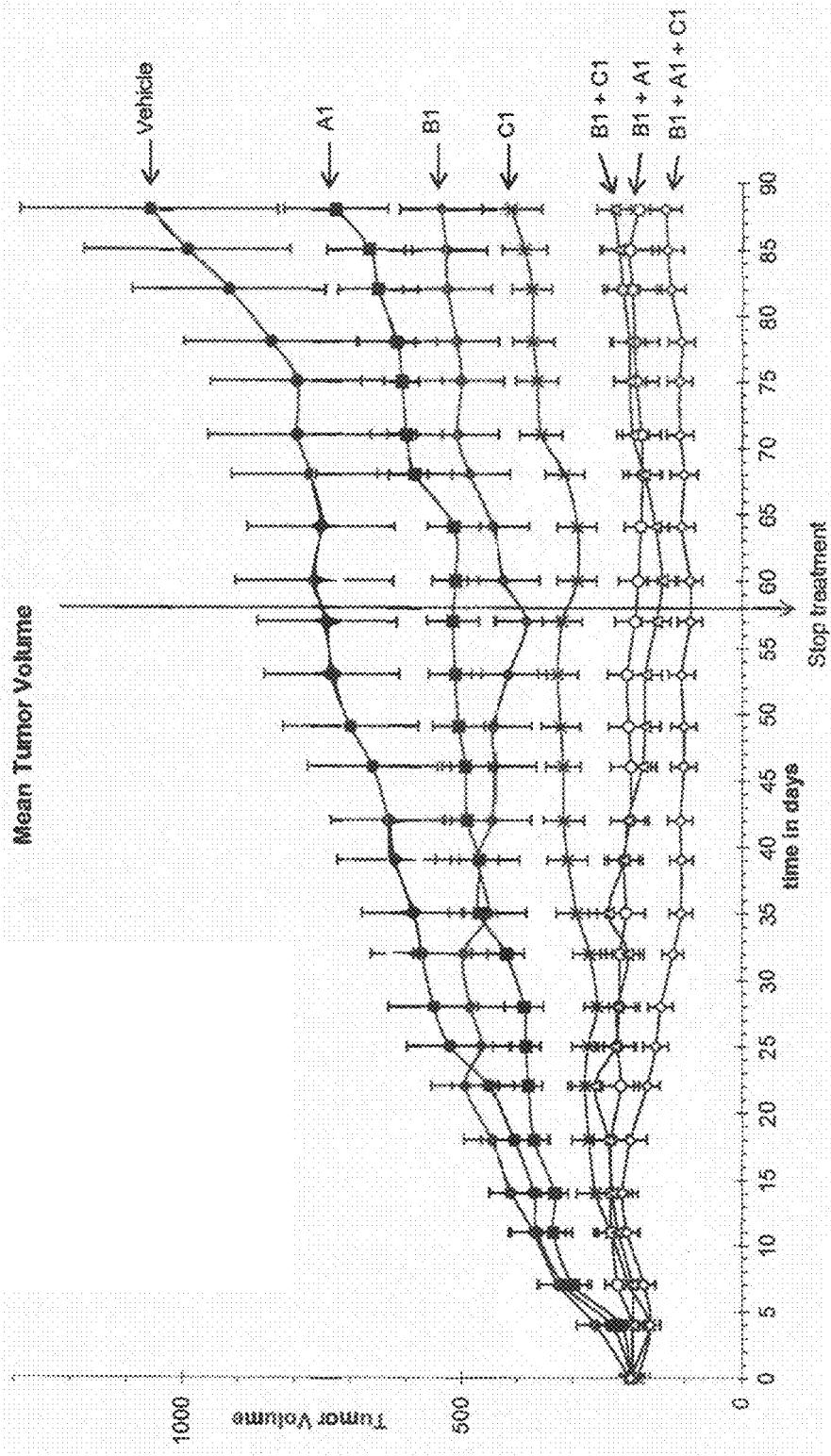

FIGS. 20-22 illustrates some results of this study.

The invention claimed is:

1. A method of treating HR+ breast cancer in a human, comprising administering to the human therapeutically effective levels of Compound A1, or a pharmaceutically acceptable salt thereof:

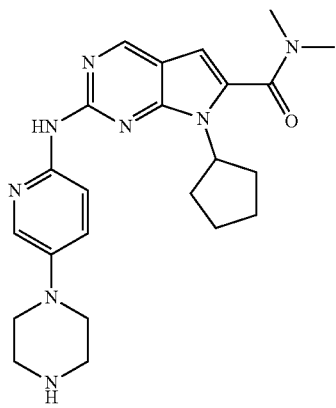

(A1)

and therapeutically effective levels of fulvestrant.

2. The method of claim 1, wherein a jointly therapeutically effective amount of Compound A1, or a pharmaceutically acceptable salt thereof, and fulvestrant is administered, and the administration provides to the human 200 mg/day, 400 mg/day or 600 mg/day of Compound A1.

3. The method of claim 2, wherein the administration provides to the human 200 mg/day of Compound A1.

4. The method of claim 2, wherein the administration provides to the human 400 mg/day of Compound A1.

5. The method of claim 2, wherein the administration provides to the human 600 mg/day of Compound A1.

6. A method of administering Compound A1, or a pharmaceutically acceptable salt thereof:

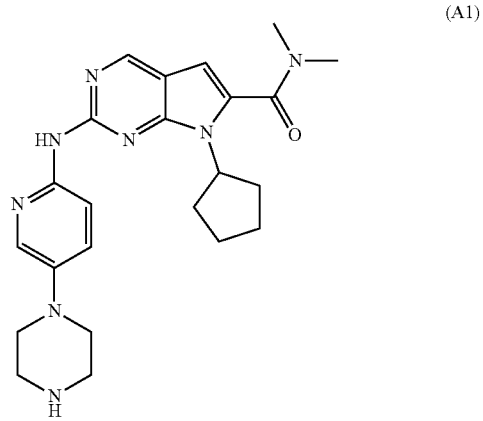 [SMILES: CN(C)C(=O)c1cc2cnc(Nc3ccc(N4CCNCC4)cn3)nc2n1C1CCCC1]

(A1)

and fulvestrant to a human HR+ breast cancer patient, the method comprising administering Compound A1 and fulvestrant to the patient to provide therapeutically effective levels of Compound A1 and fulvestrant in the patient.

7. The method of claim 6, wherein the administration provides to the human 200 mg/day, 400 mg/day or 600 mg/day of Compound A1.

8. The method of claim 7, wherein the administration provides to the human 200 mg/day of Compound A1.

9. The method of claim 7, wherein the administration provides to the human 400 mg/day of Compound A1.

10. The method of claim 7, wherein the administration provides to the human 600 mg/day of Compound A1.

* * * * *